United States Patent
Basu et al.

(10) Patent No.: US 11,087,261 B1
(45) Date of Patent: Aug. 10, 2021

(54) APPARATUS, SYSTEM AND METHOD FOR PROCESSING, ANALYZING OR DISPLAYING DATA RELATED TO PERFORMANCE METRICS

(75) Inventors: Atanu Basu, Austin, TX (US); Frederick Johannes Venter, Driftwood, TX (US)

(73) Assignee: DATAINFOCOM USA INC., Austin, TX (US)

( * ) Notice: Subject to any disclaimer, the term of this patent is extended or adjusted under 35 U.S.C. 154(b) by 260 days.

(21) Appl. No.: 13/540,498

(22) Filed: Jul. 2, 2012

Related U.S. Application Data

(63) Continuation-in-part of application No. 13/019,446, filed on Feb. 2, 2011, now Pat. No. 8,364,519, which is a continuation-in-part of application No. 12/404,568, filed on Mar. 16, 2009, now Pat. No. 8,209,218.

(60) Provisional application No. 61/036,483, filed on Mar. 14, 2008.

(51) Int. Cl.
*G06Q 10/06* (2012.01)

(52) U.S. Cl.
CPC ..... *G06Q 10/0637* (2013.01); *G06Q 10/0639* (2013.01); *G06Q 10/06375* (2013.01); *G06Q 10/06393* (2013.01)

(58) Field of Classification Search
CPC combination set(s) only.
See application file for complete search history.

(56) References Cited

U.S. PATENT DOCUMENTS

| | | | |
|---|---|---|---|
| 5,727,161 A * | 3/1998 | Purcell, Jr. | G06F 40/18 705/7.36 |
| 6,563,920 B1 | 5/2003 | Flockhart et al. | |
| 6,876,988 B2 | 4/2005 | Helsper et al. | |
| 6,917,928 B1 | 7/2005 | Pellinat | |
| 7,103,562 B2 | 9/2006 | Kosiba et al. | |
| 7,239,316 B1 * | 7/2007 | Cox | G06T 11/206 345/440 |
| 7,373,633 B2 | 5/2008 | Kraiss et al. | |
| 7,596,507 B2 | 9/2009 | Gibson | |
| 7,979,380 B2 * | 7/2011 | Moyne | G05B 13/048 706/62 |
| 8,200,527 B1 | 6/2012 | Thompson et al. | |
| 8,209,275 B2 | 6/2012 | Tsui et al. | |
| 2001/0034628 A1 | 10/2001 | Eder | |
| 2002/0006192 A1 | 1/2002 | Bengston et al. | |

(Continued)

OTHER PUBLICATIONS

Wen, Y., & Lin, S. (2007). Utilizing the balanced scorecard for performance measurement of knowledge management. Journal of Accounting, Finance & Management Strategy, 3(2), 39-58.

(Continued)

*Primary Examiner* — Renae Feacher
(74) *Attorney, Agent, or Firm* — Chad Peterson

(57) ABSTRACT

A method of determining a set of future actions includes providing an interface to a user, the interface including an adjustable element associated with a future value of an influencer. The influencer is associated with an action. The method further includes receiving via the interface an adjusted future value of the influencer, projecting a future value of a performance indicator based at least in part on the adjusted future value of the influencer, and providing a results interface to the user indicative of the future value of the performance indicator.

14 Claims, 39 Drawing Sheets

(56) References Cited

U.S. PATENT DOCUMENTS

| | | | |
|---|---|---|---|
| 2002/0041673 A1 | 4/2002 | Berrondo et al. | |
| 2002/0049621 A1 | 4/2002 | Bruce | |
| 2002/0049687 A1* | 4/2002 | Helsper | H04L 41/147 706/45 |
| 2002/0143599 A1* | 10/2002 | Nourbakhsh | G06Q 10/0637 705/7.31 |
| 2002/0156714 A1* | 10/2002 | Gatto | G06Q 40/00 705/36 R |
| 2002/0184069 A1 | 12/2002 | Kosiba et al. | |
| 2003/0002653 A1 | 1/2003 | Uckun | |
| 2003/0081757 A1 | 5/2003 | Mengshoel et al. | |
| 2003/0177060 A1 | 9/2003 | Seagraves | |
| 2004/0068429 A1* | 4/2004 | MacDonald | G06Q 10/0639 705/7.29 |
| 2004/0068431 A1 | 4/2004 | Smith et al. | |
| 2004/0148047 A1* | 7/2004 | Dismukes | G06Q 10/06 700/100 |
| 2004/0202308 A1* | 10/2004 | Baggenstoss | G06Q 10/06 379/265.06 |
| 2005/0004834 A1 | 1/2005 | Smith | |
| 2005/0043986 A1 | 2/2005 | McConnell et al. | |
| 2005/0071450 A1* | 3/2005 | Allen | H04L 12/2602 709/223 |
| 2005/0144096 A1* | 6/2005 | Caramanna, II | G06Q 40/06 705/30 |
| 2006/0010164 A1 | 1/2006 | Netz et al. | |
| 2006/0101017 A1 | 5/2006 | Eder | |
| 2006/0229921 A1 | 10/2006 | Colbeck | |
| 2006/0242033 A1 | 10/2006 | Corbett | |
| 2006/0242035 A1 | 10/2006 | Corbett et al. | |
| 2007/0067211 A1* | 3/2007 | Kaplan | G06Q 10/04 705/7.31 |
| 2007/0100859 A1* | 5/2007 | Holmes | G06Q 10/06 |
| 2007/0106593 A1 | 5/2007 | Lin | |
| 2007/0129893 A1* | 6/2007 | McColl | G06Q 10/00 702/19 |
| 2007/0150324 A1* | 6/2007 | Makita | G06Q 10/0639 705/7.28 |
| 2008/0004922 A1 | 1/2008 | Eder | |
| 2008/0027769 A1 | 1/2008 | Eder | |
| 2008/0065470 A1 | 3/2008 | Helmes et al. | |
| 2008/0104104 A1 | 5/2008 | Nolan et al. | |
| 2008/0140623 A1 | 6/2008 | Tien et al. | |
| 2008/0183786 A1 | 7/2008 | Shimizu | |
| 2008/0195440 A1 | 8/2008 | Bagchi et al. | |
| 2008/0201397 A1 | 8/2008 | Peng et al. | |
| 2008/0243912 A1* | 10/2008 | Azvine | G06Q 10/06 |
| 2008/0270363 A1 | 10/2008 | Hunt et al. | |
| 2009/0064025 A1 | 3/2009 | Christ et al. | |
| 2009/0138334 A1 | 5/2009 | Henby et al. | |
| 2009/0319931 A1 | 5/2009 | Hutchings et al. | |
| 2009/0171879 A1* | 7/2009 | Bullen | G06N 7/005 706/47 |
| 2009/0217183 A1* | 8/2009 | Moyne | G06F 3/0481 715/762 |
| 2010/0077077 A1* | 3/2010 | Devitt | H04L 41/22 709/224 |
| 2010/0114899 A1 | 5/2010 | Guha et al. | |
| 2010/0274637 A1 | 10/2010 | Li et al. | |
| 2010/0332439 A1 | 12/2010 | Adachi et al. | |
| 2011/0071867 A1 | 3/2011 | Chen et al. | |
| 2011/0213644 A1 | 9/2011 | Phene | |

OTHER PUBLICATIONS

Chiesa, V., Frattini, F., Lazzarotti, V., & Manzini, R. (2007). How do measurement objectives influence the R&D performance measurement system design? Management Research News, 30(3), 182-202. doi: 10.1108/01409170710733269.

Palfreyman, S. (1998). Performance indicators and reporting: Some practical guidelines. Charter, 69(4), 85-86.

Marr, B. (2007). Measuring and managing intangible value drivers. Business Strategy Series, 8(3), 172-178.

SAS Institute Inc., "How to Compete on Analytics: The Analytical Center of Excellence," White Paper, 2008, 18 pages.

SAS Institute Inc., "Data-Driven Decision Making: Analyzing Your Data to Improve Student Learning," White Paper, 2008, 19 pages.

SAS Institute Inc., "The SAS Enterprise Intelligence Platform: SAS Business Intelligence; Enabling BI Consolidation and Standardization Without Compromises," White Paper, 2008, 13 pages.

SAS Institute Inc., "Enhancing Sales and Operations Planning with Forecasting Analytics and Business Intelligence," White Paper, 2008, 14 pages.

SAS Institute Inc., Ngenera Corporation, and Intel, "Successful Automating Decisions with Business Analytics: How to Identify High-Value Opportunities for Embedding Analytics into Your Business Processes," White Paper, 2008, 22 pages.

SAS Institute Inc., "Data Management for Risk: The Importance of Data for Effective Risk Management," White Paper, 2009, 11 pages.

Fair Isaac Corporation, "Predictive Analytics; Custom Insurance Analytics," Product Sheet, 2008, 2 pages.

Fair Isaac Corporation, "Decision Management Tools; Xpress Optimizer," Product Sheet, 2008, 2 pages.

SPSS Inc., "Clementine® 12.0—Specifications," Achieve Better Insight and Prediction with Data Mining, Product Specifications, 2008, 6 pages.

SPSS Inc., "Get More Out of Your Analytical Investment," Advertisement, 2008, 6 pages.

Colias, John, Ph.D., "New Statistical Tools for Key Driver Analysis," Decision Analyst, 2007.

Lawson, Raef, Stratton, William and Hatch, Toby, "Scorecards and dashboards—partners in performance," CMA Management, Dec./Jan. 2007.

"Predictive Analysis with SQL Server 2008," White Paper, Microsoft SQL Server 2008 R2, Nov. 2007.

Holland, Peter, "Achieving a step change in contact centre performance: Exploiting data to make better decisions and take effective action," Journal of Targeting, Measurement and Analysis for Marketing, vol. 12, 2, 103-113.

Keeley, Mark, "Root Cause Analysis Research Corner Cause and Effect," Call Center Magazine; Mar. 2005.

"Altaworks Selected by Industry Influencers to Demonstrate at DEMO 2002 Conference"; Business/Technology Editors; Business Wire; New York; Jan. 16, 2002; p. 1; Proquest.

"Fonterra Canpac Deploys Pavilion's Production Performance Management Solution: Fast Moving Consumer Goods Manufacturer Improves Operational Performance and Reduces Waste"; Business Wire; New York; May 23, 2006; p. 1; Proquest.

"Performance—Measurement & Small to Mid-sized Call Center Solutions"; Call Center Solutions; Mar. 1999; 17, 9; ProQuest Central; p. 22.

Bauer; "Predictive Analytics: Data Mining with a Twist"; DM Review 15.12; Dec. 2005; p. 76.

Bauer; "Predictive Analytics: The Next Wave in KPI's"; DM Review; Nov. 2005.

Loucks; "Model Sensitivity and Uncertainty Analysis"; Water Resources Planning and Management; UNESCO; 2005; http://ecommons.library.cornell.edu/bitstream/1813/2804/12/09_chapter09.pdf.

Non-final Office Action dated Sep. 14, 2011 in U.S. Appl. No. 12/404,568.

Final Office Action dated Jan. 30, 2012 in U.S. Appl. No. 12/404,568.

Notice of Allowance dated Apr. 11, 2012 in U.S. Appl. No. 12/404,568.

Notice of Allowance dated Oct. 3, 2012 in U.S. Appl. No. 13/019,446.

Non-Final Office Action dated Oct. 12, 2012 in U.S. Appl. No. 13/487,715.

Notice of Allowance dated Jun. 6, 2013 in U.S. Appl. No. 13/487,715.

Notice of Allowance dated Mar. 18, 2014 in U.S. Appl. No. 13/487,715.

Frangopol et al.; "Probabilitic Performance Prediction of Deteriorating Structures Under Different Maintenance Strategies: Condition, Safety and Cost"; Apr. 2004.

(56) References Cited

OTHER PUBLICATIONS

Holland; "Achieving a step change in contact centre performance: Exploiting data to make better decisions and take effective action"; Journal of Targeting, Measurement and Analysis for Marketing, vol. 12, 2, pp. 103-113.

* cited by examiner

FIG. 4A

SMOSYS

Welcome: dici (admin)     Setup | Logout
Current Date & Time: Sep 01, 2007, 00:00 (CST)
Last Data Upload: Aug 31, 2007, 00:00 (CST)

Home : Dashboard >> Root Cause Analysis

Root Cause Analysis of [Recommend Likelihood ▽] for [Process1 ▽] for [Next 7 Days ▽] for [Ottawa ▽] — 120A — Prediction for Next 7 Days Ranked Influencers — 110B     Hold Time — 150H 1) Contacts (25.6) — 150A
2) Brand Description (18.6) — 150B
3) Product Description (18.2) — 150C
4) Reason Code (15.7) — 150D
5) Shipping Delay (10.2) — 150E
6) Age Of The System (5.4) — 150F
7) Dispatch Sent (2.2) — 150G
8) Hold Time (2.3) — 150H
9) Local Queue Time (1.5) — 150I
10) Answered Within Service Level (0.3) — 150J

— 220

Values in the parentheses are contributions of the influencers in percentage

Histogram describing Predicted behavior of influencer

Call Logs (%): 100, 75, 50, 25, 0

Minutes: 0, 2-4, 4-6, 6-8, >8

— 230H

AVERAGE HOLD TIME = 2.8 MINUTES — 232H

The cumulative time that a call was put on hold by at least one agent device.

Solve What If | Solve Optimization

COMING FROM 'OPTIMIZATION' GUI

User and/or machine specifies S613:
- (i) an 'influencer action-time frame' 196 where the influencer targets for user-proposed deviating influencer values
- (ii) a deviating-KPI-viewing time frame 198;
- (iii) a reference KPI 110 (for influencing user controls);
- (iv) a reference time-frame 120, which, together with the reference KPI, influences user controls Display S625 user controls for receiving user-proposed deviating influencer values, wherein the user controls are:
- (i) associated with default values and/or proposed ranges determined in accordance with calculated deviating influencer values 160 for the reference future time frame for the reference time frame, the deviating influencer values 160 calculated according to the technique of FIG. 5D;
- (ii) ordered according to a predicted future influencer-ranking-hierarchy determined according to step S219 for the reference future time frame and for the reference KPI Receiving S229 via the user-input device, *user-proposed deviating influencer values* for a plurality of influencers Displaying S233 a description of one or more deviating future KPI value(s) determined/predicted in accordance with:
- (i) the user-proposed deviating values;
- (ii) the influencer action-time frame 196; and
- (iii) the deviating-KPI-viewing time frame 198

*FIG. 7E*

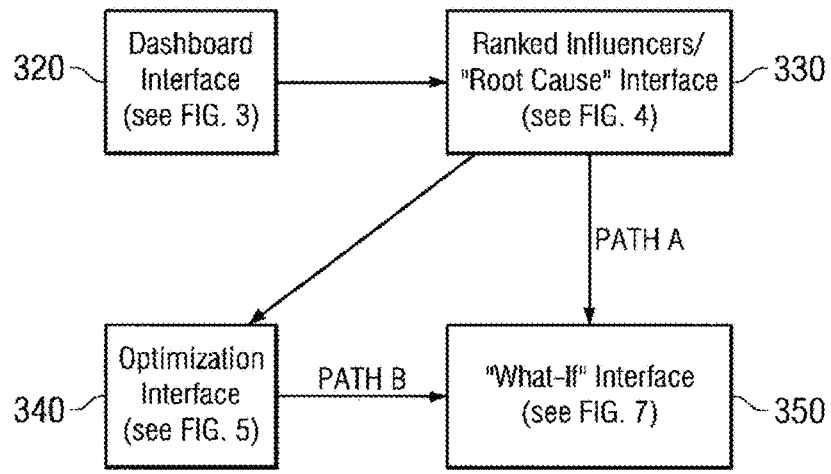
FIG. 8
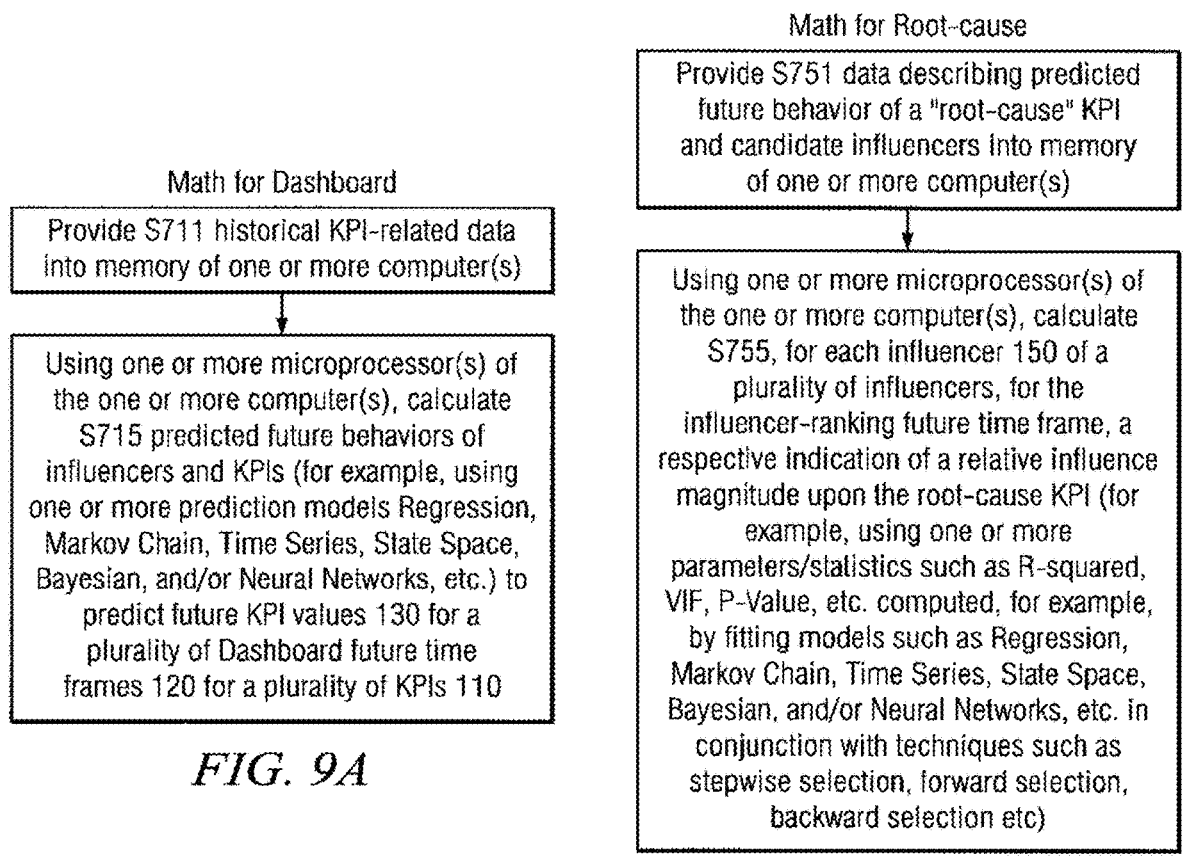
FIG. 9A
FIG. 9B

US 11,087,261 B1

APPARATUS, SYSTEM AND METHOD FOR PROCESSING, ANALYZING OR DISPLAYING DATA RELATED TO PERFORMANCE METRICS

CROSS-REFERENCE TO RELATED APPLICATION(S)

The present application is a continuation-in-part application of U.S. patent application Ser. No. 13/019,446, filed Feb. 2, 2011, entitled "APPARATUS, SYSTEM AND METHOD FOR PROCESSING, ANALYZING OR DISPLAYING DATA RELATED TO PERFORMANCE METRICS," naming inventors Atanu Basu and Joachim Hubele, which is a continuation-in-part application of U.S. patent application Ser. No. 12/404,568, filed Mar. 16, 2009, entitled "APPARATUS, SYSTEM AND METHOD FOR PROCESSING, ANALYZING OR DISPLAYING DATA RELATED TO PERFORMANCE METRICS," naming inventors Atanu Basu, Joydeep Biswas, Avijit Roy, and Bappaditya Mondal, which claims priority from U.S. Provisional Patent Application No. 61/036,483, filed Mar. 14, 2008, which applications are incorporated by reference herein in their entirety.

FIELD OF THE DISCLOSURE

The present disclosure is directed to systems and methods for processing, analyzing, or displaying data related to performance metrics.

BACKGROUND

Global Fortune 1000 corporations and many smaller businesses manage their business processes by carefully monitoring a set of performance indicators (PIs) or metrics, at different time intervals (from near-real-time to daily/weekly/monthly/quarterly/etc., depending on the metric in question). Such metrics fall under several categories, depending on the particular business process. Some exemplary categories include productivity, customer satisfaction, customer loyalty, problem resolution, cost, revenue, sales conversion rate, timeliness, etc. Such PI values are useful in business processes, such as contact/call centers (e.g., customer service), transaction services (e.g., insurance claims), finance & accounting (e.g., accounts payable/receivable), manufacturing (e.g., supply and demand chains), field service, marketing, logistics, sales, etc.

BRIEF DESCRIPTION OF THE DRAWINGS

The present disclosure may be better understood, and its numerous features and advantages made apparent to those skilled in the art by referencing the accompanying drawings.

FIG. 4A-4D are screen shots of a "ranked influencer" interface for a particular KPI (in this example "recommended likelihood") and a particular future timeframe (in this example, "next 7 days"), in accordance with some embodiments.

FIGS. 5A-5C are screen shots of an exemplary "optimization" interface for displaying a set of calculated deviating influencer values which are predicted to move one or more KPI(s) from predicted values to target values or ranges, in accordance with some embodiments.

FIGS. 7C-7E are flow charts of exemplary routines for providing a what-if interface.

FIG. 8 is a block diagram of multiple interfaces and describes an exemplary technique for navigating between these interfaces.

FIGS. 9A-9D are flowcharts of computational techniques for generating data related to KPI predictions.

The use of the same reference symbols in different drawings indicates similar or identical items.

DETAILED DESCRIPTION

Figure 1:
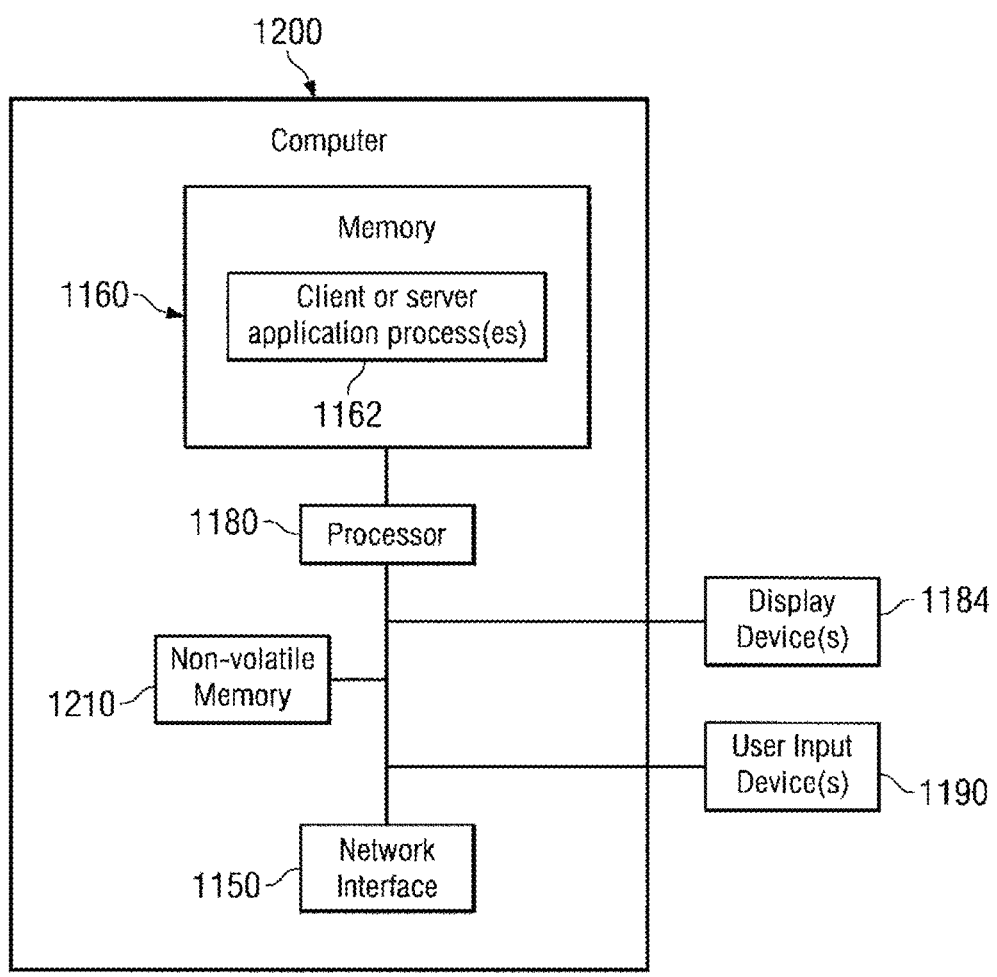
FIG. 1 is a block diagram of an exemplary computer operatively coupled to a display device and a user input device.

The methods described in more detail below implement Prescriptive Analytics® techniques that assist with determining future actions or decisions in view of business rules and projected outcomes. The methods can be embodied in executable instructions, processors or systems to execute such instructions, interfaces implemented by such systems, media storing such executable instructions, and services derived from the use of such methods and systems. In addition, the methods can be utilized to provide Predictive Decision Management® information and services. In particular, the methods can implement predictive analysis, such as forecasting to determine what will happen when. Further, the methods can implement optimization, scenario testing, and root cause analysis of factors that influence performance.

In an embodiment, the present system predicts problems that may occur, providing an indication of both the nature of the problem and when it is expected to occur. The problems may be expressed as deviations in performance indicators that violate business criteria. For example, a problem may be expressed as the value of a performance indicator crossing a threshold. In addition, the present system supports testing of solutions to the predicted problem. The solutions are expressed in terms of what action to take and when to take such action. As such, the present system assists with determining a desirable set of future actions to maintain a business process in compliance with business criteria. Deviations from performance indicators that violate business criteria may also include opportunities that the business can benefit from. For example, when a future customer satisfaction score exceeds a threshold, the business may decide to reduce its service level and thus, reduce cost.

Businesses rely on business processes to function. Evaluating how well that business process is performing allows a business to allocate resources, increase production, improve its position in the market place, increase profitability, or any combination thereof. For example, a business process can include a call center, the function being customer service or technical support. In another example, the business process can include field services, the function being product installation or repair. In a further example, the business process can be a marketing department, the function being to control public perception of the business or a response rate. In additional examples, the business process can include transactions services, finance and accounting, manufacturing, logistics, sales, or any combination thereof.

In particular, evaluation of the business process can be correlated with performance indicators (PIs). One or more performance indicators (PIs) can be used to quantify how well a business process is performing. For example, a call center can quantify performance using performance indicators, such as customer satisfaction, problem resolution, productivity indicators, cost indicators, or any combination thereof.

Once determined, the performance indicators (PIs) can be compared with business criteria to determine whether the business process is performing as desired. For example, a business criterion may include threshold values, limits on rates of change, heuristics associated with aspects of the business function or any combination thereof. For example, the performance indicator (PI) can be compared to a threshold value to determine whether the performance indicator (PI) is within a desired range or is in violation of the threshold, indicating poor performance or an unnecessary high performance.

The performance indicators (PIs) are influenced by other factors associated with performing the business process. In particular, such factors are referred to as influencers and influencers correlate with the performance indicators. For example, an influencer associated with call center performance can include the number of contacts made with a customer to resolve an issue, the type of issue, hold time, shipping delays, or any combination thereof, among others. Such influencers can, for example, influence performance indicators, such as customer satisfaction and brand satisfaction. Performance indicators (PIs) or influencers can be of numerical (continuous) nature, categorical nature, or a combination thereof. Further, the PIs or influencers can be ordered or can be non-ordered. In relation to performance indicators (PIs) or influencers, this document use the term "values," which can include an average or median value of an underlying distribution. In another example, the distributions of performance indicators (PIs) or influencers are utilized or predicted. In particular, a PI distribution provides data about the underlying nature of the median or mean value. For example, when the PI relates to customer satisfaction, an average value does not provide information about the number of dissatisfied customers. An average of 80% satisfaction can be the result of all participants having a satisfaction near 80% or can be the result of several 100% satisfied customers and a few very dissatisfied customers. Identifying the existence and then cause of the few very dissatisfied customers may provide greater benefit than seeking to achieve an average value. In the case of categorical performance indicators (PIs) or influencers, such a prediction can include the prediction of the occurrence set of categories. As used below, the term "value" is used to include numerical values, categorical values, or any combination thereof.

The influencers and the performance indicators (PIs) change over time. The change can be caused by the change of influencers or by a time dependency of a performance indicator on itself. As such, the performance indicator (PI) can deviate overtime and violate business criteria, which is indicative of a problem in the business unit or low performance. To correct the deviation, associated influencers can be manipulated. For example, more staff can be added to reduce hold time. However, immediate manipulation of the influencers to solve a problem predicted in the future can provide less than desirable solutions to the problems in the business process. For example, hiring more staff long before the hold times are expected to increase leads to higher cost in the call center. The present system can assists with determining a desirable set of future actions to maintain a business process incompliance with business criteria.

Figure 12:
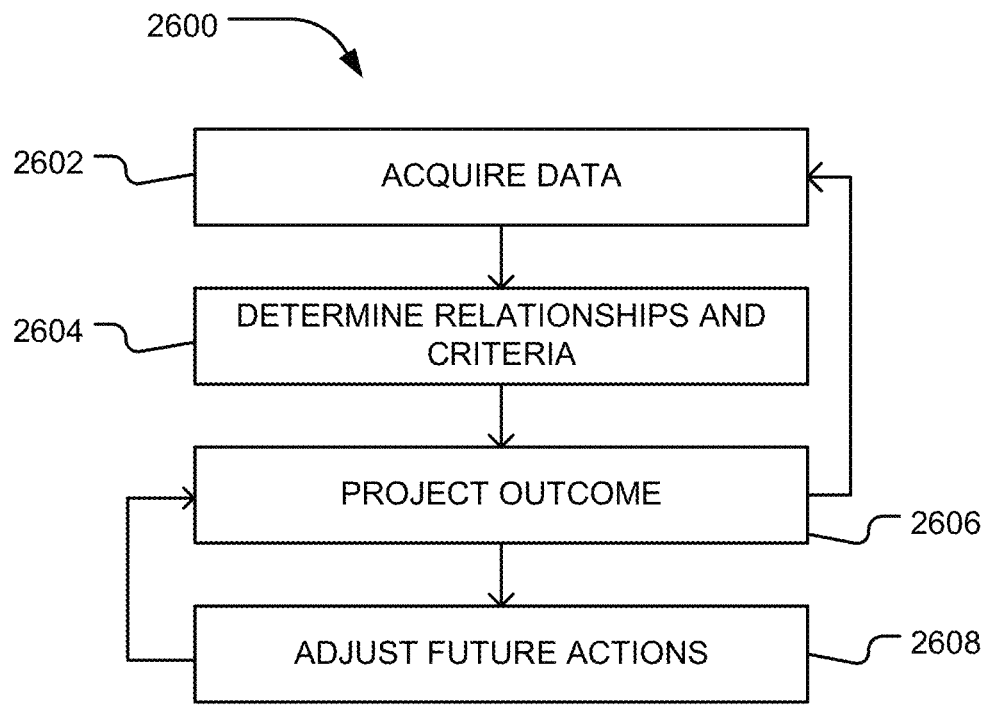
FIG. 12 includes an illustration of a flow diagram of an exemplary process.

In an embodiment, the present system performs a method to determine such a desirable set of future actions. For example, FIG. 12 illustrates a method 2600, which includes acquiring data (2602), determining relationships and criteria (2604), predicting outcomes (2606) and adjusting future actions (2608). The present system can acquire data, as illustrated at 2602, from a variety of sources. The data can be acquired from external sources. As discussed in more detail below, exemplary external sources include databases, customer service logs, surveys, testing, or any combination thereof, among others. In particular, the data can be derived from structured sources. In another example, the data can be derived from unstructured sources. The data can be transformed and aggregated. In addition, the data can be cleaned. The resulting data can be stored in a data management system.

In an example, the system can also use streaming data sources where there is no intermediate data management system for the storage of aggregated data. Such a system is especially useful for big unstructured data sets (terabyte data) where the use of a rational database management system would be inefficient or economically unacceptable. In such an example, techniques such as Map/Reduce are applied based on Big Data processing systems like Apache Hadoop.

Once clean aggregated data is available, relationships between performance indicators and potential influencers can be determined and criteria for performance can be established, as illustrated at 2604. Such relationships permit projection of potential outcomes, which can be compared with the criteria to determine whether the business process is functioning well. In particular, the relationships can identify influencers that have a greater influence on one or more performance indicators.

As illustrated at 2606, outcomes can be projected. Projecting can include predictive analysis to determine what is to happen. Predictive analysis can include forecasting to determine what is to happen and in what time frame. In particular, such projection can include projecting the value of one or more performance indicators based on the determined relationships and expected values of influencers. In a further example, the future values of one or more influencers are projected, and the performance indicators are determined based at least in part on the future values of the one or more influencers. Projecting, and in particular, forecasting can be performed using an algorithm constrained with business rules. For example, the values of influencers or performance indicators can be constrained based on rules established by the business. In an example, one or more of the performance indicators are projected to violate one or more business criteria at future times. For example, the value of a performance indicator can cross a threshold at a future time step. In this way, the business process is provided with warning about a potential problem that may arise in the future.

The present system can also permit adjustment of future actions, as illustrated at 2608. For example, to determine a solution to a projected problem, the system can adjust, in an automatic mode or through manual adjustment, the future value of one or more influencers. The performance indicators can be projected using the adjusted influencer values to determine whether the problem is solved. In particular, the adjustment to influencer values can be made at one or more future time steps. As such, minor adjustments to an influencer value can be made during a series of time steps. In another example, a large adjustment can be made at a single time step closer to the projected violation of the business criteria. The process can be iterated to determine a particularly advantageous set of future actions that maintain the performance indicators at desired states. In particular, a performance indicator can be optimized by adjusting one or more values of the influencers. As used herein, optimizing is a process of adjusting values to meet or approach a criterion. Further, the process can be constrained based on business rules. For example, business rules can set boundaries to the values of influencers or performance indicators.

In addition, the future actions and data derived therefrom can be used to recalibrate the system. For example, new results relating actions taken can be used to inform the algorithm and selection of an algorithm. Other processes, such as iteratively adjusting or optimizing or root cause analysis, can be performed automatically or continuously in response to new data.

Figure 13:
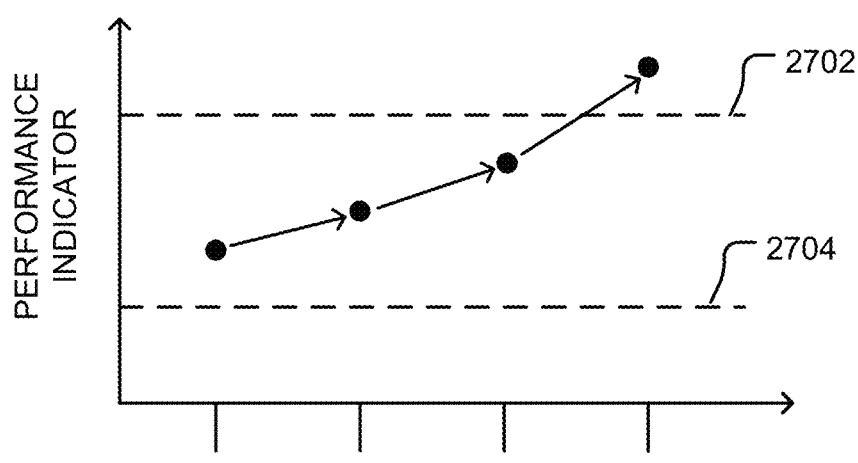
FIG. 13 includes a graph illustration of an exemplary relationship between a performance indicator and time.

To conceptually illustrate the iterations to determine a desirable set of future actions to maintain a business process in compliance with business criteria, FIG. 13 includes a graph illustration of the relationship between the value of a performance indicator and time. As illustrated, with each step in time, the value of the performance indicator changes. At the fourth time step, the value of the performance indicator violates a business criterion. The business criterion is illustrated as a threshold 2702. When the value of the performance indicator extends above the threshold 2702 or below the threshold 2704, the performance indicator has violated business criteria. Alternatively, the business criteria can be expressed as limits to a rate of change. In another example, the thresholds can have difference values at different times.

Figure 14:
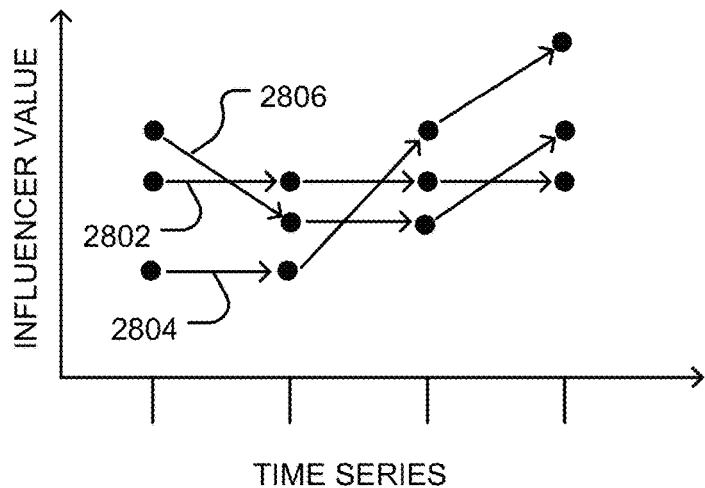
FIG. 14 includes a graph illustration of exemplary relationships between the value of influencers and time.

FIG. 14 illustrates expected influencer values over time. To more easily visualize a comparison, the values can be normalized. While a multiline chart is used to illustrate FIG. 14 for conceptual purposes, the influencer values can include categorical values, numerical values, or any combination thereof. For example, an influencer 2802 can have constant values at each of a series of time steps. In another example, an influencer 2804 can have values that increase with each subsequent time step. Alternatively, the value of an influencer can fluctuate with each time step. For example, an influencer 2806 can decrease in a first time step and increase at a subsequent time step. While the values of three exemplary influencers are illustrated, influencer values can be projected to increase, decrease, or remain the same with each time step in the time series.

In particular, the influencer values or categories can be projected based on known factors and prior history. For example, if call volume or hold time are considered influencer of customer satisfaction in a call center, it may be projected, based on past experience, that call volume and hold time increase during holiday seasons. In a field service process for a heating and air conditioning company, it may be recognized that service calls increase during summer months in Southern regions and increase in winter months in Northern regions. As such, embodiments of the present system can utilize manually set values of influencers, projected values of influencers, or any combination thereof.

Figure 15:
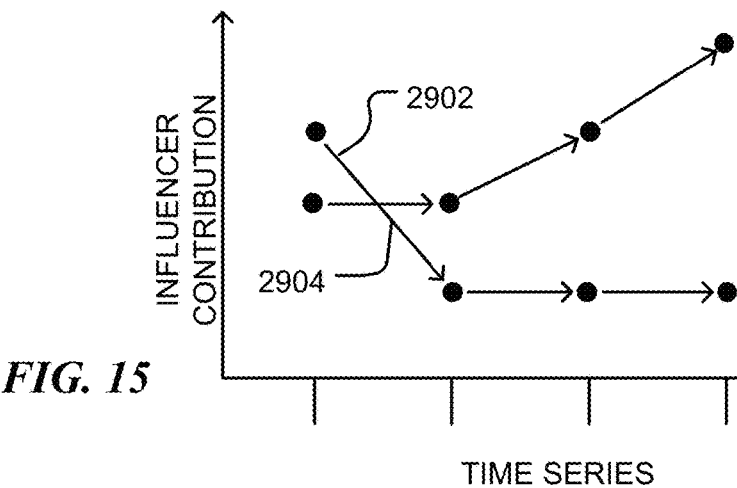
FIG. 15 includes a graph illustration of exemplary relationships between time and the contribution of an influencer to the value of a performance indicator.

Each influencer may contribute to the projected value of one or more performance indicators and each performance indicator may be a function of one or more influencers and time. In particular, determining the relationship of influencers and performance indicators includes determining the contribution of each influencer to the value of a projected performance parameter. Such conceptual contributions are in practice a model derived from data and relevant algorithms. FIG. 15 illustrates conceptually the contribution of two influencers to a projected performance indicator. In addition to the value of the influencer, the value of the performance indicator may be influenced by how much a particular influencer influences the value of the performance indicator at future time steps. For example, the contribution of an influencer 2902 to the value of a performance indicator may decrease over time. As illustrated, the value of influencer 2902 contributes significantly to the current value of the performance indicator. However, the value of the influencer 2902 contributes less to projected values of the performance indicator. In such an example, the influencer 2902 may not correlate with future values of the performance indicator. In contrast, the contribution of an influencer 2904 to the value of a performance indicator increases at subsequent time steps. For example, the value of the influencer 2904 can correlate strongly with the value of the performance indicator at a future time step.

Using the influencer values or categories, whether projected or manually set, and using the relationships of such influencer values or categories on future values of the performance indicator, the system can project performance indicator values or categories over a series of future time steps and iteratively adjust the influencer values or the occurrence of categories at future time steps to determine desirable changes to influencer values or categories at future time steps that maintain the performance indicators in balance with the business criteria.

Figure 16:
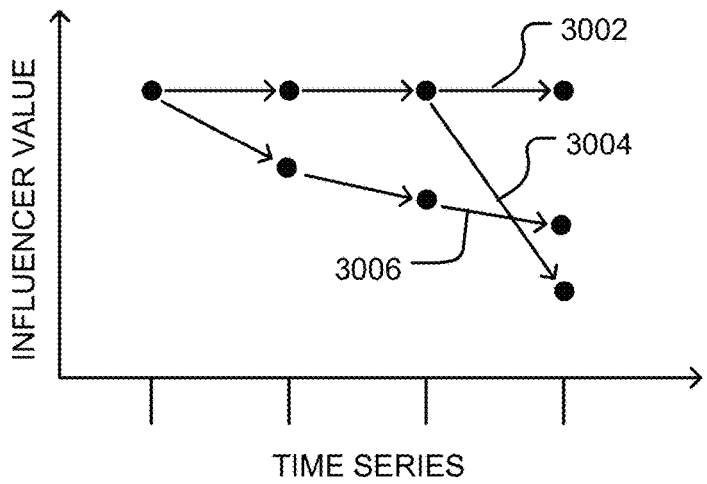
FIG. 16 includes a graph illustration of exemplary changes to the value of an influencer projected over time.

For example, FIG. 16 includes an illustration of sets of changes that can be made to the values of an influencer through a time series. In an example, the value of the influencer can be constant through time, as illustrated at 3002. Such a path (set of consecutive values of an influencer) may lead to a violation of a business criterion by performance indicators. To prevent violation of the business criterion, the influencer may be decreased at at least one future time step. For example, at a third time step the influencer can be reduced significantly, as illustrated at 3004, to prevent a violation. In another example, the influencer can be gradually reduced over a series of time steps, as illustrated at 3006. As such, different paths or sets of changes to an influencer value can be assessed to determine a preferred path that maintains the business process in compliance. In an example, such a path may be preferred because it is a lower cost solution or has advantages not present with other paths.

As such, embodiments of the present system can assist with determining a set of future actions (changes to influencers) that maintain a business process, as quantified by performance indicators, in compliance with business criteria. In other words, the present system can assist with determine which changes to make to a business process and when to make such changes.

Figure 17:
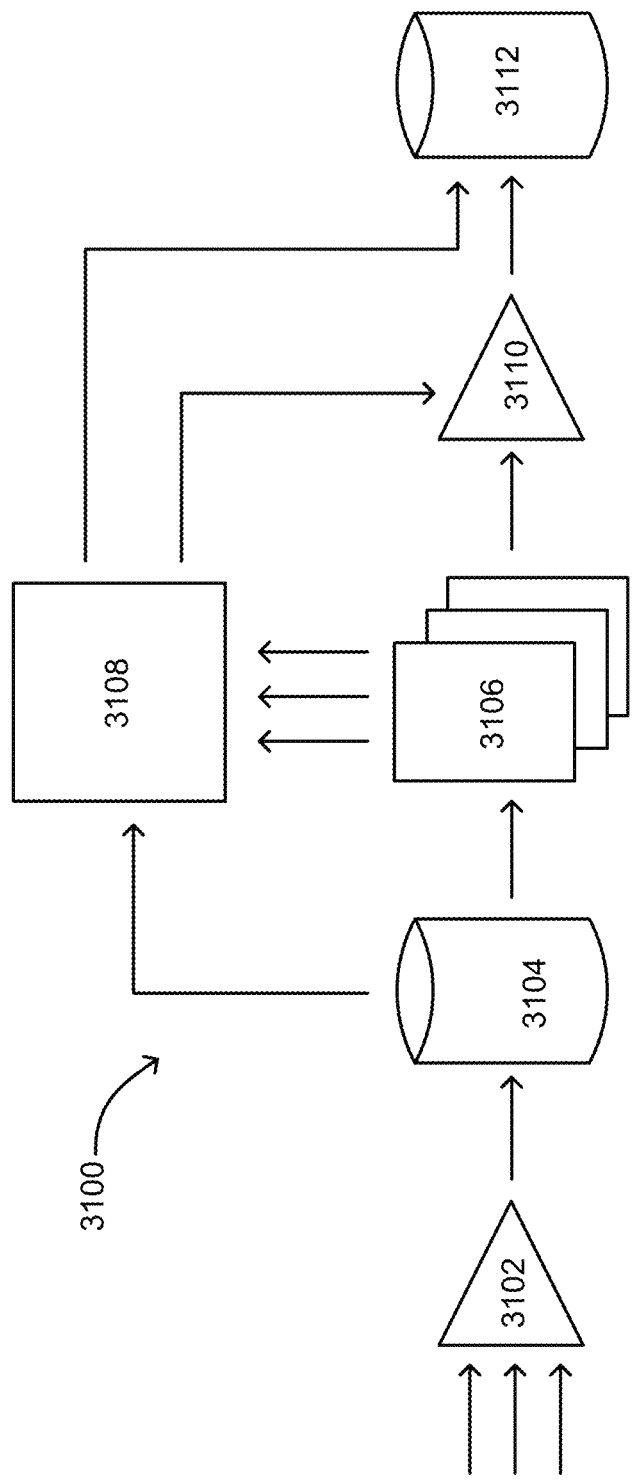
FIG. 17 includes an illustration of an exemplary process for predictive decision making.

In an embodiment illustrated in FIG. 17, the present system 3100 includes tools 3102 for processing raw data gathered from external sources. For example, the tools 3102 can assist with loading data from external sources, transforming the data into desirable formats, aggregating the data, and cleaning the data.

In particular, the data can be derived from structured sources, such as databases, tables, listings, or any combination thereof. In another example, the data can be derived from unstructured sources. Unstructured sources are sources that are interpreted using human or artificial intelligence and, for example, include video sources, audio sources, narrative text, or any combination thereof. Narrative text includes, for example, articles, blogs, emails, and other writings in prose, such as those available via the internet or electronic sources. Further, unstructured sources can include documents having narrative text and including enriched formatting, such as tags. For example, the unstructured source can include a narrative text document formulated in a hypertext, XML or tagged format. Once processed, the data is stored, for example, in a data management system, such as a database 3104.

The data and a set of algorithms 3106 can be used to prepare models. Algorithms 3106 can take the form of heuristics or the form of algorithms to form regression models, Markov chains, time series models, state space models, Bayesian models, neural networks, or any other appropriate model, or any combination thereof. In particular, exemplary algorithms 3106 include autoregressive integrated moving average (ARIMA), seasonal ARIMA (SARIMA), autoregressive conditional heteroskedasticity (ARCH), or generalized autoregressive conditional heteroskedasticity (GARCH), among others. The data can be applied though the algorithms 3106 to provide relationships and models between influencers and performance indicators, which can be validated against a test set from the original data, at validation 3108. Validation 3108 results can be used by selector 3110 to select a preferred model 3106. The model is assembled and stored in a model management system 3112, through which performance indicators can be projected and desirable paths of influencer values determined.

Figure 18:
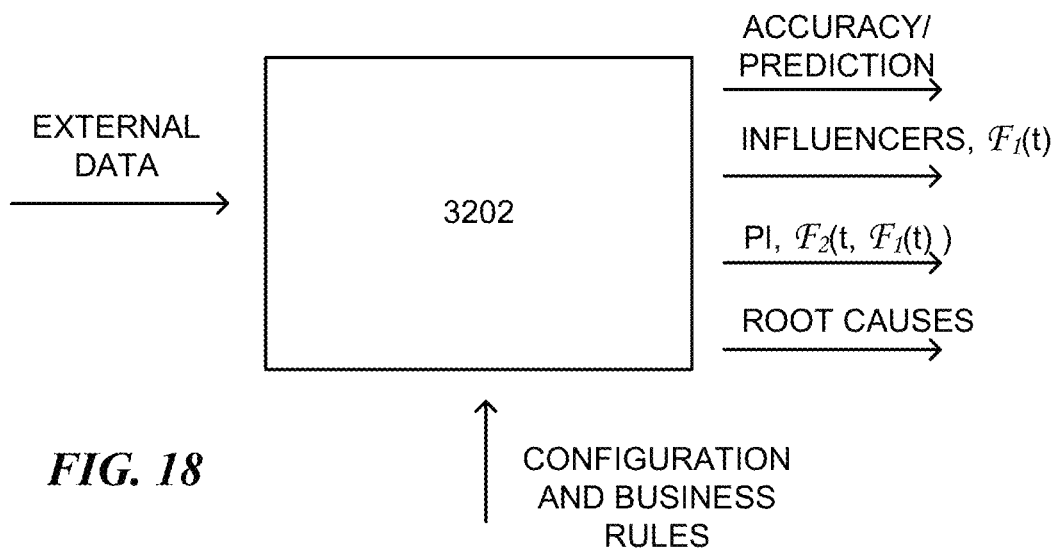
FIG. 18 includes an illustration of an exemplary process and aspects of predictive decision making.

Once prepared, embodiments of the present system can apply new external data, in addition to existing data, to project the values of influencers and performance indicators. As illustrated in FIG. 18, external data can be applied to a portion 3202 of the system to project the value of influencers and performance indicators over a set of future time steps. The portion 3202 can include the functions described in relation to FIG. 17. A user may configure the system, establishing, for example, a period over which projects are to be made, and other parameters associated with the system. In addition, embodiments of the system can assist with ranking a set of influencers based on their contribution to a particular performance indicator. A small change in a high ranking influencer may have a greater effect on a performance indicator than a large change in a low ranking influencer. Such a ranking can be used to perform root cause analysis. Further, the system can be tested for accuracy based on the model.

Figure 19:
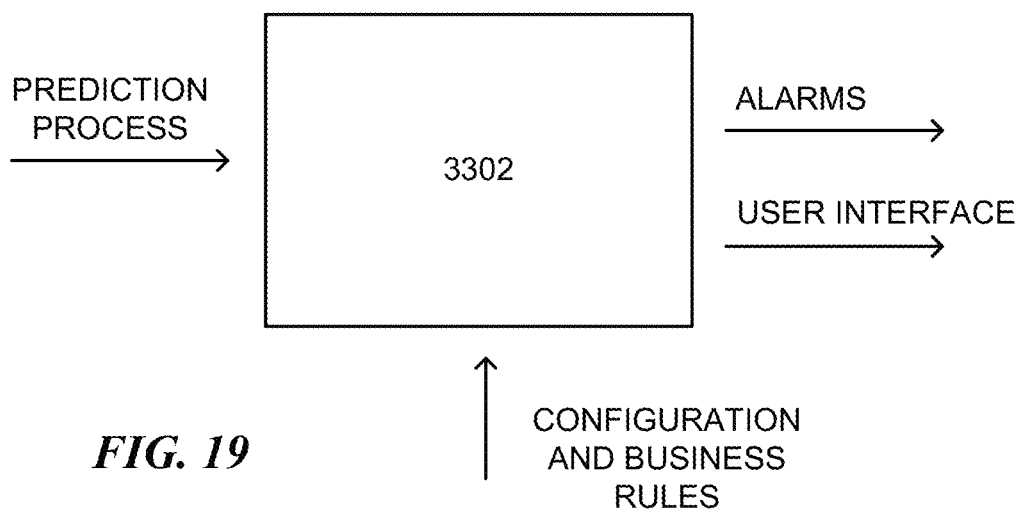
FIG. 19 includes an illustration of an exemplary process for implementing business criteria.

In another embodiment illustrated in FIG. 19, a portion 3302 of the present system projects performance indicators that can be used to monitor the performance of a business process. For example, a user may provide configuration information, such as time period, business criteria and other system constraints. Exemplary business criteria can include constraints for influencers and performance indicators, thresholds for performance indicators, or any combination thereof, among others. The projected performance indictors can be compared to the business criteria. As a result, the system may alert a user to potential future problems. Such an alert can include changes in a user interface, audible alarms, or any combination thereof.

Figure 20:
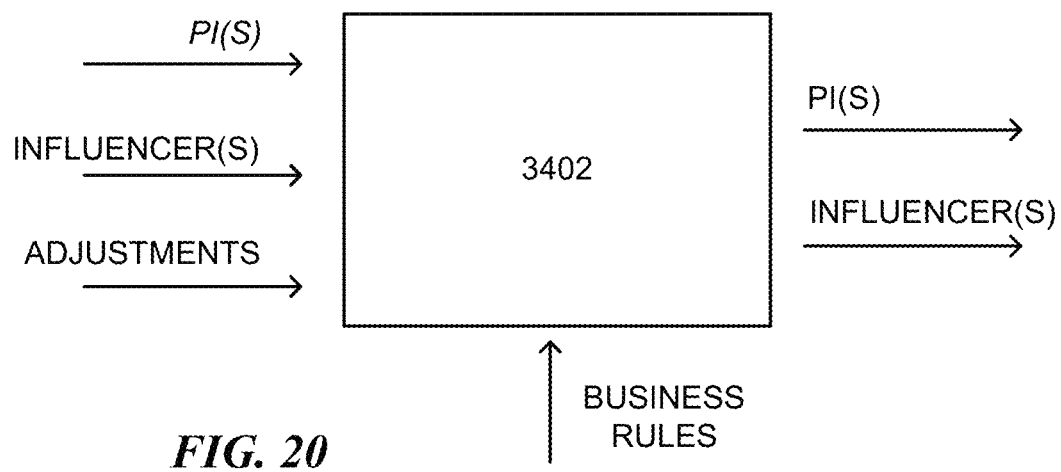
FIG. 20 includes an illustration of an exemplary process for testing scenarios.

In a further embodiment illustrated in FIG. 20, a portion 3402 of the present system can be used to test scenarios. For example, projected performance indicators and influences, in conjunction with proposed future adjustments to the influencers can be used to project a new set of performance indicators and influences, projected over a series of time steps. As illustrated, influencers are represented by $F_1(t)$, and performance indicators are represented by $F_2(t, F_1(t))$, implying that the performance indicators are a function of both time and the time dependent influencers. In conjunction with the scenario process, a user may be provided with a user interface to selectively establish a set of future changes to influencer values or create a revised influencer path. The projected new performance indicators and influencers can be reviewed to determine whether the revise influencer path maintains the performance indicators within a desired state, while also providing advantages relative to other paths. In a further example of portion 3402, the user can also change the business rule values at different time points to facilitate a solution, for example, if a viable solution cannot be found by the user with the current constraints.

Figure 21:
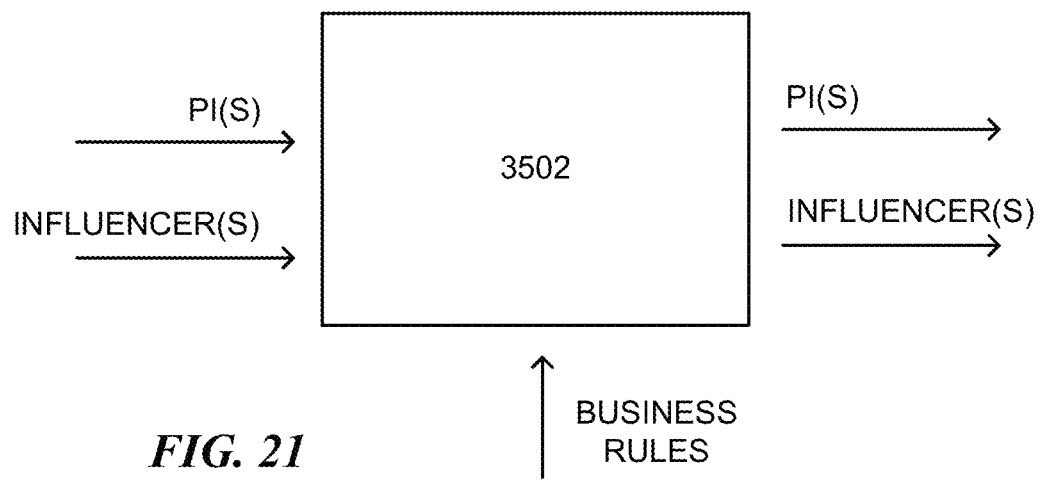
FIG. 21 includes an illustration of an exemplary process for determining a set of future adjustments.

In an additional embodiment illustrated in FIG. 21, a portion 3502 of the present system can be used in a process to determine a preferred influencer path. For example, influencer values and projected performance indicators, in conjunction with business rules, can be used in an iterative process to determine a preferred path for each influencer. Such an iterative process can be automated. In an example, the business rules can include constraints on influencer and performance indicator values, thresholds and other criteria, as well as goals to be achieved by the iterative process. An exemplary goal can be to find a low cost preferred path, to find a path with few changes to influencer values, to find such preferred paths given additional constraints on influencer values, or any combination thereof. In a further example of portion 3502, the user can also change the business rule values at different time points to facilitate a solution, for example, if a viable solution cannot be found by the user with the current constraints.

Figure 22:
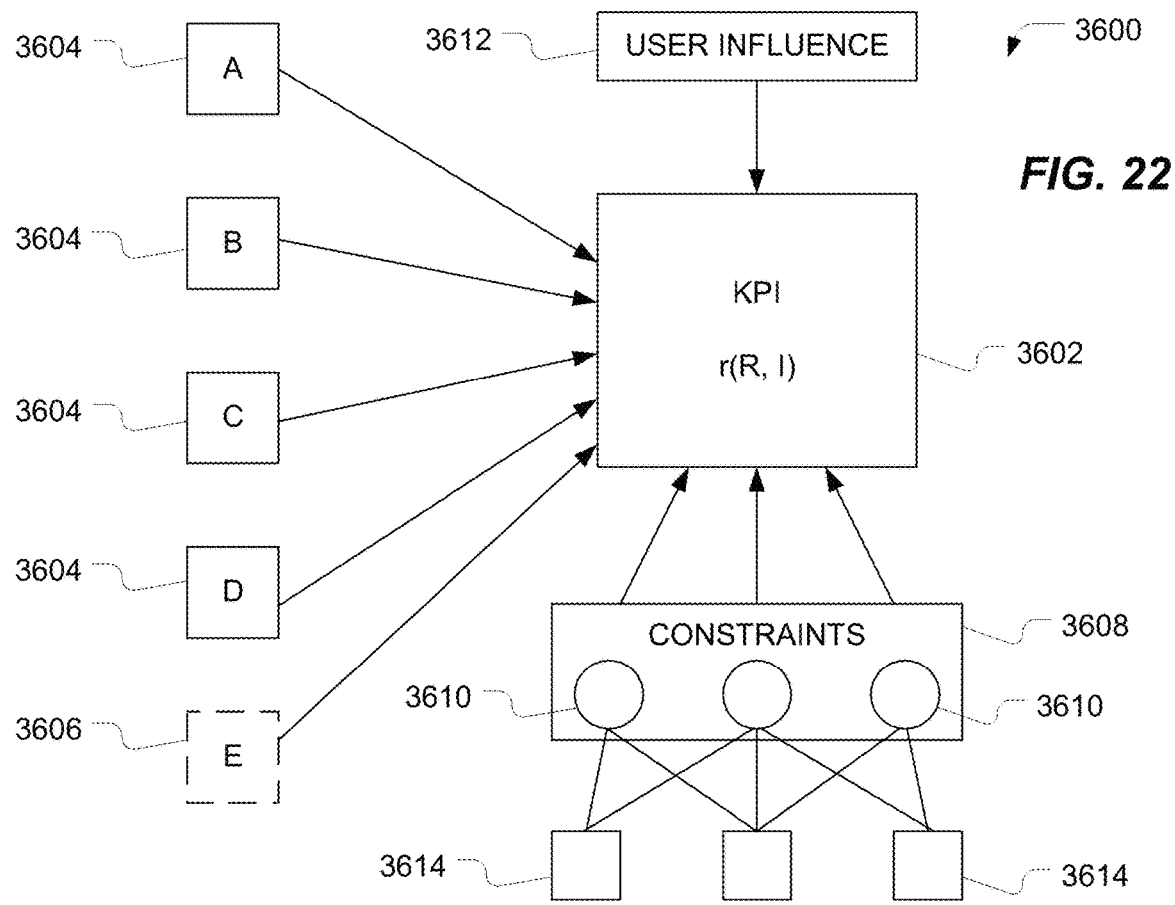
FIG. 22 and FIG. 23 include illustrations of exemplary methods for determining key performance indicator values.

In further explanation of the system, key performance indicators 3602 are influenced by influencers 3604 as constrained by constraints 3608, as illustrated in FIG. 22. Further, a user 3612 can influence the relationships established between constraints (R) and influencers (I). For example, a user can select parameters, a type of model, or other factors that influence how a relationship (r) is established between the influencers 3604, the constraints 3608, and the KPI 3602.

Such a relationship (r) permits the determination of the KPI 3602 at one or more future time periods based on present and future values of influencers 3604 subject to constraints 3608. In addition, such a relationship (r) is useful for determining the influence of small changes in the influencers 3604 on the KPI 3602 at a selected future time. As a result, root cause analysis can be performed specifically for the selected future time or generally across time periods. In addition, the system can automatically or iteratively determine a set of actionable tasks including changes to influencer values over time to provide future KPI values 3602 that do not violate business rules, subject to constraints 3608. A business rule may be a constraint. Alternatively, a business rule may be different than a constraint. In a further example, a user can manipulate one or more future values of a selected influencer 3604 to determine the effect on the future value of a key performance indicator.

The constraints 3608 can take a variety of forms including box constraints, functional constraints, quantized constraints, step constraints or any combination thereof. The constraint may not be static over time. In particular, the system can indicate that a constraint is to be changed based on auxiliary data. As a result, a constraint may evolve over time, providing an indication of new business rules or a new paradigm discovered through data provided to the system. For example, a range associated with a box constraint can be changed when a value of the KPI or an influencer is frequently in violation of limits of a box constraint. Such sticking to an upper or lower constraint can indicate that a more optimal solution is found in a different range of the influencer value. When the constraint is a function, the form of the function or the parameters associated with the function can change over time as data is provided to the system. Such constraints can also be a relationship based on business rules and performance indicators. In an additional example, a constraint can limit the range of an associated influencer based on the temporally adjacent values of the associated influencer. In an example, constraints 3610 are each influenced by external data 3614. As external data is provided to the constraints 3610, constraints may change or may provide a user with an indication that the constraint should be reconsidered. In such a manner, new business rules can be discovered, preconceived notions of doing business can be reevaluated, and adjustments to the constraints can be considered.

Determining whether to change a constraint or other rules within the system can be performed utilizing meta-rules. Meta-rules can apply a generalize rule to constraints based on the type of constraint or the behavior of data associated with the constraint. For example, when a prescribed influencer is at the top or the bottom of a box constraint for a set number of times, the system may indicate that the constraint should be reconsidered. In another example, when an influencer exhibits erratic changes providing a high variance in influencer values, the absence of a constraint or a preference for reconsidering constraints may be indicated. In such a manner, business rules and other constraints can be adaptive, compensating for changes in a business environment.

In a further example, analysis by user 3612 can influence the nature of the relationship. Using techniques, such as Bayesian networks, can indicate whether additional influencers should be included in the relationship (r). For example, analysis of the system may indicate that an additional influencer 3606 should be provided to establish a relationship (r) for determining future KPI values. As such, the system may assist with building a relationship model, selecting appropriate influencers, and introducing or removing influencers as a business environment changes or the influencers lose influence on the KPI.

Figure 23:
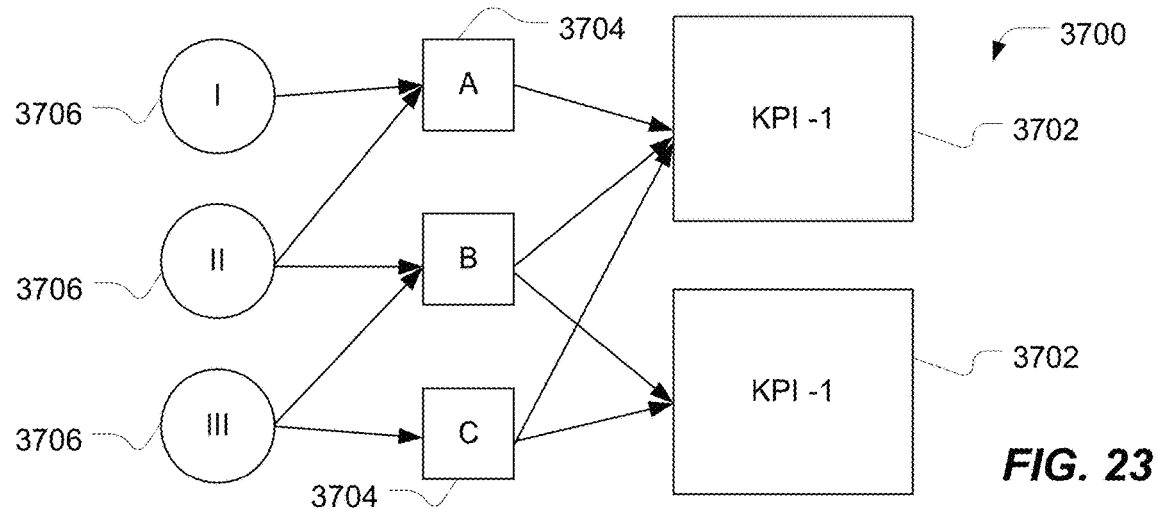

Such networks may be further utilized to translate actions 3706 into influencers 3704 that are used in relational models to determine values of the performance indicators 3702, as illustrated at FIG. 23. In particular, exemplary action hierarchies may combine user actions 3706 into differing influencers 3704 that provide relationships for determining future values of key performance indicators. In this way, the system 3700 can provide a way of translating actionable business actions to future values of key performance indicators using intermediary influencer values. When influencer values are determined for a future actionable pathway, actions 3706 can be determined from influencers 3704 and implemented by a user.

The future value of an influencer may also be limited by values of temporally neighboring future values. For example, an influencer at a first future time can limit the value of the influencer at a second future time. Such a limit may be expressed based on step limits (e.g., maximum permissible change). In another example, the limit may be expressed as a function of time. For example, limits on the value of an influencer can change based on time, either relative or according to a calendar.

When limits to influencer values are a function of time or other influencer values, optimization to achieve a desired key performance indicator value can take longer to implement. For example, when an influencer value is functionally constrained based on time, changing the value of the influencer to a substantially optimal value may be prevented until the functional constraint permits the influencer to have the substantially optimal value.

In a further example, the relationships for predicting the KPIs can be recalibrated. In particular, a trigger rule may be evaluated when new data is received. For example, a predicted value of a KPI can be compared to an actual value and when the difference is significant, such as beyond a threshold, recalibration can be triggered.

Recalibration can include adjusting parameters of a model based on new data. The system may also determine that the previous model no longer reflects the relationships between influencers and performance indicators. A model can be restructured to better reflect the relationships. In another example, a new influencer can be added to the model. In a further example, a new type of algorithm or model can be selected and the parameters determined for the new type of algorithm or model based on the new data and past data. Once recalibration is performed, the system can provide an updated prediction, root-cause analysis, or prescription.

Further, the system can provide a warning when suggested actions are not implemented. For example, when the system predicts that a future value of a key performance indicator will be in violation of a business rule and prescribes an action and when new data indicates that the action was not implemented and the key performance indicator will be in violation of the business rule, the system can provide an indication or send a message to a supervisor indicating that the actions were not taken. For example, an indication can be displayed on an interface device, sent via email, sent as a text message, or provided as a voicemail.

Figure 34:
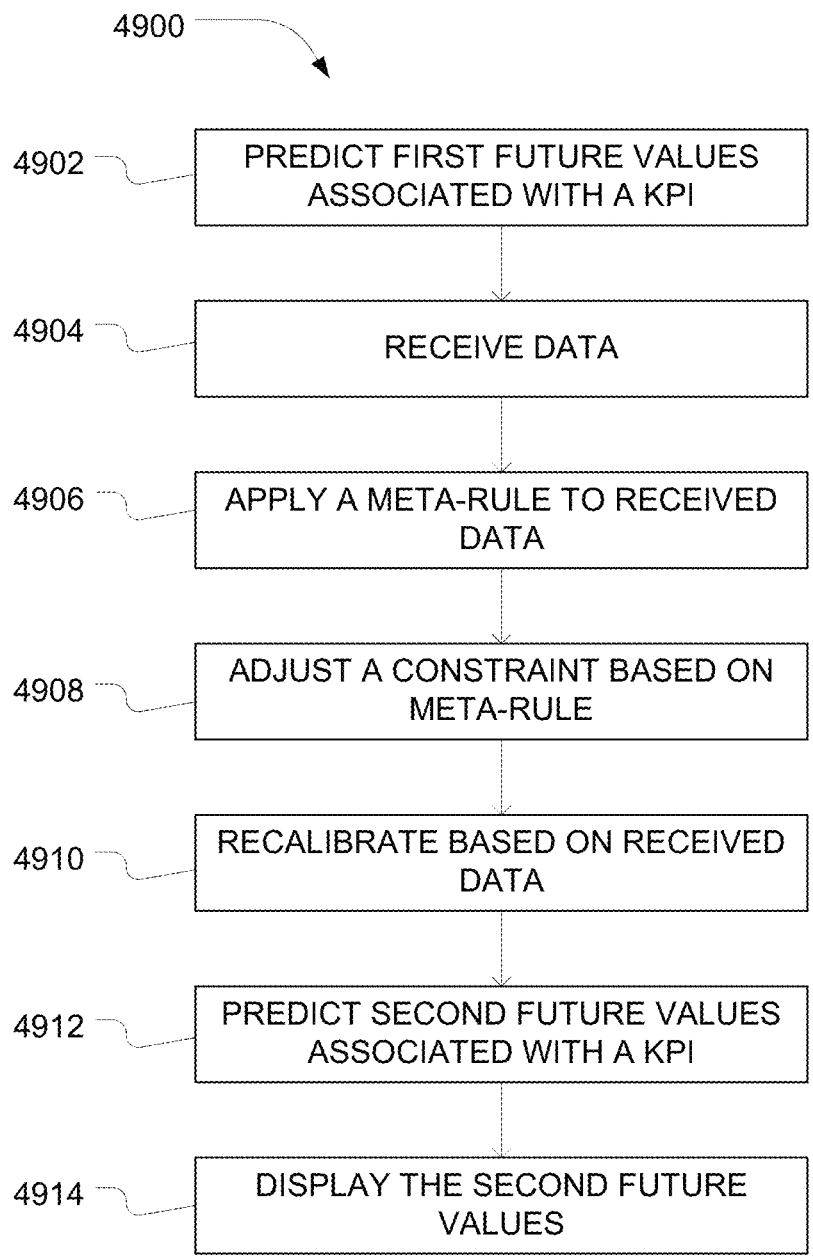
FIG. 34 includes a block flow diagram of an exemplary method.

In a particular example, FIG. 34 includes an illustration of an exemplary method 4900 for adjusting a model or a constraint associated with the model. As used herein, a model is a mathematical or statistical relationship between at least one influencer and at least one key performance indicator (KPI) and time. Using the model, a first set of future values of a KPI at a first set of future times is predicted, as illustrated at 4902. Such predictions utilizes a set of influencer values including present influencer values and future influencer values.

As illustrated at 4904, data is received. Such data can be associated with the predicted KPI values, such as the actual values achieved. As illustrated at 4906, the data can be applied to a meta-rule, such as the meta-rules described above, which may trigger adjustment of a constraint, as illustrated at 4908.

The received data can also trigger recalibration of the model, as illustrated at 4910. For example, a comparison between the predicted future values of the KPI and the actual values of the KPI can trigger recalibration.

Upon adjustment of the constraint or recalibration of the model, a second set of future values of the KPI at a second set of future times can be predicted, as illustrated at 4912. The second set of future values can be displayed on a display device, as illustrated at 4914.

The present system can be implemented in a computer system including at least a processor and access to memory. In addition, aspects of the process can be presented to a user through a user interface, such as a graphical user interface, as described in more detail below.

Embodiments of the present invention provide an apparatus and method whereby even user who is relatively untrained in mathematics can interactively and intuitively (i) investigate projected future behavior of performance indicators, (ii) investigate what are projected to be the causes of this behavior; and (iii) probe hypothetical scenarios whereby, in response to modified organizational behavior, the projected performance indicator "outcomes" change.

FIG. 1 illustrates one embodiment of a digital computer 1200 including a processor 1180. Processor 1180 is shown coupled to a memory 1160, a non-volatile storage 1210 (for example, a flash memory or a hard disk), a video display device 1184, one or more user input device(s) 1190, and a network interface 1150 such as a network interface card. It is appreciated that not every element is required in every embodiment.

Processor 1180 may be configured to execute instructions and to process data according to a particular instruction set architecture (ISA). In one embodiment, processor 1180 may be configured to implement an x86 compatible ISA, although in other embodiments it is contemplated that any desired ISA may be employed, such as the SPARC V9 ISA, PowerPC compatible ISAs, or MIPS compatible ISAs, for example. (SPARC is a registered trademark of Sun Microsystems, Inc.; PowerPC is a registered trademark of International Business Machines Corporation; MIPS is a registered trademark of MIPS Computer Systems, Inc.).

In various embodiments, memory 1160 may comprise any suitable type of non-transitory and tangible system memory as described above, such as FB-DIMM, DDR, DDR2 or above, SDRAM, or RDRAM, for example or any other types of volatile memory. Memory 1160 may include multiple discrete banks of memory. Also, in some embodiments, memory 1160 may include multiple different types of memory.

In some embodiments, computer 1200 may include more than one instance of the devices shown, such as more than one processor 1180, for example. In various embodiments, computer 1200 may be configured as a rack-mountable server system, a standalone system, or in any other suitable form factor. In different embodiments, computer 1200 may be configured as a client system or as a server system.

In one embodiment, processor 1180 may be configured to run operating system software such as Microsoft Windows, IBM AIX or Sun Microsystems Solaris. Operating system software may in turn provide an environment in which processor 1180 may execute additional software modules in the form of applications, programs, or processes designed to perform specific functions. Running operating system software or software modules may comprise executing instructions that are stored in memory 1160. As shown in FIG. 1, a client or server application process(es) 1162 (for example, whose execution by processor(s) 1180 is operative to cause computer(s) 1200, display device 1184 to carry out any presently-disclosed routine in accordance with user input received by user input devices) 1190) resides in the memory 1160.

Although a single computer is illustrated in FIG. 1, it is appreciated that any presently disclosed technique may be carried out using multiple computer(s), for example, operatively linked over a LAN or a WAN or in any other manner.

In a networked deployment, the computer system may operate in the capacity of a server or as a client user computer in a server-client user network environment, or as a peer computer system in a peer-to-peer (or distributed) network environment. The computer system can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system can be implemented using electronic devices that provide voice, video or data communication. Further, while a single computer system is illustrated, the term "system" shall also be taken to include any collection of systems or sub-systems that individually or jointly execute a set, or multiple sets, of instructions to perform one or more computer functions.

As shown, the computer system may further include or be operatively linked to a display device 1184, such as a liquid crystal display (LCD), an organic light emitting diode (OLED), a flat panel display, a solid state display, a cathode ray tube (CRT), a projector, a printer or another now known or later developed display device for outputting determined information. The display may act as an interface for the user to see the functioning of the processor, or specifically as an interface with the software stored in the memory or in the drive unit. In some embodiments, display device 1184 resides in a common housing with computer 1200 (for example, in a laptop computer chassis). Alternatively or additionally, display device 1184 may be provided in a housing separate from the housing of computer 1200.

Examples of user input device(s) 1190 include but are not limited to mouse devices, keyboard(s), joysticks, and touch screens, and microphones (i.e. for embodiments related to voice-commands). In some embodiments, more than one user input device(s) 1190 are provided—for example, a keyboard and a mouse. In some embodiments, user input device 1190 resides in a common housing with computer 1200 (for example, in a mouse pad of a laptop). Alternatively or additionally, user input device 1190 may be provided in a housing separate from the housing of computer 1200—for example, coupled via a USB or PSI2 interface.

The present disclosure relates to tools and techniques for computing data related to predicted KPI values, and to novel user interfaces (for example, interactive user interfaces) for displaying information related to predicted KPI values. The following published patent documents provide potentially relevant background art, and are each incorporated herein by reference in their entirety: U.S. Pat. Nos. 7,373,633, 6,876,988, US 20090064025, US20060010164, US20060242035, US20060242033, US20080195440, US 20080183786 and US 20080201397. All cited documents are incorporated herein by reference in their entirety.

Although the apparatus and methods disclosed herein apply to any set of KPIs, certain techniques will be explained, throughout the document, with reference to a non-limiting Use Case 1 associated with KPIs and influencers (explained below). A "key performance indicator" (KPI) is a metric describing performance of a business (or business process) during a period of time.

In the present section, two non-limiting Use Cases are described. The skilled artisan will appreciate that these use cases are presented as specific examples, and may be modified. The skilled artisan will also appreciate that these use cases are not intended as limiting whatsoever, and are presented only as a small set of examples to which presently-disclosed techniques may be applied.

Use Case 1: Contact Center

SearchCRM.com defines a contact center as follows:

A contact center (also referred to as a customer interaction center or e-contact center) is a central point in an enterprise from which all customer contacts are managed. The contact center typically includes one or more online call centers but may include other types of customer contact as well, including e-mail newsletters, postal mail catalogs, Web site inquiries and chats, and the collection of information from customers during in-store purchasing.

The same source, SearchCRM.com, defines a call center as follows:

A call center is a physical place where customer and other telephone calls are handled by an organization, usually with some amount of computer automation. Typically, a call center has the ability to handle a considerable volume of calls at the same time, to screen calls and forward the calls to someone qualified to handle them, and to log calls. Call centers are used by mail-order catalog organizations, telemarketing companies, computer product help desks, and any large organization that uses the telephone to sell or service products and services.

For a firm, a contact center handles both inbound and outbound communication with its customers and other constituencies.

The present use case (i.e., Use Case 1) relates on a Technical Support Call Center as an example of a scenario where there is a need for tools that compute and display predictions of KPI-related data (for example, interactive tools). In the present use case, the customers call the manufacturer, whose products are serviced by the Technical Support Call Center. When these customers call the manufacturer, the customers receive help for the technical problems they are experiencing with the products that they have purchased from this manufacturer.

Before discussing various KPIs for this use case, a high level view of 'raw' data available from an exemplary Technical Support Call Center is presented. As will be discussed below, the relevant KPIs for this use case may be derived from this 'raw data.'

In the present example, the pertinent 'raw' data from this contact center includes, but is not limited to: (A) phone switch data; (B) customer relationship management (CRM) data; (C) dispatch data; (D) survey data; (E) human resources (or payroll) data; (F) marketing data; (G) market data; and (H) workforce management data.

(A) Phone Switch Data—Every time a customer calls this Technical Support Call center, a new record is automatically (i) captured in the phone switch (e.g. an Automatic Call Distributor) and (ii) stored in the phone switch database. The call first waits in the phone switch wait queue. If the call waits too long in the queue the customer may hang up and thus, the call abandonment occurs. If the call succeeds, a few fields regarding the call are captured.

Information about both the successful and abandoned calls are recorded. Example fields recorded include:
(i) Talk Time—How long the call was in a taking state.
(ii) Hold Time—How long the call was on hold.
(iii) Call Duration—How long it took for the complete processing of the call.
(iv) Work Time—Represents the after-call work time associated with the call.
After-call work includes post-call activities such as completing paperwork or consulting with associates, etc.

Sometimes the data generated in the phone switch is transformed to generate new Fields/datasets. For example, the call-by-call data can be clubbed (through averaging, summation, or other transformations) in a half-hourly or hourly granularity to form time-series metrics. Examples for half-hourly granularity include:
(i) Average Queue Time—Average delay in the queue for calls to the service during the half-hour interval;
(ii) Call Abandonment Rate—Number of calls abandoned in queue for the service during the half-hour interval;
(iii) Service Level—% of calls belonging to a half-hour interval, answered within a time, e.g. 30 Seconds (B) Customer Relationship Management (CRM) data—The Technical Support Call Center may use CRM software to store and capture information about customers, interactions, issues, and products. Each time a customer has a contact with this call center regarding a problem (old or new) in the customer's system, the agent creates a new entry about the issue in the CRM software application.

(C) Dispatch Data—Such a Technical Support Call Center stores detailed information about each part dispatch, corresponding to a part replacement in the customers system.

(D) Survey Data—To know the customers' views on service and products, contact centers sometimes organize for customer feedback programs. Survey methods include Email, Post-Call IVR (i.e., Interactive Voice Response), Mail, Telephone, etc. Such a Technical Support Call Center conducts email surveys to get the customers' perspectives on the service being provided by this Call Center. Examples of the data these surveys gather include:

(i) Customer Satisfaction: Customer's overall satisfaction with the call to the Technical Support;
(ii) Agent Satisfaction: Customer's satisfaction with the agent's communication skill, expertise in problem troubleshooting and problem resolution, ownership of the issue, etc.;
(iii) Problem resolution: Whether the customer considers the problem to be resolved;
(iv) Brand Satisfaction: Satisfaction with the manufacturer's brand;
(v) Repurchase Likelihood: How likely would the customer be to repurchase from the same manufacturer;
(vi) Recommend Likelihood: How likely would the customer be to recommend to a friend or colleague the manufacturer from which the customer bought his system;
(vii) Number of Contacts: The number of times the customer had to contact this Technical Support Call Center to get the same problem resolved completely;
(viii) First Contact Resolution: Whether the customer's problem was resolved in the first contact to this Technical Support Call Center. This answer is typically derived from Problem Resolution and Number of Contacts.

(E) HR (or Payroll) Data—This data source contains information about the agents and a few items can be derived from it such as:
(i) Agent Tenure: Denotes how long the agent has been in this center/profession;
(ii) Agent Salary: Agents hourly rate of pay and benefits;
(iii) Agent Education Level: The number of years of schooling the agent has.

(F) Marketing Data—Such as data on discounts, promotions, advertising campaigns, etc.

(G) Market Data—Includes data on competitive products, benchmarks, econometrics, etc.

(H) Workforce Management (WFM) Data—Workforce Management software is employed by this Technical Support Call Center to plan, schedule, and manage the staffing of agents to effectively handle inbound call volume, in coordination with the phone switch. Example of WFM data includes Schedule Adherence and Occupancy.

The contact centers often categorize key performance indicators (KPIs) into different groups. Such a particular Technical Support Call Center uses the following major groupings: Customer Experience & Loyalty KPIs, Resolution KPIs, Productivity KPIs, Dispatch KPIs, and Cost & Revenue KPIs.

(A) Customer Experience & Loyalty KPIs—Such are KPIs whose values are obtained from the customer feedback (i.e., email survey) system. The email survey for such a Technical Support Call Center provides the customers with a scale system (such as 9-point, 5-point, 3-point) to respond to the questions in this group. These KPIs are typically categorical (ordinal) response variables in nature. Examples include:
1. Customer Satisfaction
2. Brand Satisfaction
3. Recommend Likelihood
4. Repurchase Likelihood
5. Agent Satisfaction (B) Resolution KPIs—Such KPIs are also usually derived from customer feedback (i.e., email surveys). For such a Technical Support Call Center, they represent whether or not (or within how many contacts) a customer's particular problem was resolved. Such KPIs are typically binary response variables in nature. Examples include:
1. Problem Resolution: Whether or not the problem was resolved.
2. Resolved-in-one-Contact (Ri1): Also called First Call Resolution. This KPI is derived from two other metrics as follows: it is 'True' if Problem Resolution is 'True' and the number of times the customer had to call for the same issue is 1.
3. Resolved-within-two-Contacts (Ri2): This is also a derived KPI. It is a 'True' if Problem Resolution is 'True' and the number of times the customer had to call for the same issue is <=2.

(C) Productivity KPIs—Such KPIs measure contact center productivity. Such KPIs are typically metrical response variables in nature and are mostly derived from the phone switch (i.e., ACD) and workforce management system. Examples include:
1. Abandonment Rate
2. Average Hold Time
3. Average Talk Time
4. Average After Call Work Time
5. Average Queue Time
6. Average Handle Time
7. Service Level
8. Occupancy
9. Schedule Adherence (D) Dispatch KPZs—Such a Technical Support Call Center uses Dispatch KPIs to keep track of the parts being dispatched by its agents to resolve customers' issues. Examples of Dispatch KPIs include:
1. Repeat Dispatch Rate: Average rate of repeat dispatches within a specified time.
2. Material Value Per Dispatch: Average part cost per dispatch.
3. Dispatch Rate: Average number of dispatches per call.
4. Parts Per Dispatch: Average number of parts per dispatch (D) Cost & Revenue KPIs—Examples for such a Technical Support Call Center include:
1. Cost Per Call: Total operational costs divided by the total number of calls for a given period of time.
2. Revenue Per Call: Total revenue divided by the total number of calls for a given period of time.
3. Sales Conversion Rate: Number of sales made relative to the number of attempts made.

The KPIs may be influenced by one or more 'influencers.' For the present example, the influencers may include: Number of Contacts, Product Description, Brand Description, Reason Codes (i.e., issue description), Shipping Delay, Age of the System, Dispatch Sent, Hold Time, Local Queue Time, etc.

Use Case 2: Field Service

Field service can be defined as the maintenance and repair of equipment for a customer at the customer's location, according to warranty or other contractual agreements. In this particular example for such a use case, when a customer contacts a contact center for a service of his/her system, the contact center agent works with the customer to diagnose the problem. If the service requires a part to be replaced, the technician creates a dispatch order. The purpose of the dispatch is to send the part to a service provider to replace the failing component. When the dispatch order is processed and parts are available, the parts are sent to the service provider in the customer's location. A field technician from the service provider reaches the customer's site and replaces the parts and tests the customer's system for functionality. After the field technician completes the service, the service provider transmits notification back to the contact center and the service call is completed.

Feedback about the service provided is solicited from some customers who are serviced by the field delivery process. Information about a service call and corresponding feedback is accumulated in database records from which a set of KPIs and their influencers are identified.

Example Field Service KPIs include:

(i) Customer Satisfaction: Customer's overall satisfaction with the onsite service.
(ii) On-Time Arrival Satisfaction: Customer's satisfaction regarding the on-time arrival of the technician at the customer's location.
(iii) Professionalism Satisfaction: Customer's satisfaction regarding the field technician's professionalism.
(iv) Expertise Satisfaction: Customer's satisfaction regarding the field technician's expertise to resolve the customer's problem
(v) Service Time Satisfaction: Customer's satisfaction regarding the time required for the onsite service.
(vi) Status Update Satisfaction: Customer's satisfaction regarding the field technician's effectiveness in updating the customer on the status of the customer's problem
(vii) Problem Resolution: Customer's impression of whether his issue has been resolved by this technician visit to the customer's location
(viii) Repurchase Likelihood: How likely would the customer be to repurchase from the company from which he bought his system.
(ix) Recommend Likelihood: How likely would the customer be to recommend to a friend or colleague the company from which he bought his system.
(x) Resolved-in-one (Ri1): It denotes the percentage of cases the customer's issue was resolved in one visit of the field technician to the customer's site.
(xi) Resolved-within-two (Ri2): It denotes the percentage of cases the customer's issue was resolved within two visits by the field technicians to the customer's site.

Some examples of self-explanatory KPIs in field service include:
1. Time to close the call (i.e., from the creation to closure)
2. Length of onsite visit (i.e., time to service the equipment at the customer's site)
3. On-time-first-time fixes
4. On-time responses
5. First-time fixes
6. Open Calls (i.e., calls that are open after a predetermined period)

Examples of influencers for this example (i.e. Use Case 2) include:
1. Number of Onsite Visits
2. Issue Description
3. Tenure of the Technician
4. Certification Status of the Technician
5. Service Time (to resolve the customer issue onsite)
6. Metro Statistical Areas
7. Vendor Employing the Technician
8. Technician's Arrival Day and Time (at the customer site)
9. Deferred Status (of the customer visit)
10. Parts Delay, etc.

Towards this end, as will be discussed below with reference to FIG. 2, a tool is disclosed whereby the user may investigate answers to the following four questions:

1. What will happen, when? (i.e., by using a 'predictive dashboard') (Question 1 or Q1);
2. (ii) Why will it happen? (i.e., by using a 'root cause' interface); (Question 2 or Q2);
3. If something bad (or good) is predicted to happen, how can we avoid (or benefit from) it? (i.e., by using an 'optimization' interface) (Question 3 or Q3);
4. How will user-suggested changes affect the future? (i.e., by using a 'what-if interface) (Question 4 or Q4).

Figure 2:
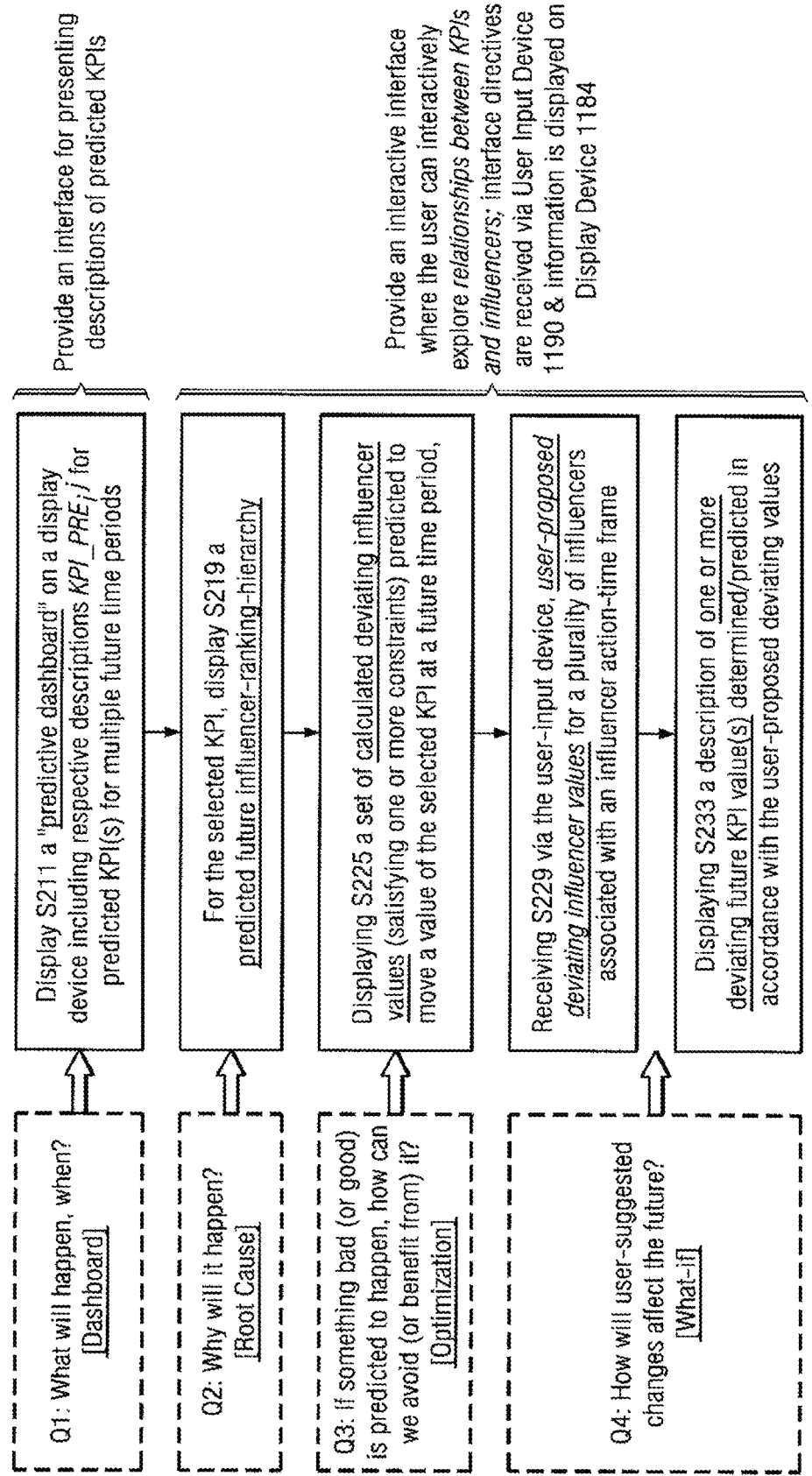
FIG. 2 is a flow chart of an exemplary technique for providing one or more interface(s) via which a user may interactively explore relationships between predicted key performance indicators (KPIs) and influencer(s).

FIG. 2 is a flow chart of an exemplary routine for providing one or more interface(s) via which a user may interactively explore relationships between predicted KPI(s) and influencer(s). Typically, the behavior of KPIs are influenced or governed, at least in part, by one or more influencers. As will be explained below, when a user interacts with the interface(s) provided by the routine of FIG. 2, information will be displayed on display device 1184—this information may help the user to answer four questions about future KPI behavior (both predicted actual behavior as well as hypothetical behavior): (i) Q1: what will happen, and when? [see step S211 and FIG. 31]; (ii) Q2: why will it happen? [see step S219 and FIGS. 4A-4D] (iii) Q3: If something bad (or, good) is predicted to happen, how can we avoid (or, benefit from) it? [see step S225 and FIGS. 5A-5C]; (iv) Q4: how will user-suggested changes affect the future [see step S229 where user-suggested changes are received via input device 1190, and step S233 where an indication of predicted consequences of the user suggested changes are displayed on display device 1184]?

Throughout the present disclosure, Q1 is an abbreviation for "question 1," Q2 is an abbreviation for "question 2," etc.

The steps associated with Q1 (step S211) and Q2 (step S219) facilitate diagnosis of the situation, while the steps associated with Q3 (step S225) and Q4 (steps S229, S233) provide decision support for a user who wishes to investigate options for modifying the situation—i.e., in order to prevent (or minimize) a problem from occurring or in order to explore how one may take advantage of an opportunity.

As will be evident from the description below, the presently-disclosed user-interfaces including interactive interfaces allow even a layperson to explore these questions without any need to understand the underlying mathematics.

In some embodiments, one or more digital computer(s) 1200 carry out the steps of the routine described below with reference to FIG. 9A in order to provide information displayed in step S211 (see, for example, the screenshot of FIG. 3), one or more digital computer(s) 1200 carry out the steps of the routine described below with reference to FIG. 9B in order to provide information displayed in step S219 (see, for example, the screenshots of FIGS. 4A-4D), one or more digital computer(s) 1200 carry out the steps of the routine described below with reference to FIG. 9C in order to provide information displayed in step S225 (see, for example, the screenshots of FIGS. 5A-5C), one or more digital computer(s) 1200 carry out the steps of the routine described below with reference to FIG. 9D in order to provide information displayed in step S233 (see, for example, the screenshots of FIGS. 7A-7E).

Predictive Dashboard: A Discussion of Step S211 of FIG. 2 and the Screen Shot of FIG. 3

In step S211 of FIG. 2, a "predictive dashboard" (for example, see FIG. 3) is presented to the user on display device 1184. For the example of FIG. 3, 11 KPIs are presented: Event satisfaction 110A, recommend likelihood 110B, satisfaction with agent 110C, brand satisfaction 110D, repurchase likelihood 110E, external problem resolution 110F resolved within one contact 110G, resolved within two contacts 110H, abandon rate 110I, hold time 110J and talk time 110K.

It is appreciated that presently-disclosed techniques may be applied to any set of KPIs and influencers, and are not restricted to the example KPIs and influencers presented in the background section. Nevertheless, for the sake of brevity, only certain use cases are described above. The KPIs and influencers of "Use Case 1" are described in detail with reference to FIGS. 3-7.

Figure 3:
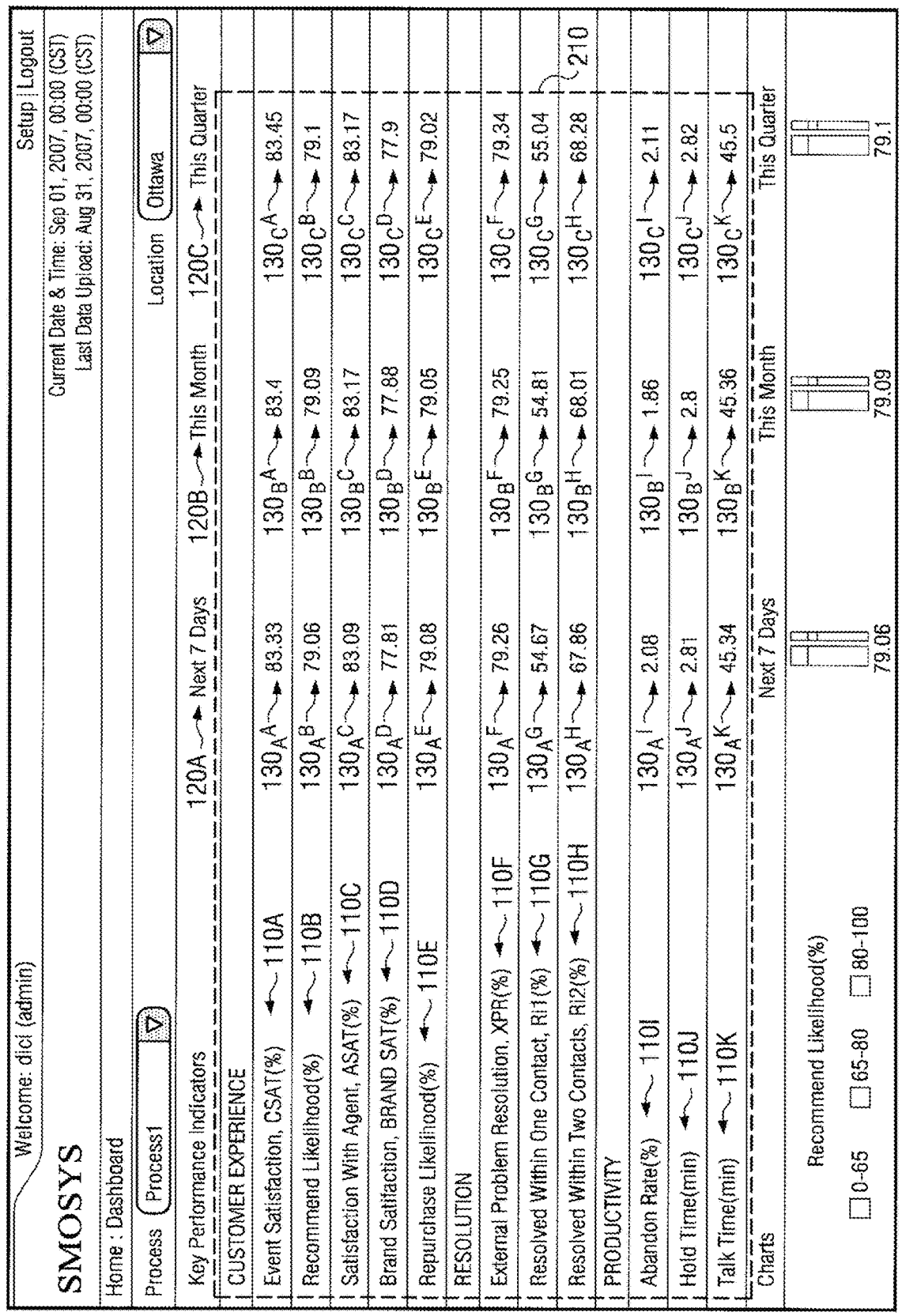
FIG. 3 is a screen shot of an exemplary predictive dashboard for a plurality of KPIs and a plurality of future time-frames in accordance with some embodiments.

The "predictive dashboard interface" of FIG. 3 allows a user to view predicted trends for multiple KPIs by presenting, to the user, an indication of each KPI value $KPI\_PRE_i^j$, $130_i^j$ (where PRE is an abbreviation for "predicted") for a plurality of different "dashboard" future time frames 120. In the example of FIG. 3, the predicted KPI values are presented for three "dashboard" future time frames: "next 7 days" (120A), "this month" (120B), and "this quarter" (120C)—it is noted that because the time frames "this month" and "this quarter" have not passed (i.e. they are still 'occurring' or 'in-progress') at the time of displaying the predictive dashboard, they are considered 'future time frames.' Furthermore, it is understood that for $KPI\_PRE_i^j$, 130; that the subscript i designates the $i^{th}$ future time period $120i$ and j designates the $j^{th}$ KPI $110j$.

As discussed below with reference to FIG. 9A, the predicted KPI values $KPI\_PRE_i$ may be determined by one or more computers 1200 in accordance with historical KPI-related data using one or more disclosed computational techniques or any other computational technique. The "historical KPI-related data" may describe the behavior, during a historical time period, of (i) one or more KPIs; or (ii) one or more "influencer(s)" known to or suspected to influence KPI value(s). The historical KPI-related data may be provided to digital computer 1200 in any manner, for example, via a batch or continuous data feed or in any other manner. "Historical KPI-related data" relates to data describing KPI(s) or influencer(s) for a time frame which has already been completed—i.e. not a future time frame.

Because indications 1302 of predicted KPI values KPI-PRE; are displayed for multiple time frames (i.e. in the example of FIG. 3, for the next 7 days 120A, this month 120B, and this quarter 120C), it is possible for the user to visualize, on display device 1184, a prediction of when particular KPI-related events (e.g., KPI(s) having certain values or being in certain value range(s)) are predicted to or forecast to happen.

Although explicit numerical values are displayed for each of the predicted KPIs for each time frame $KPI\text{-}PRE_i^j$, this is not a limitation—in some embodiments, some indication other than a numerical value may be displayed for one or more predicted KPIs values $KPI\text{-}PRE_i^j$—for example, an alphabetical indication or a color indication or a font size indication or any other indication of the numerical value.

It is noted that certain KPIs may be associated with preferred or target values or ranges. A predicted departure of a KPI value from one of these ranges may be indicative of a problem to be avoided (or an opportunity). Thus, in the non-limiting example of FIG. 3 which relates to the "Customer Contact Center" use case, it is desirable, for example, for the "Customer Experience" KPIs (i.e. the KPIs labeled as 110A-110E) to be above 80%—this indicates a "positive" customer experience. Any value below 80% might be a cause of concern (see the bottom of FIG. 3 under 'charts').

Thus, in some embodiments, the display device 1184 presents (in the predictive dashboard;—see for example, FIG. 3) an indication (i.e. numerical or otherwise—for example, a color indication) of a predicted relationship between the KPI value and the target value or range. In the event that the KPI is predicted to depart from the range at a given future time period, the dashboard interface may indicate this predicted KPI value departure.

Although this indication of a predicted out-of-range-KPI value can be useful, it is not always clear to the user what parameters or influencers are responsible for the predicted KPI value (i.e. for a particular future time frame), and the relative relevance of each of these parameters—i.e. the "root cause" of the KPI-related problem/opportunity.

Access to this information in step S219 (see the discussion below with reference to FIGS. 4A-4D) can assist the manager in targeting specific parameters or influencers for modification in a future time frame.

A First Discussion of Step S219 and FIGS. 4A-4D

Figure 4A:
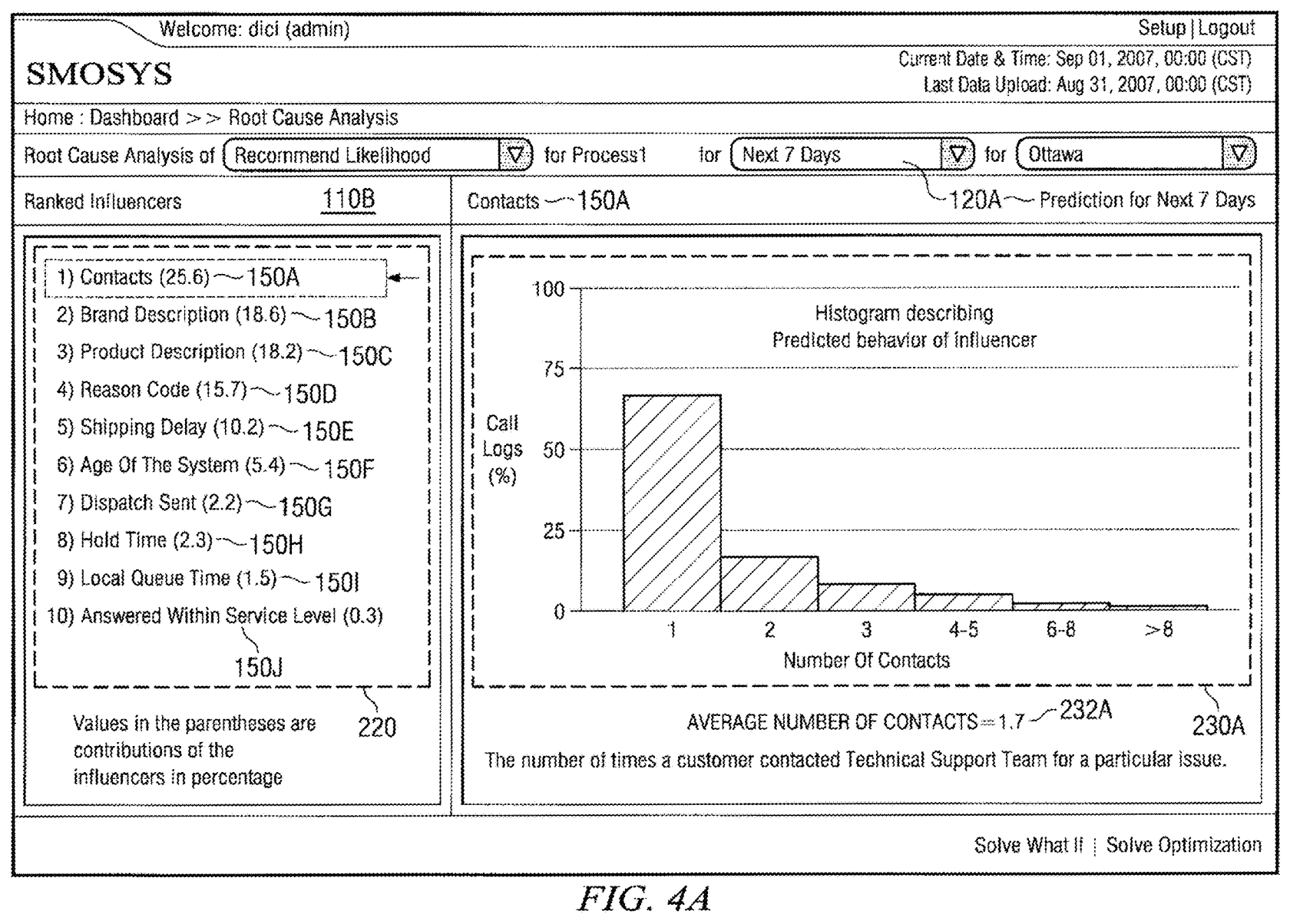
Figure 4C:
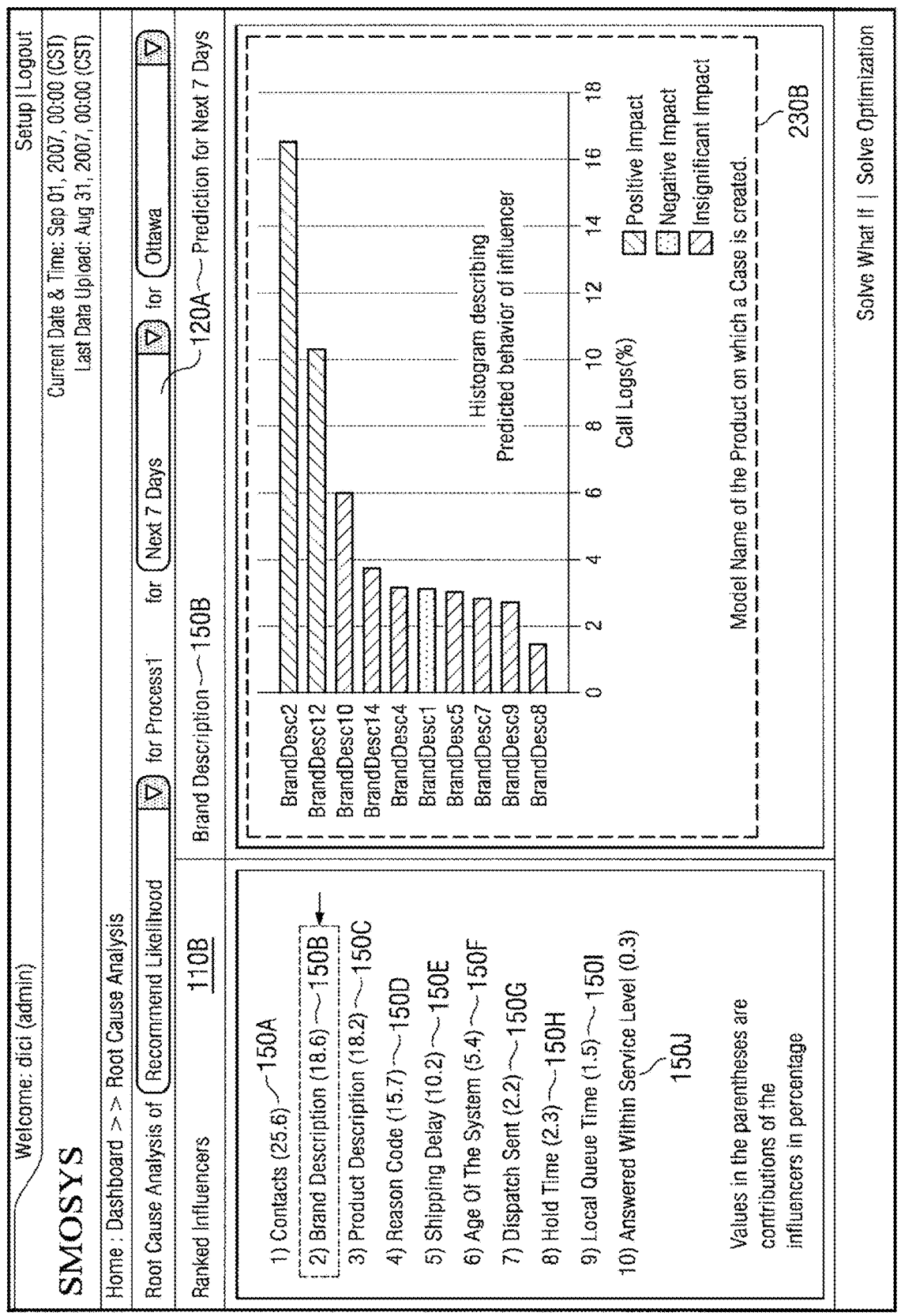

FIGS. 4A-4D are screenshots of an exemplary "root-cause" interface for displaying an indication of a "predicted future influencer ranking hierarchy" 220 for plurality of influencers 150A-150J for a target KPI (in the example of FIG. 4A, for recommend likelihood 110B) for a target future time frame (in the example of FIG. 4A, for the next 7 days 120A).

Thus, in the example of FIG. 4A, indications of relative magnitudes of influence contributions (i.e. the relative influence that the predicted value of each influencer has upon the predicted KPI value) of 10 influencers 150 upon the predicted future KPI value (i.e. in the case of 'recommended likelihood' and 'next 7 days' the predicted future value is 79.06 as displayed in FIG. 3) for the "recommended likelihood" KPI 110B for the 'next seven days' 120B time period are displayed. These influence magnitudes may be determined, for example, by computer 1200 or one or more additional computers in communication with computer 1200 for example via network interface 1150—(for example, using the routine described in FIG. 9B or any other routine). Identifiers of these influencers are displayed by display device 1184 as described below.

A "future time frame" is a period of time (i.e. having a starting time and an ending time) where at least the 'ending time' is in the future. If a time frame A is defined as an 'earlier time frame' than time frame B, this means that at least the ending time of time frame A is before the ending time of time frame B—however, this does not impose a constraint on the starting times of time frames A and B.

In the present disclosure, reference is made to (i) 'dashboard future time frames' (i.e. with reference, for example, to 120 of FIG. 3), (ii) 'influencer-ranking future time frames,' (i.e. with reference, for example, to 120A of FIGS. 4A-4C), (iii) 'influencer action future time frames' 196; and (iv) deviating KPI-viewing time frames 198.

The "dashboard future time frames" are future time frames for which it is desired to display predicted future KPI values. The 'influencer-ranking future time frame' is a future time frame for which it is desired to display an indication of a predicted future influencer-ranking hierarchy. 'Influencer action future time frames' and 'deviating KPI-viewing time frames' are defined below with reference to FIGS. 7A-7B. The 'KPI-moving future time frame' is discussed with reference to FIGS. 5A-5B, and refers to the time period for which it is desired to display calculated deviating influencer values which move one or more KPI(s) from an 'out-of-range value' (i.e. as predicted for the 'KPI-moving future time frame') to a target value or target range.

When the 'influencer action future time frames' 196 are discussed in the context of calculated deviating influencer values (see FIGS. 5A-5B), then the 'influencer action future time frame 196' may be referred to as 'influencer action future time frames 196 for calculated influencers.'

When the 'influencer action future time frames' 196 are discussed in the context of user-proposed deviating influencer values (see FIGS. 7A-7B), then the 'influencer action future time frame 196' may be referred to as 'influencer action future time frames 196 for user-proposed influencers.'

When the 'deviating KPI-viewing time frames 198' are discussed in the context of calculated deviating influencer values (see FIGS. 5A-5B), then the 'deviating KPI-viewing time frames 198' may be referred to as the 'deviating KPI-viewing time frames 198 for calculated influencers.'

When the 'deviating KPI-viewing time frames 198' are discussed in the context of user-proposed deviating influencer values (see FIGS. 7A-7B), then the 'deviating KPI-viewing time frames 198' may he referred to as the 'deviating KPI-viewing time frames 198 for user-proposed influencers.'

In the example of FIG. 4A, the ranked influencers 150 are visually ordered in accordance with relative influence, where the influencer with the greatest influence appears first. By ordering the influencer identifiers 150 according to predicted influence strengths (i.e. in the example of FIG. 4A, the predicted influence strengths for the particular KPI 110B and the particular future time frame 120A are 25.6, 18.6, etc), it is possible to allow the user to visualize the relative importance of the influencers, and to allow a user to focus upon "more important influencers."

For the present disclosure, a "predicted future influencer ranking hierarchy" 220 is a plurality of influencer identifiers 150 presented, on display device 1184, in a manner determined according to predicted influence strength (or relative contribution to the total influence) on a predicted value of a KPI at a future time period. Thus, in the non-limiting example of FIG. 4A, the influencer with the greatest amount of influence (i.e. "Average Number of Contacts" 150A) has a relative contribution of 25.6, the influencer with the second greatest amount of influence (i.e. "Brand Description" 150B) has a relative contribution of 18.6, etc.

In the non-limiting example of FIG. 4A, the influencer identifiers 150 are ordered according to the influence strength/relative contributions. This is not the only way that the influencer identifiers 150 may be presented "in a manner determined to predicted influence strength." Alternatively or additionally, the influencer identifiers may be presented in a manner so that "more important" influencers (i.e. with larger relative contributions) are displayed in a larger font, a brighter color, or in any other manner indicative of a "larger contribution."

The interface displayed in step S219 of FIG. 2 (see, for example, FIG. 4) allows the user to answer Q2 of FIG. 2: "Why will it happen?"—the answer is provided by the graphical indication of which influencers are more "important" in determining why it will happen. Optionally, as in the case of FIG. 4A, a numerical indication of the magnitude of each contribution (i.e. 25.6, 18.6, 18.2, etc) is also displayed.

It is noted that the ranked influencers are specific for the selected KPI 110B and the selected future time period 120A (in the case of FIG. 4A, it is for the predicted value of 79.06 displayed in FIG. 3). In some embodiments, in response to a user selection of the KPI 110B or time period 120A (for example, by using user input device 1190 to engage the dropdown list for 110B or 120A or to engage any other visual element such as a "GUI control"), a new "predicted future influencer ranking hierarchy" 220 is displayed for the newly selected KPI (for example, selected using the list box associated with graphically element 110A of FIG. 3 or using any other GUI widget or in any other manner) or time period (for example, selected using the list box associated with graphically element 120A of FIG. 3 or using any other GUI widget or in any other manner) corresponding to a different $KP-PRE_i^j$ (for example, also displayed in FIG. 3).

Histograms of FIGS. 4A-4D

In some embodiments, in response to a user engagement within the GUI of a particular influencer identifier 150 (for example, using user input device 1190), a corresponding histogram describing the frequency of occurrences of various "predicted outcomes" for particular 'user-selected' or 'user-engaged' influencer for the time frame selected in 120A—is displayed. Thus, in FIG. 4A (where the influencer "contacts" is displayed).

By displaying the predicted outcome frequency for a given influencer, this allows the user to visualize not only which influencers are most "important," but also how the influencer is predicted to behave in the time frame selected in 120.

In FIG. 4A, the histogram 230A for the "Contacts" influencer (identified by identifier 150A) is displayed. In addition to the histogram, some sort of predicted central tendency (for example, an average) is displayed 232A—for the example of FIG. 4A, the average predicted number of contacts 232A (i.e. this is a predicted influencer value) for the next 7 days is 1.7.

Figure 4D:
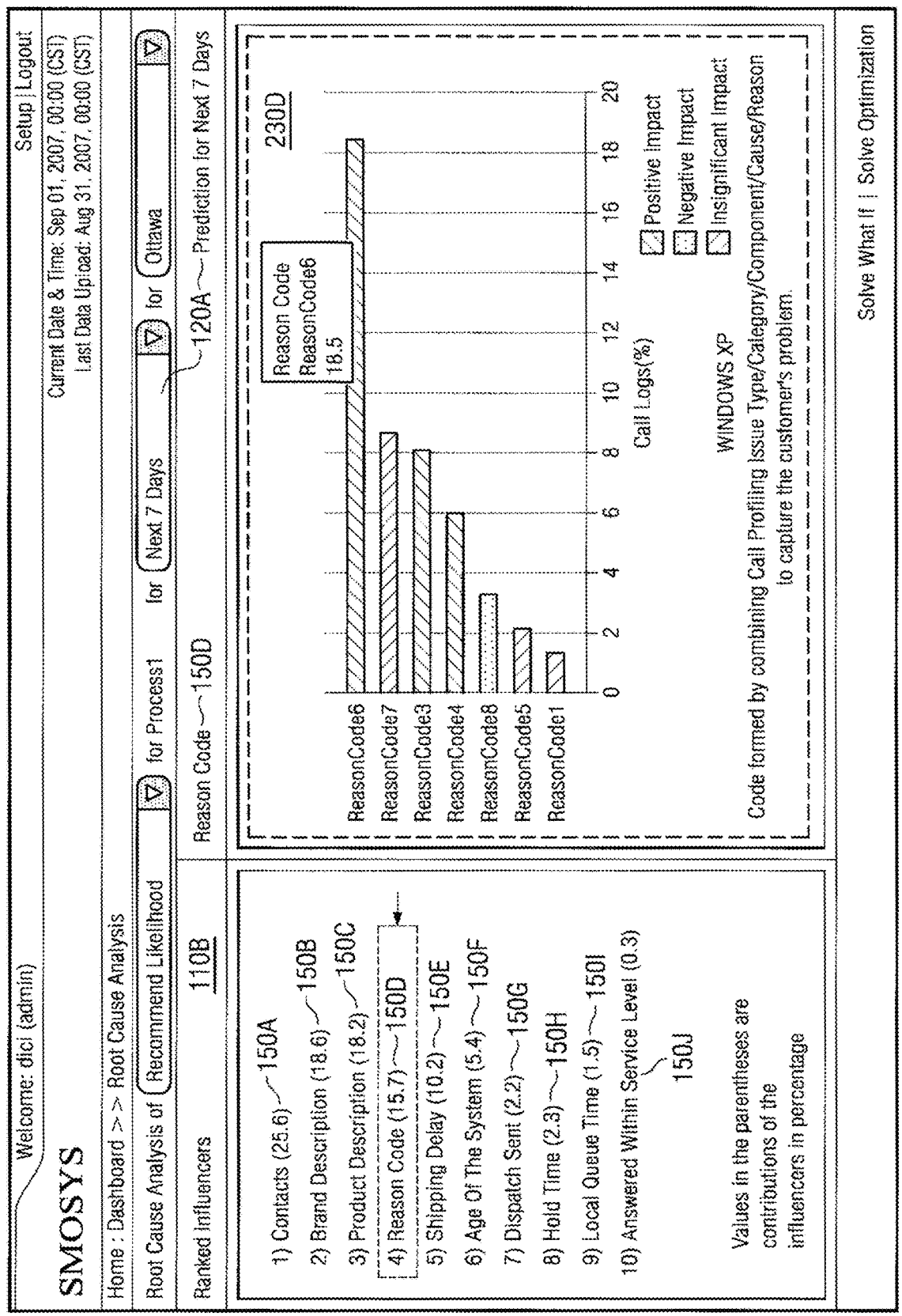

In FIG. 4B, in response to a user engagement (for example, using user input device 1190) of an identifier 150H for the "Hold Time" influencer, the corresponding "Hold Time" histogram 230H is displayed to the user. In FIG. 4C, in response to a user engagement (for example, using user input device 1190) of an identifier 150B for the "Brand Description" influencer, the corresponding "Brand Description" histogram 230B is displayed to the user. In FIG. 4D, in response to a user engagement (for example, using user input device 1190) of an identifier 150D for the "reason code" influencer, the corresponding "reason code" histogram 230D is displayed to the user.

"Controllable Influencers" and "External influencers"

It is recognized that some influencers may be at least partially controllable by the management of the organization whose performance is being measured by the KPIs, while other influencers may be "external" influencers derived from external factors over which the organization his little or no control. Controllable influencers can be identified in the system as part of a set of business rules. "Controllable influencers" are also referred to herein as "actionable influencers."

For Use Case 1, the following influencers are designated as "controllable"—average number of contacts 150A (i.e. because if the agents do a "good job," the customer will be less likely to repeatedly contact the Call Center for the same issue because the issue will be solved in a 'low' number of calls), shipping delay 150E, dispatch sent 150G (i.e., whether or not a dispatch is sent for a call), hold time ISOH, local queue time (minutes) 150I, and answered within service level (%) 150J. Definitions of these influencers are available in FIG. 7A.

For Use Case 1, the following influencers are designated as:"external"—brand description 150B (i.e., because the Call Center has no substantial control over which brands require serving using the Call Center), product description 150C (i.e., because the Call Center has substantially no control over which products require serving using the Call Center), reason code 150D (i.e., because the Call Center has substantially no control over the type of problem for which a customer calls), and age of the system 150F.

Thus, in some embodiments, the user may wish to focus upon more "controllable" influencers in order to be able to determine how behavior modification by the organization is predicted to affect the future outcome (i.e. as indicated by a KPI value(s)) of one or more aspects of a business process. As will be discussed below, in some embodiments, a decision needs to be made about which influencers are presented.

As will be discussed below, in the non-limiting example of FIGS. 5A-5C and 7A-7B, the only influencers that are presented to the user are those defined as 'controllable.'

A Brief Overview of Optimization (Q3 of FIG. 2: also see FIG. 5) and "What-If"

Analysis (Q4 of FIG. 2: also see FIG. 7)

As noted earlier, in many situations the information displayed on the dashboard both the information and the manner in which it is displayed—(see, for example, FIG. 3) may provide insight as to what will (i.e. what is predicted to) happen (see Q1 of FIG. 2—dashboard), and the information (both the information and the manner in which it is displayed) displayed by the future influencer ranking hierarchy may provide insight as to why it will happen (see Q2 of FIG. 2—root cause analysis).

A manager or user can acquire an understanding of the events that are predicted to transpire in the future and their cause—i.e. to make a diagnosis of a problem or opportunity—see Q1 and Q2 of FIG. 2. Nevertheless, it may still remain unclear to the manager or user what particular steps she may take (i.e. to modify behavior of the organization—for example, by attempting to "hit a target" for one or more influencers) in order to remedy (e.g. in the case of a problematic KPI) or take advantage of the situation (e.g. in the case of an 'over-performing' KPI)—see Q3 and Q4 of FIG. 2.

For the non-limiting example of Use Case 1 (i.e. the Call Center) presented in FIGS. 3-7, it is noted that one example of "hitting a target" may be as follows: it is predicted that the shipping delay will be 0.3 weeks for a future time period (for example, for the current quarter which is in progress but has not yet ended)—if the organization can "bring down" shipping delay to, say, 0.2 weeks, then the organization could "hit" some hypothetical target. Another example may be as follows: if an average hold time of 45 seconds is predicted for the future time period (e.g., the current quarter)—if the organization can "bring down" the average hold time to, say, 35 seconds then the organization could "hit" some hypothetical target.

Typically, there is some sort of "cost" associated with modifying an influencer from its predicted future value (which, for example, may be derived from its historical behavior or the historical behavior of one or more other factors) to a "deviating influencer value." For example, in order to reduce the shipping delay, it may be necessary to pay shipping agents for overtime hours. In another example, a company may have a fixed number of employees, and reducing shipping delay may require transferring employees from the role of a "phone agent" to the role of a "shipping agent"—thus, improving the predicted performance/value(s) of a first set of KPI(s) (for example, a KPI set that includes shipping delay as an influencer) may be predicted to adversely affect the performance of a second set of KPI(s) (for example, a KPI set that includes hold time).

Figure 5A:
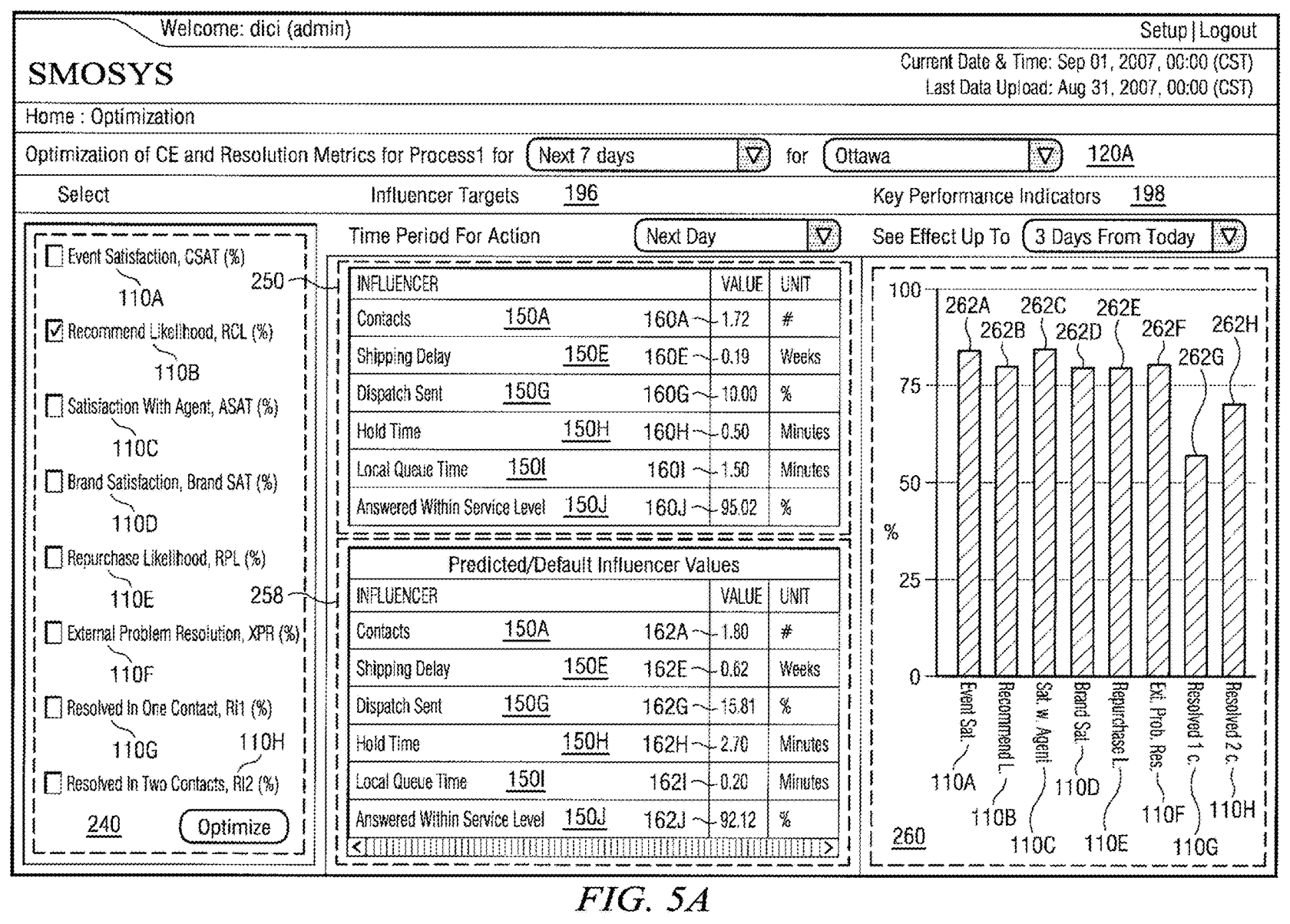
Figure 5B:
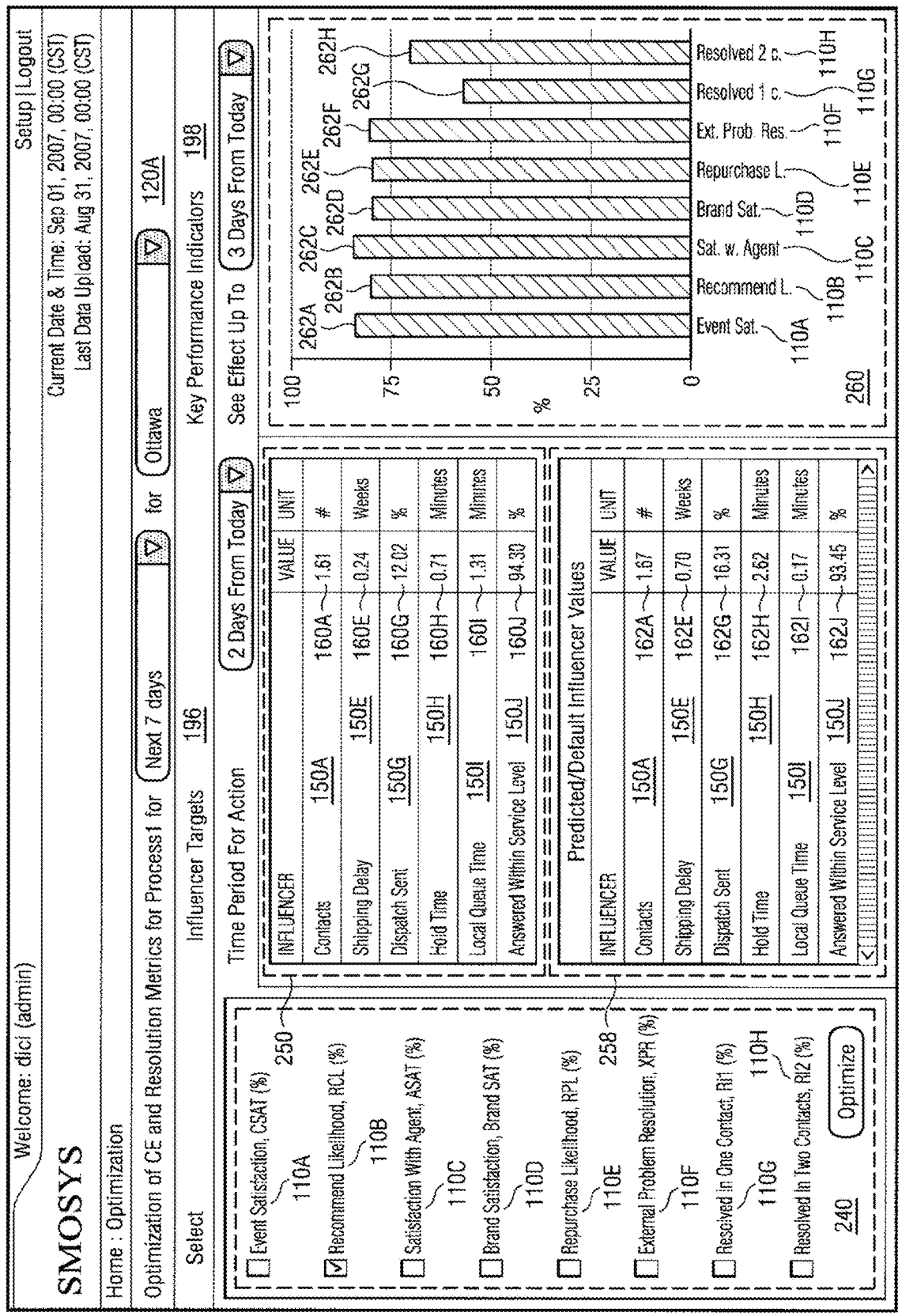
Figure 5C:
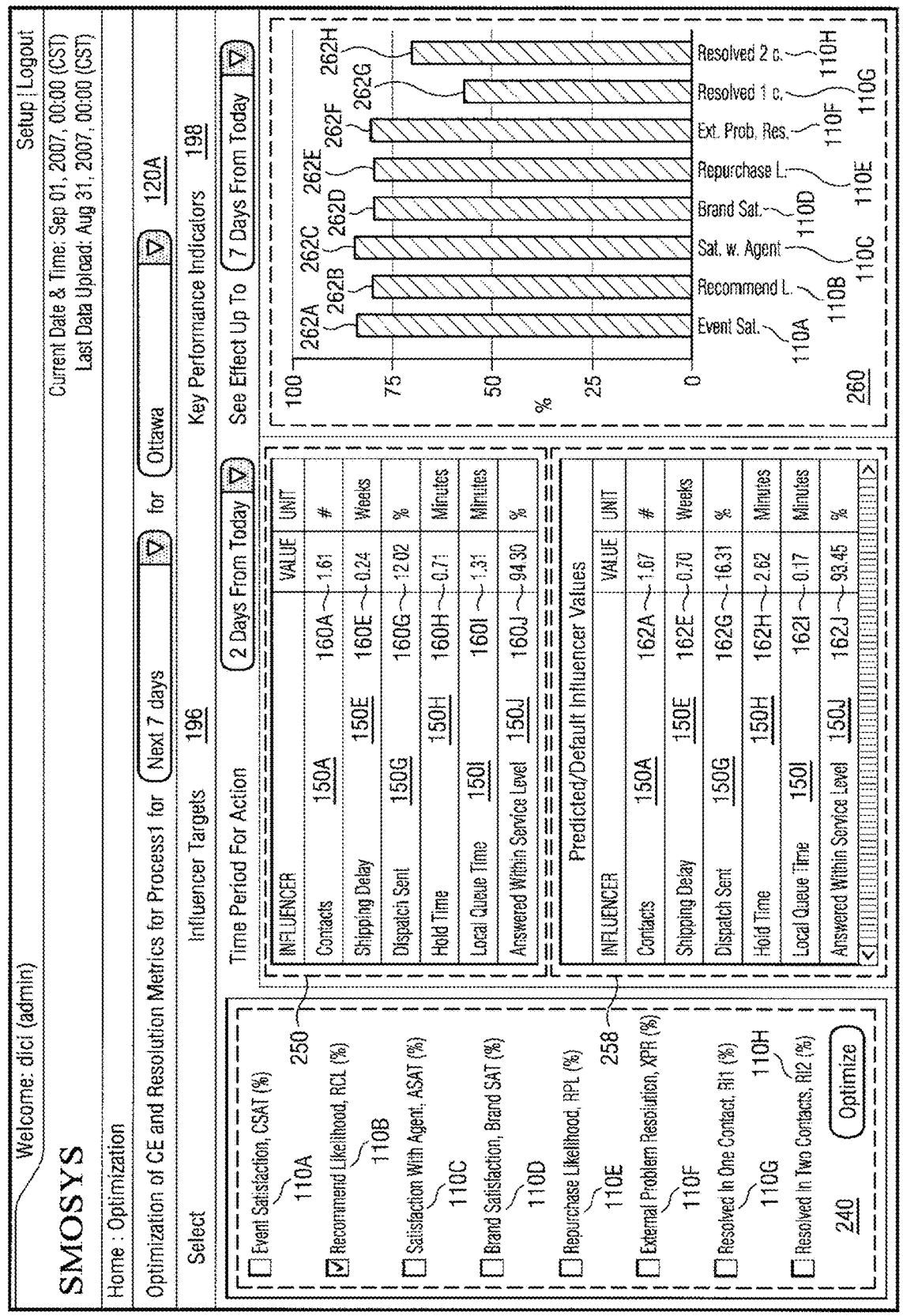

As will be discussed below, two additional graphical interface elements are provided in order to allow the user to explore possibilities for "moving" a KPI(s) from its predicted value (for example, a predicted value that indicates "sub-optimal" performance and is below its desired range) to a deviating (hopefully, improved) KPI value. Thus, in FIGS. 5A-5C (see also step S225—this is the first additional graphical interface element), discussed below, an "optimization" interface is provided whereby the user specifies one or more KPIs that she wishes to "fix" for a given future time period (i.e. KPIs which are predicted to perform outside of a desired range for which it is desirable to modify organizational behavior in order to 'move' the KPI value to its desired range). In the example of FIGS. 5A-5C, the user does not need to suggest actual influencer values (i.e. there is no need to suggest a "target" influencer value to this), and "most of the work" is done by the machine, with little need for user input or customization.

Figure 7A:
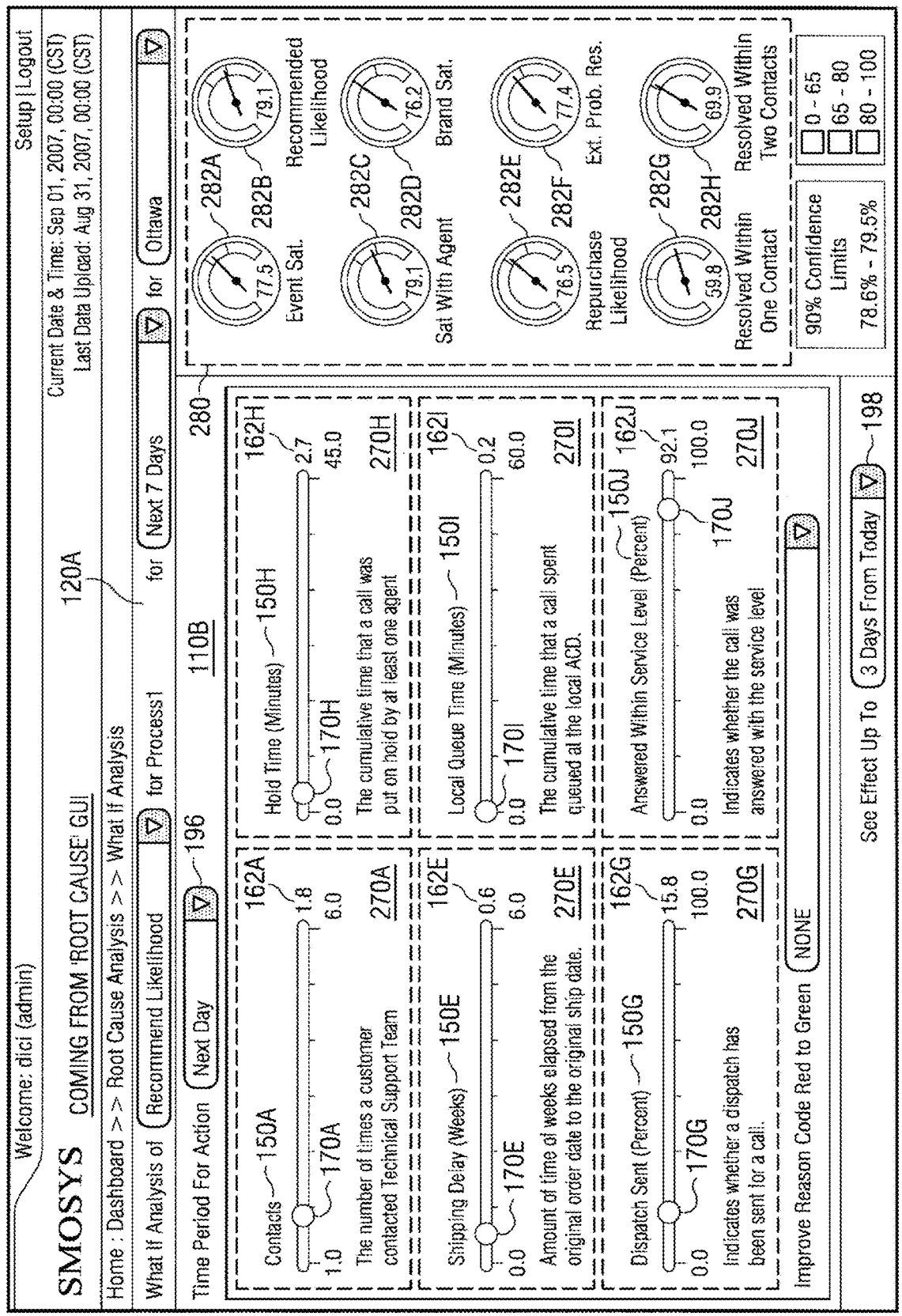
FIGS. 7A-7B are screen shots of a "what-if" interface including both plurality of user-controls via which the user specifies one or more user-suggested deviating influencers and KPI display area where indications of values of one or more affected KPIs are displayed.
Figure 7B:
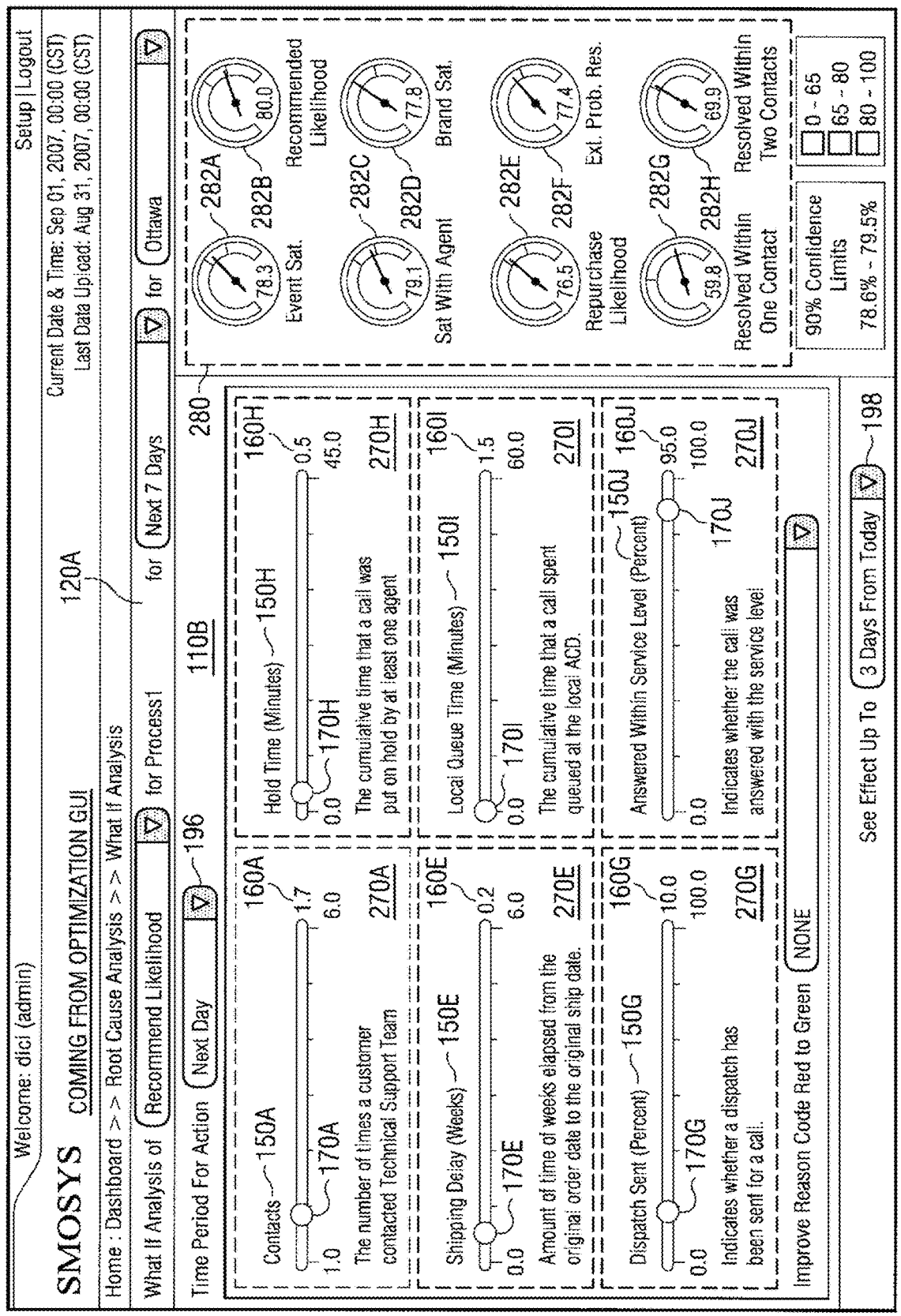

And, in FIGS. 7A-7B see also steps S229 and S233 of FIG. 2—this is the second additional graphical interface element, an interface is provided whereby the user can suggest actual deviating influencer values—thus, the user can interactively receive an answer to the question—"based upon the information of historical organization behavior (i.e. as expressed by historical KPI-related data), if we modify organizational behavior to "hit" the suggested list of targets (i.e. as expressed by user-proposed deviating influencer values), what will be the consequences (i.e. as expressed by deviating KPI values that are predicted for the hypothetical scenario proposed by the user)?

Figure 7C:
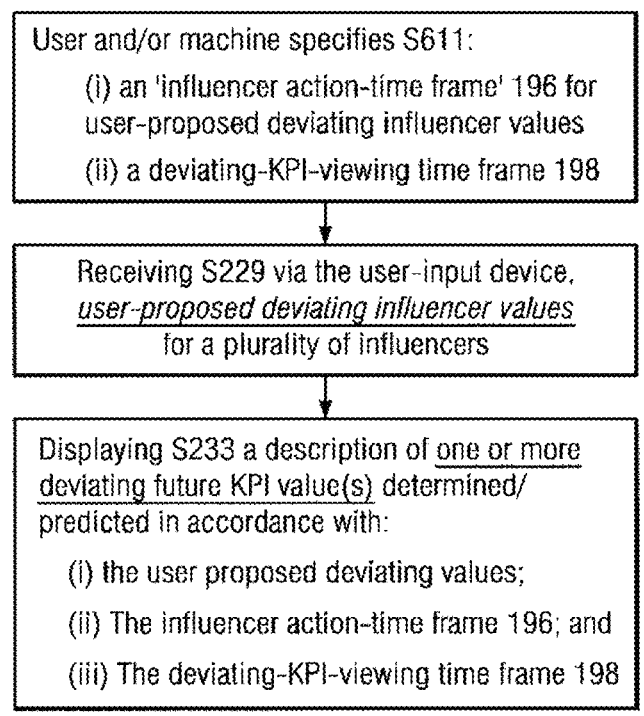

Thus, FIGS. 5A-5C (and step S225) relate to a 'coarse-grained' approach with little customization (but little need for the user to exert herself by providing particular influencer values), while FIGS. 7A-7C (and steps S229-233) relate to a 'fine-grained' approach with the opportunity for much more customization (at the cost of the need for the user to supply influencer values).

For the present disclosure, a "deviating value" is a value that differs from a 'predicted value' (for example, displayed as element 130 in FIG. 3 and as elements 232 in FIGS. 4A-4D) that is predicated only from historical behavior—i.e. the deviating value is a value predicated upon some sort of proposed change in organizational behavior. One type of "deviating value" is a deviating influencer value—examples include (i) the "machine-proposed" deviating influencer value(s) (see 250 of FIG. 5 discussed below); and (ii) the "user-proposed" deviating influencer value(s) (see 170 of FIG. 7 discussed below).

Another type of "deviating value" is a deviating KPI value (see element 260 of FIG. 5 and element 280 of FIG. 7)—the deviating KP1 value(s) is derived from one or more deviating influencer values. The deviating KPI value(s) may be predicated upon either calculated 'machine-proposed' deviating influencer values displayed, for example, in element 160 of FIG. 5 or predicated upon 'user-proposed' deviating influencer values displayed, for example, in element 170 of FIG. 7A.

A Brief Overview of Optimization (see step 225 and 0 3 of FIG. 2: also see FIG. 5)

FIG. 5A is a screen shot of an exemplary interface for displaying a set of "calculated" deviating influencer values 250 predicted to 'move' a value of the selected KPI (in the example of FIG. 5, this is recommended likelihood 110B), for a selected 'KPI-moving' future time period 120A (in the example of FIG. 5, this is "next 7 days") from its predicted value (for the example of FIG. 5, this is 79.06 (which is displayed in the dashboard of FIG. 3 as element 1 3 0~to~a)n acceptable range of 80-100 (see the bottom of FIG. 3)).

When one or more deviating influencer values (see, for example, 160 of FIGS. 5A-5C and 170 of FIGS. 7A-7B which provide examples of deviating influencer values) are predicted to 'move' a KPI from its predicted value 130 (i.e. for example, displayed in the predictive dashboard—the 'original' prediction that is based upon historical data and not upon a proposed deviating influencer) to a deviating KPI value, this is a result of substituting predicted influencer values (for example, from the original model based upon historical behavior) with the deviating influencer values (i.e. associated with a proposed behavior modification for the organization that is not known from the original model based upon historical behavior).

The predicted influencer values are derived from historical KPI-related data while the deviating influencer values are descriptive of a 'proposed modified' organizational behavior (the deviating influencer values may also be derived from the historical KPI-related data).

It is noted that predicted influencer values are displayed in 162 of FIGS. 5A-5C and in 232 of FIGS. 4A-4B, while deviating KPI values are displayed in 260 of FIGS. 5A-5B and 280 of FIGS. 7A-7C.

As noted above, the calculated deviating influencer values 250 are determined by one or more computer(s) 1200 in accordance with historical data describing historical behavior of one or more KPI(s) or influencer(s).

Thus, in the example of FIG. 5B, it is predicted (i.e. based upon a mathematical model discussed below) that IF the organization can, within the two days (i.e. as specified in 196 for the 'KPI-moving' future time period 120A) hit the 'targets' of the: (i) achieving an average number of contacts 150A of 1.61; (ii) achieving a shipping delay 150E of 0.24 weeks; (iii) achieving a 'dispatch sent' 150G of 12.02%; (iv) achieving an average hold time 150H of 0.71 minutes; (v) achieving an average local queue time 150I of 1.31 minutes; and (vi) achieving an answered within service level 94.30%, THEN, the value of the KPI recommended likelihood (i.e., for 'KPI-moving' future time period—for example, specified in 120A) will not be 79.06 (as displayed in FIG. 3 in the predictive dashboard—this is an 'out-of-range' value) but rather in the range of 80-100.

It is noted that these 'calculated deviating influencer values' would require the organization to change its behavior in order to 'hit the targets.' Without such 'behavior change' (i.e. if the organization continues according to what is predictable from historical KPI-related data), it is predicted that the values of these influencers (see 258 and the values 162A, 162E, 162G, 162H and 162I) would be 1.67, 0.70, 16.31, 2.62, 0.17 and 93.45%. Thus, in the illustrated example, in order to improve recommend likelihood from 79.06% (i.e. out of range) to at least 80% for the 'KPI-moving' future time period 120A (for this example, within 7 days), it is necessary in the earlier time period (i.e. the influencer action time period for calculated deviating influencer values—i.e. specified in 196) of 'within 2 days from today' to reduce shipping delay from 0.70 weeks (i.e. what it would have been, according to predictions, if determined solely from historical patterns) to 0.24 weeks (i.e. the target which is the calculated deviating influencer value).

It is noted that the influencers 150 within area 250, are ordered in accordance with their estimated "importance" or relative influence strength as determined by one or more computer(s) 1200 and are consistent with the hierarchy presented in step S219 (see element 220 of FIG. 4A). Thus, the "most important" influencers are displayed earlier (alternatively or additionally, in the largest font or brightest color, etc) in the order.

In one example, the most important influencers are those which are predicted to change (or change the most)—thus, instead of "wasting the user's time" by prominently displaying calculated deviating influencers with little or no deviation (i.e. these are not important because these influencers with little or no deviation do not substantially require any change of organizational behavior), those associated with greater deviation (i.e. informing the user that there is a need to change organizational behavior) are emphasized in the visual displaying.

It is also noted that not all influencers displayed in FIG. 4A are displayed in FIG. 5A—this is because FIG. 5A is limited to "controllable" influencers and does not relate to "external influencers" (see the discussion above)—i.e. in the non-limiting example, the organization has little or no control over influencers 150D and 150F.

In yet another example, there may be a larger 'set of influencers' (for example, 10 influencers), and information only about the influencers that are more 'important' is shown (for example, only about a plurality of influencers selected from the influencer set—for example, 4 influencers selected from the 10 according to larger deviations from predicted values).

The interface of FIG. 5A is associated with Q3—it is noted that the answer to Q3 is not always a unique answer—i.e. more than one preemptive actions may be taken in order to "move" a KPI value from a predicted "out-of-range" value to a preferred value or range.

Thus, in some embodiment, in order to reach a "unique solution," one or more constraints may be used (i.e. by computer(s) 1200 when determining the set(s) of calculated deviating influencer value(s) 150) to be presented in step S225 of FIG. 2 (or element 250 of FIG. 5).

As noted above, there is often a "cost" associated with modifying organizational behavior in order to 'hit a target' or 'move an influencer value'—for example, in order to reduce shipping delay, it may be necessary to pay overtime wages to the shipping staff or transfer personnel from the customer-service department to the shipping department. In another example, to reduce hold time, it may be necessary to staff a call center with additional personnel, even if some of these personnel are sometimes 'idle' because the demand for personnel fluctuates in time.

Thus, in some embodiments, when the computer(s) 1200 determines the calculated deviating influencer value(s) 150 displayed in 250, this computation is carried out in accordance with one or more constraints. One example of a constraint might be 'minimum cost'—i.e. agents salary, the cost of losing a customer, and other factor(s) may be translated into dollars-and-cents terms, and an attempt is made to find the 'minimum cost solution' for moving the KPI(s) specified in 240 from an 'out-of-range' value (i.e. for the future time period specified in 120A) to an 'in range' value or a target value.

In another example, the constraint may contain a rule such as 'we may not allow the brand satisfaction 110D KPI to leave its range. It is appreciated that combinations of such constraint may also be used. The constraint policies may be received explicitly via user input device 1190, or may be pre-programmed into the system.

Once the calculated deviating influencer values 160 are known, it is possible to display how assuming that the target will be hit for these influencer values affects one or more KPIs—thus, on the right hand side of FIG. 5A, indications 260 of a plurality of KPI values (i.e. these KPI values are typically 'deviating' KPI values because they are based upon the deviating influencers 160) are displayed for a deviating-KPI-viewing time frame 198 (i.e. indications of what the KPI values are expected to be based upon historical KPI-related or influencer related data and assuming that the targets are hit for the calculated deviating influencers 160).

The interface of FIG. 5 provides several user controls, including:
(i) the checkbox 240 on the left hand side of the screen—this allows the user to specify via input device 1190 for which KPIs the "problem will be solved." In the example of FIG. 5, the only KPI specified is recommend likelihood 110B—however, in the event that another KPI (or multiple KPIs) are specified, then the "problem is solved" for these other KPIs, thereby 'solving the problem' for a different set of calculated deviating influencer values 250.
(ii) a dropdown list for selecting the time period for action 196—thus, in the example of FIG. 5A, the set of deviating influencer values are displayed for the case where the time period for action is the next day in order to 'move' KPI values in the future time frame of the next 7 days 120A.
(iii) another dropdown list for selecting the deviating KPI-viewing time frame 198 for viewing one or more KPI values derived from the calculated deviating influencer values 160.

Thus, in FIG. 5A, the value of 120A is set to 'next 7 days,' the value of 196 is set to 'next day,' and the value of 198 is set of '3 days from today.' (Note in the interface of FIGS. 5A-5C the calculated deviating influencers 160 are not affected by the value of the deviating KPI-viewing time frame 198).

Figure 5D:
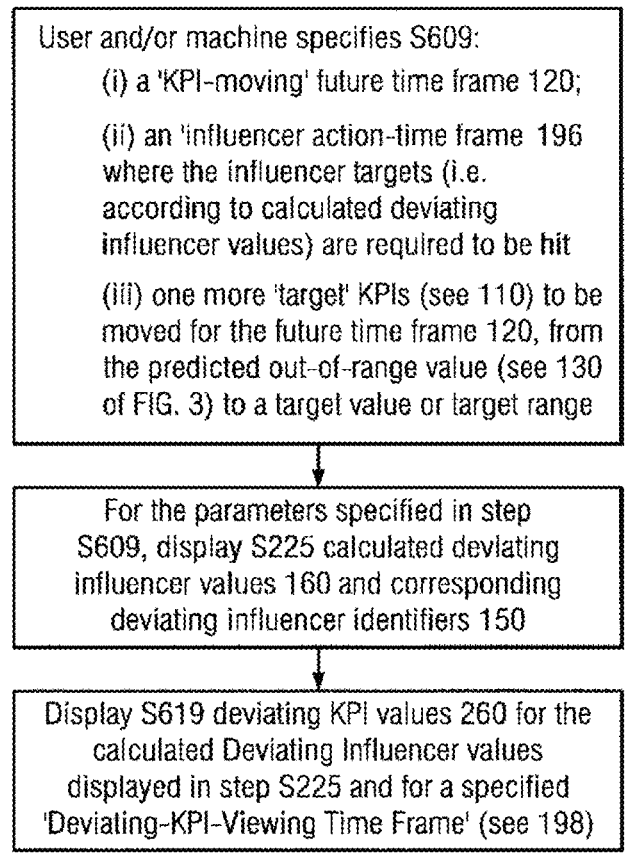
FIG. 5D is a flow chart of an exemplary routine for providing an interface whereby a user specifies one or more KPI(s) and a future time frame and one or more calculated deviating influencer values are displayed.

FIG. 5D is a flow chart of an exemplary routine for providing an interface whereby a user specifies one or more KPI(s) and a future time frame and one or more calculated deviating influencer values are displayed.

Figure 6A:
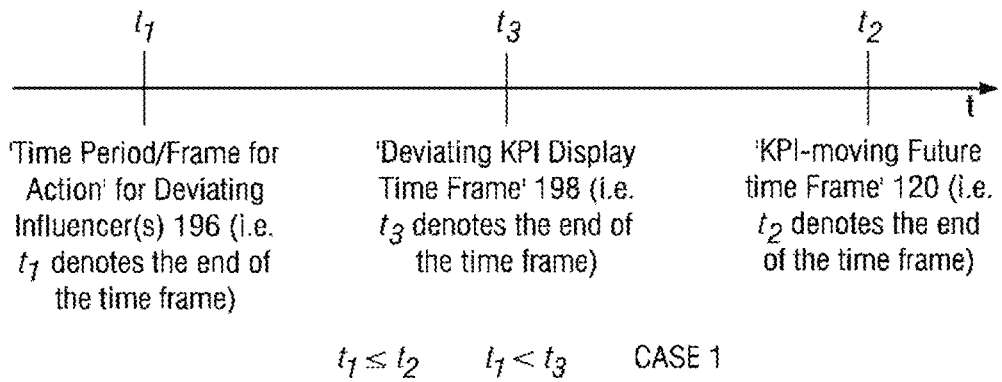
FIGS. 6A-6B are time lines illustrating relationships between a time period for action for deviating influencers, a deviating KPI display time frame, and a KPI-moving future time frame.
Figure 6B:
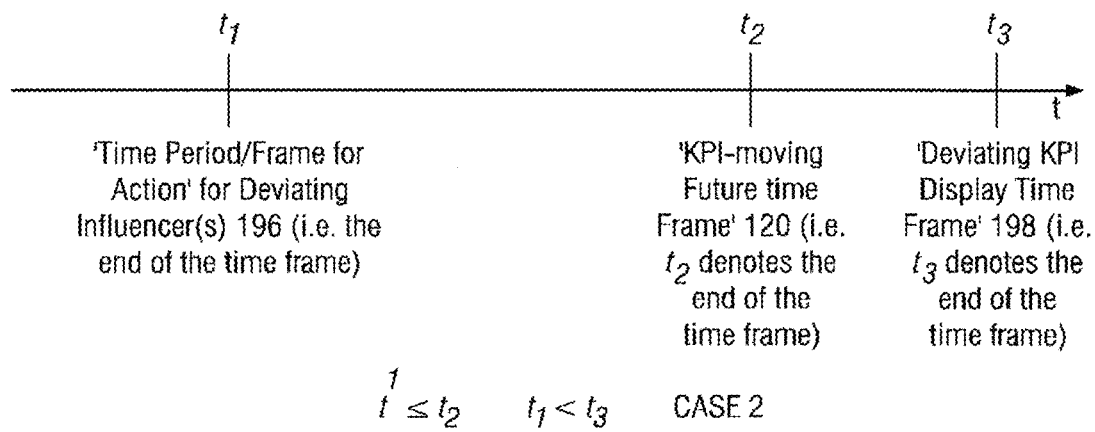

FIGS. 6A-6B are time lines illustrating relationships between a time period for action for deviating influencers, a deviating KPI display time frame, and a KPI-moving future time frame. As illustrated in FIGS. 6A-6B, modification of organizational behavior (i.e. by changing influencer values from predicted influencer values to deviating influencer values) in an 'earlier' time period (i.e. a time period that ends at an earlier time than the 'KPI-moving future time frame' 120A) may modify a KPI at later time (i.e. t2>t1) 'KPI-moving future time frame' 120A (for example, as in FIGS. 5A-5C where it is desired to bring into range the KPI 'recommended likelihood' for the KPI-moving future time frame 120 of 'Next 7 days' 120A from its predicted value of 79.06 to the preferred range of 80-100).

It is possible to view effects of the deviating influencer values (i.e. either calculated or user-proposed deviating influencer value) at a 'later time' (i.e. t3>t) defined as the 'deviating KPI display time frame' 120 by viewing indications of deviating KPI values (i.e. KPI values that derive from the 'purely-historically-based' prediction and are predicted upon the organization 'hitting the targets' defined by the deviating influencer values)

It is noted that in the present disclosure, the terms 'time period' and 'time frame' are synonymous, and used interchangeably.

A Brief Overview of Providing a 'What-If Interface (see steps S229-233 of FIG. 2, FIGS. 7A-7E and FIG. 8.

FIG. 7A is a screen shot of an exemplary what-if interface for: (i) receiving (in step S229 of FIG. 2) user-proposed deviating influencer values for a plurality of influencers (for example, using the sliders 170) associated with an influencer action-time frame (specified, for example, using drop-down 196—in FIG. 7A this is 3 days from today); and (ii) displaying (in step S233 of FIG. 2 and FIGS. 7C-7E) descriptions 282 of one or more deviating future KPI values 282 derived from the user-proposed deviating influencer values for the deviating-KPI-viewing time frame specified by GUI control 198.

In contrast to the calculated deviating influencer values, indications of which are displayed as element 160 of FIGS. 5A-5C, and which are determined by one or more computers as a solution to an 'optimization-related' problem (i.e. moving a predicted KPI to a target value or into a target range), the user-proposed deviating influencer values are explicitly proposed by a user and are received via user input device 1190.

In the particular example of FIG. 7A, a plurality of sliders 170 is provided, each slider being associated with a respective identifier 150 (i.e. identifying the influencer which is to be modified in the time period for action 196 by the user). When the user moves the slider via user input device 1190, this modifies the corresponding user-proposed deviating influencer value. It is appreciated that the slider 170 is just one particular example of a 'user control' or 'GUI control.' Other user or GUI controls (or widgets) may include, but are not limited to, text boxes, radio buttons, list boxes, etc. As will be explained below, the values of the user-provided influencers (for example, provided by a user engagement of the slider or other GUI control) may influence the values of the displayed KPIs of 280 (i.e. the 'answer' to the question 'WHAT-IF')

In some embodiments, the displayed influencers 270 (including the influencer identifier 150 and the GUI control/widget 170) may be displayed (for example, sorted or sized) in accordance with estimations of their relative 'importance' during a future time frame (i.e. including but not limited to deviating-KPI-viewing time frame 198, time period for action 196, the time frame specified in 120A, or any other time frame). This may allow the user to 'focus' in the 'more important' influencers when conducting a what-if investigation of one or more KPIs or influencers.

In the non-limiting example of FIG. 7A, the displayed influencers 170 are sorted in the same order (i.e. 150A is displayed first, then 150E, then 150G, then 150H, then 150I, then 150J) as they were sorted in FIGS. 4A-4B, giving preference to what is estimated to be more 'important' influencers for the time period specified in 120A. It is noted that sorting is not the only way that the display may be carried out in accordance with relative influence contributions or relative importance—in yet another example, the influencer identifier 150 or user control 170 is sized (or assigned a color) in accordance with the relative influence contributions.

In yet another example, the displayed plurality of influencers 270 is part of a larger set of candidate influencers and user controls are only displayed for influencers that have a relatively large contribution or importance (i.e. relative to rejected influencers which have a lesser contribution or importance and for which no control or influencer identifier is displayed).

In one example, the set of candidate influencers may include influencers A, B, C, and D. In this example, three sliders for receiving user-proposed influencer values are displayed.

In this example, for a first future time period (for example, this month), the relative influencer contribution for influencer A=0.4, the relative influencer contribution for influencer B=0.1, the relative influencer contribution for influencer C=0.15, and the relative influencer contribution for influencer D=0.35. For a second future time period (for example, this quarter), the relative influencer contribution for influencer A=0.4, the relative influencer contribution for influencer B=0.13, the relative influencer contribution for influencer C=0.12, and the relative influencer contribution for influencer D=0.35. Thus, in this example, in the event that a time period of action 196 of 'this month' is selected, then sliders (or any other GUI or user control) for only influencers A, C and D will be displayed, and no GUI control for B will be displayed. In the event that a time period of action 196 of 'this quarter' is selected, then sliders (or any other GUI or user control) for only influencers A, B and D will be displayed, and no GUI control for C will be displayed.

Another feature of FIGS. 7A-7B is that each influencer identifier or GUI control 170 for accepting a user-proposed deviating influencer value is associated with (i) a scale (in FIG. 7A, the scale for contacts 150A is 1-6, the scale for shipping delay 150E is 0-6, etc); and (ii) default values (in FIG. 7A, the default value of contacts 150A is 1.8, the default value of shipping delay 150E is 0.6, etc).

In some embodiments, the default value or slider scale are selected in accordance with predicted influencer values 162 for any future time period (for example, specified by 196 or 120A or 198)—this is the case for FIG. 7A where the default values are for the future time period of 120A and are identical to the predicted values 162 displayed in FIG. 5A for the 'next day/time frame.'

Alternatively or additionally, the default values or slider scale are selected in accordance with calculated deviating influencer values 160 (for example, as displayed in step S225 of FIG. 2—also see FIGS. 5A-5C) for any future time period (for example, specified by 196 or 120A or 198)—this is the case for FIG. 7B where the default values are the calculated deviating influencer values 160 displayed in FIG. 5A.

In some embodiments, the what-if interface is configured according to how the user navigates into the what-if interface—in one example, in the event that the user navigates to the what-if interface from the root-cause interface (see, for example, FIG. 4A and FIG. 7A which is labeled at the top as coming from root cause GUI and Path A of FIG. 8), then the default values or slider ranges may be determined according to predicted values for the influencers, as discussed above.

In the event that the user navigates to the what-if interface from the optimization interface (see, for example, FIG. 5A and FIG. 7B which is labeled at the top as coming from optimization GUI and Path B of FIG. 8), then the default values or slider ranges may be determined according to deviating values for the influencers, as discussed above.

Figure 7D:
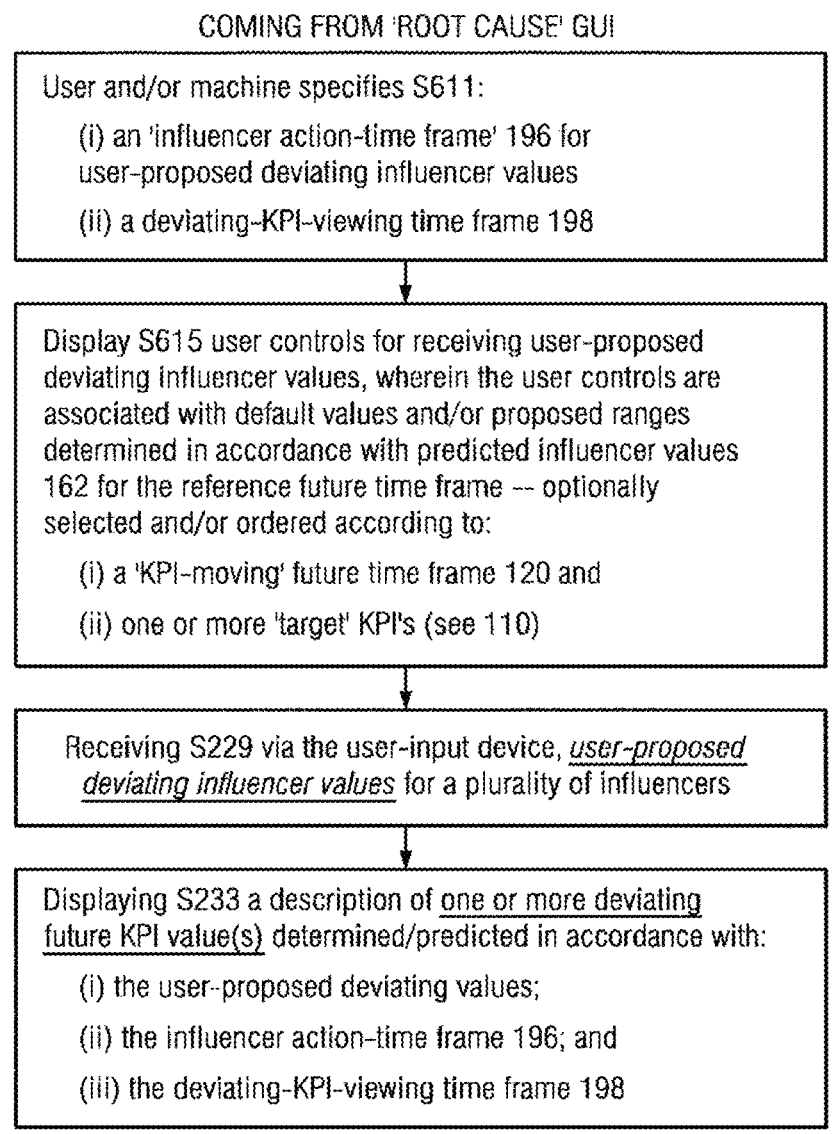

The reader is referred to steps S611, S229 and S233 of FIG. 7C, steps S611, S615, S229 and S233 of FIG. 7D, and steps S613, S625, S229 and S233 of FIG. 7E.

A Discussion of Steps in FIGS. 9A-9D

FIGS. 9A-9D are flowcharts of computational techniques for generating data related to KPI predictions.

Reference is made to FIG. 9A. In step S711, historical KPI-related data (i.e. data describing historical values of KPIs and influencers) is stored in memory 1160 of one or more computers. In some embodiments, the KPI-related data is provided using a data feed (for example, via network interface 1150 of computer 1200). Alternatively, data may be loaded to memory 1160 in a 'batch process,' or using one or more user input device(s) 1190, or using non-volatile memory 1210 (for example, a USB flash drive or DVD or any other non-volatile memory) or in any other manner.

In step S715, using one or more microprocessor(s) of the one or more computer(s) 1200, predicted future behaviors of influencers and KPIs are calculated—for example, using one or more prediction models (e.g. including but not limited to regression models, Markov chains, time series models, state space models, Bayesian models, neural networks, or any other appropriate model). In step S715, predicted values (for example, which are displayed as element 130 in FIG. 3) of KPIs for a plurality of future time frames (for example, next 7 days, this month, this quarter, or any other future time frames) are computed for multiple KPIs. Towards this end, it may be necessary to also compute predicted values of influencers.

It is noted that the specific non-limiting examples of how to implement step S715 provided are not intended as comprehensive, and the skilled artisan will appreciate that other implementations are possible.

Reference is made to FIG. 9B. In step S751, data describing predicted future behavior of one or more specific KPIs (referred to as 'root-cause' KPIs because the purpose of the technique of FIG. 9B is to effect root cause analysis) and 'candidate influencers' (i.e. influencers for which it is desired to know the predicted degree of influence upon future KPI behavior) is provided into memory 1160 of the one or more computer(s). In one non-limiting example, the data provided in step S751 describing predicted future behavior of one or more specific KPIs or future behavior of one or more influencers is provided according to the results of step S715.

In one non-limiting example, one or more KPIs are associated with a preferred range (or preferred values). According to this non-limiting example, when it is predicted that one or more KPIs will be out of range (or differ from a preferred value) (for example, according to results of step S715), this triggers the carrying out of steps S751 and S755 for (i) the KPI that is predicted (for example, in step S715) to be out of range; and (ii) the future time frame in which the KPI is predicted (for example, in step S715). Thus, in some embodiments, steps S751 or steps S755 may be carried out in a manner that is contingent upon the detecting of an out-of-range future KPI value (e.g., according to step S715).

In some non-limiting examples, step S219 of FIG. 2 is carried out for a particular KPI or future time frame that is selected from a plurality of KPIs or future time frames respectively according to a relationship between a predicted KPI value and its preferred range. Thus, steps S219 may be carried out in a manner that is contingent upon the detecting of an out-of-range future KPI value (e.g., according to step S715).

Alternatively or additionally, the 'root cause' KPI may be selected using user input device 1190 (for example, using GUI control 110B of FIG. 4A) or in any other manner.

In the non-limiting example of FIG. 4A, the 'recommend likelihood' root-cause KPI and the 'next 7 days' future time frame may be selected in any manner—for example, using GUI controls 110B or 120A, or 'automatically' because the KPI(s) is predicted (for example, in FIG. 9A) to be out of range for the future time frame (for example, in FIG. 4A the recommend likelihood is predicted to out of range, or below 80, for the next 7 day time frame). Therefore, it may be desired to drill-down and this decision may be carried out automatically or manually.

Figure 9C:
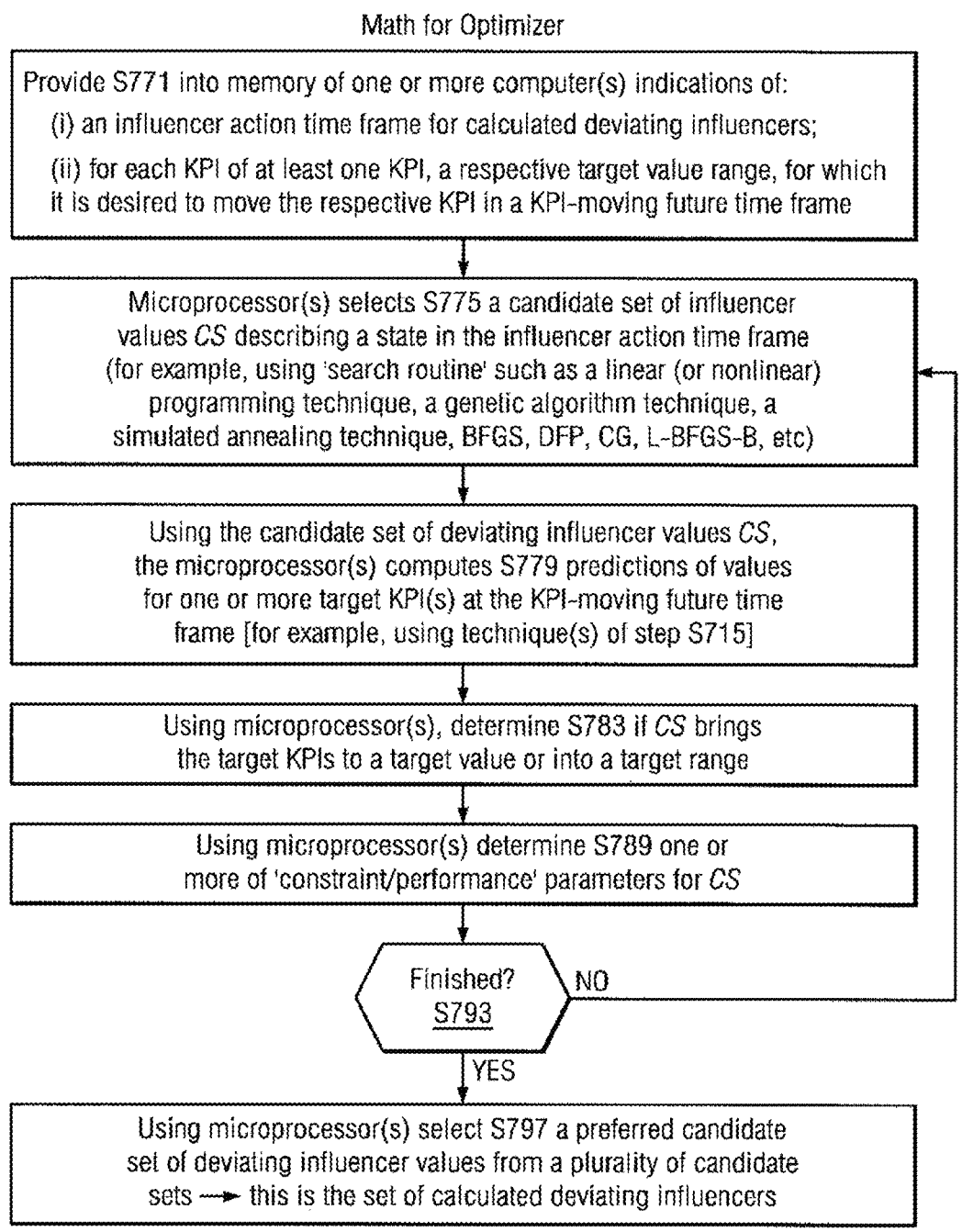
Figure 9D:
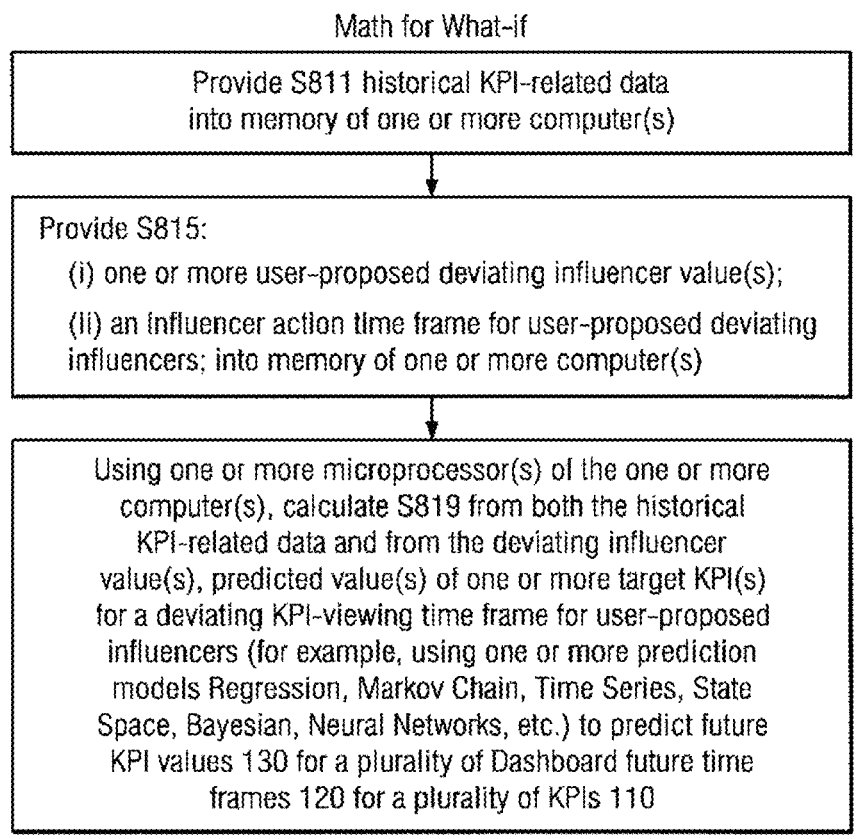

Reference is made to FIG. 9C, which is a flow chart of an exemplary routine for determining one or more calculated deviating influencer values (i.e. associated with an influencer action time frame for calculated deviating influencers) which (i) move a KPI from its predicted value to a target value or range for a future KPI moving time frame; and (ii) satisfy one or more constraints.

In step S771, indications of (i) an influencer action time frame for calculated deviating influencers; (ii) for each KPI of at least one KPI, a respective target value or range, for which it is desired to move the respective KPI in a KPI-moving future time frame are provided into memory 1160 of one or more computers 1200. There is no limitation upon how this data may be provided into the memory 1160 in step S771. In one example, the influencer action time frame may be provided via user input device 1190 (for example, via GUI control 196 or any other GUI control). Alternatively or additionally, a default value may be used or the data may be provided according to results of step S755 or S715 or in any other manner.

Similarly, a description (for example, an identifier) of one or more target KPI(s) may be provided into memory 1160 in any manner—automatically or manually—for example, using GUI control 240 of FIG. 5A, or in accordance with results of step S715 which may indicated that a KPI or KPIs are predicted to be 'out of range.' Thus, in response to the predicted out of range KPI, steps S771-S797 may be carried out 'automatically' in order to determine one way of fixing the problem of the predicted out-of-range KPI.

In steps S775-S793, a search for a solution or a preferred solution is carried out to locate a set of calculated deviating influencer values which are capable (i.e. according to a prediction model—for example, the model used in FIG. 9A) of moving one or more out-of-range predicted KPI(s) for a future time frame into a target range or to a target value. As will be discussed below, there may be multiple solutions or sets of deviating influencer values that are predicted to be capable of moving the KPI to the target range or target value. The routine of FIG. 9C is useful for predicting a preferred or optimal set of calculated deviating influencer values—it is appreciated that the term optimal is a relative term, and refers to deviating influencer values that satisfy some constraint or are preferred according to some sort of metric, and is not limited to the absolutely optimal set of deviating influencer values.

In step S775, a candidate set of influencer values CS is selected using some sort of search routine. In steps S779 and S783, it is determined if the set of influencer values is capable of moving the KPI to the target value or target—for the example of FIG. 5A, it would be determined if the candidate set of influencers are capable (i.e. assuming that they are implemented in the next day) of moving the KPI 'Recommended Likelihood' from its predicted value of 79.06 to the target range of 80 in the 'next 7 days' future time frame.

The predicted ability to move the KPI into the target range or value is necessary but not sufficient for the candidate set of influencer values CS to be selected as the preferred or optimal set of values (and, in some embodiments, be displayed numerically or according to some other indication—for example, in element 160 of FIG. 5A).

Thus, in the example of FIG. 9C, the deviating influencer values, in order to be optimal, must satisfy, or best satisfy, some sort of cost function or constraint function. Towards this end, in step S789, one or more constraint or performance parameters are determined for the candidate set CS of influencers. In one example, it is desired to pay a minimal amount of overtime hours to shipping agents or phone agents. Thus, in this example, in step S789, the overtime dollar cost may be computed in step S789.

In step S793, it is determined if wear finished. For example, steps S775-S789 may be carried out multiple times.

Thus, for a multiple candidate sets CS[1], CS[2] . . . CS[N] which all satisfy the requirement (i.e. as determined in steps S783 and S789) the preferred or optimal set of values (i.e. a CS[i] where i is a positive integer less than or equal to N) is selected in step S797 in accordance with: (i) the set of constraint or performance parameters (for example, a cost or value(s) of one or more other predicted KPI(s) associated with each CS[i] or any other CS[i]-dependent factor); and (ii) one or more business rules which allow a selection of which CS[i] is preferred or optimal.

Any business rule or constraint may be enforced in steps S775, S789 and S797 to determine which influencer values are preferred or optimal.

Reference is now made to FIG. 9). In step S811, historical KPI-related data is provided into memory of one or more computers (see, for example, step S711 of FIG. 9A). In step S815, one or more user-proposed deviating influencer values are received into memory 1160—for example, from user input device(s) 1190. Also, in step S815, a description of indication of an influencer action time frames for user-proposed deviating influencers is received into memory 1160—for example, using user input device 1190 (for example, when a user engages GUI control 196 of FIG. 7A or in any other manner) or automatically or in any other manner.

In step S819, it is possible to march forward in time and predict one or more deviating KPI values for example, assuming that the user-proposed influencer values prevail at the influencer action time frame for user-proposed deviating influencers. The skilled artisan will appreciate that any appropriate technique may be used for predicting the one or more deviating KPI values, including but not limited to regression techniques, Markov chain techniques, time series, etc.

In some embodiments, the technique of FIG. 9B or the technique of FIG. 9C or the technique of 9D may be carried out in response to detecting an exception or sub-optimal or out-of-range predicted KPI (i.e. for a particular future time frame)—for example, as predicted in FIG. 9A.

The skilled artisan will appreciate that the techniques of FIGS. 9A-9D are brought as illustrative examples, and are not intended as comprehensive—other techniques may also be used (including techniques not described explicitly herein), in accordance with knowledge of the skilled artisan.

Additional Discussion

In some embodiments, the user interface may allow drill-down over one or more dimensions—for, example process, area/location, category etc. Thus, in FIGS. 3-5 and 7, the examples to the example process of 'Process 1' and to the example location of 'Ottawa.' Moreover, the dimensions may have multiple levels—for example, top level process, 1st level sub-processes, 2nd level sub-processes, etc. In these cases, the software may perform necessary computation and allows the user to drill down accordingly.

In some embodiments, text analytics techniques (linguistic, lexical, pattern recognition, extraction, tagging/structuring, visualization, and predictive techniques, etc.) may be employed for analyzing text data, for example, analyzing customer feedback that come in textual form. In some embodiments, this may be useful for generating the 'historical KPI-related data.'

There is no limitation on when and how certain computations may be carried out. In one example, some or all computation of results may be done in the background and stored in database (i.e. results may be pre-computed). In that case, results (for example, displayed in FIGS. 3-5 and 7) are just fetched from the database and displayed when the user interacts with the GUI. Alternatively or additionally, there is no need to 'pre-store'; computation results.

Figure 10:
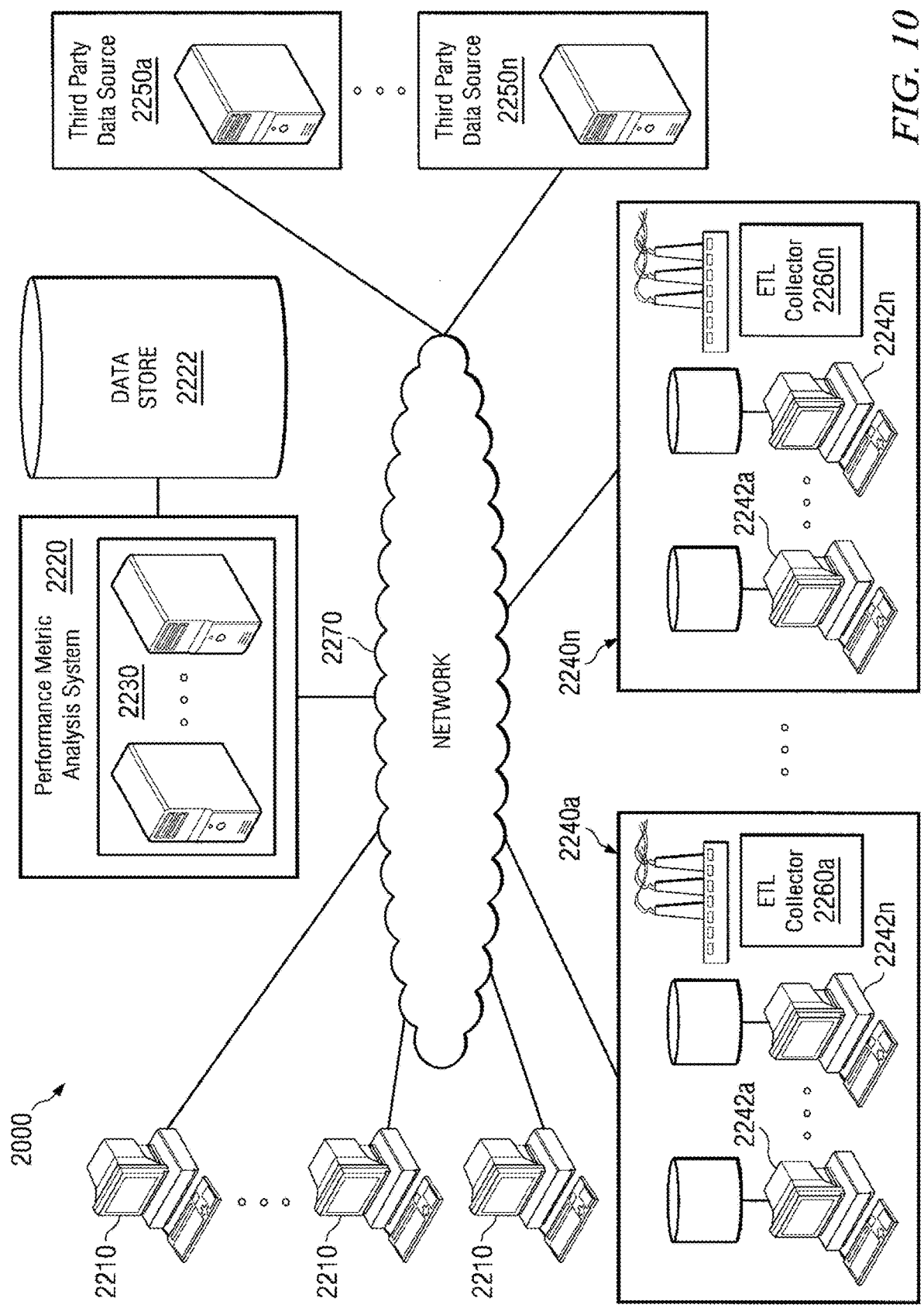
FIG. 10 is a block diagram illustrating one embodiment of a topology which may be used in conjunction with an implementation of embodiments of the present invention.

A Discussion on FIG. 10

Embodiments of the systems and methods of the present invention may be better explained with reference to FIG. 10 which depicts one embodiment of a topology which may be used to implement embodiments of the systems and methods of the present invention. Topology 2000 comprises performance metric analysis system 2220 (including associated data store 2222) comprising one or more computer devices 2230. These computing devices 2230 may, for example, by organized as a cluster which may be a loosely or a tightly coupled cluster and include one or more load balancers (not shown). Performance metric analysis system 2220 (e.g. one or more of computing devices 2230) may be coupled through network 2270 to computing devices 2210 (e.g. computer systems, personal data assistants, kiosks, dedicated terminals, etc), one or more locations of an entity 2240 and one or more third party data sources 2250 operable to provide, for example, market data, benchmarking data, etc. Network 2270 may be for example, the Internet, a wide area network (WAN), a local area network (LAN) or any other type of conventional or non-electronic communication link such as mail, courier services or the like.

Generally speaking then, entity 2240 may be a business, non-profit, or other type of entity which implements a process. This process may, for example, be a business process which relates to the functionality or performance of the entity. As discussed above, for example, such business processes may comprise the implementation of customer service through a contact or call center, the implementation of transaction services, the management of supply or demand chains or other inventory management, the implementation of field services, the implementation and management of sales pipelines, etc.

No matter the type of processes implemented by the entity 2240 however, it may be useful to measure or otherwise analyze (including predicting, simulating, optimizing, etc.) the performance of such a process utilizing a performance metric, such as a KPI as discussed above. Accordingly, entity 2240 may desire to utilize and monitor these performance metrics related to these processes for a variety of reasons, including improving the performance of such processes, reducing the cost of implementing such processes, controlling the quality of such processes, preempting issues which may occur in the future with respect to these processes, substantially optimizing solutions to future problems and predicatively determine the effect of certain solutions to anticipated future problems, etc.

To that end, performance metric analysis system 2220 may gather data from entity 2240 or a third party data source 2250 to analyze such data to perform analysis on such data and may present an interface such that one or more users at computing devices 2210 may determine what analytics are utilized, the data used for these analytics, view, or affect the results, of such analytics, etc. Embodiments of such interfaces have been discussed previously herein.

More specifically, in one embodiment, performance metric analysis system 2220 may implement a set of analytics comprising at least predictive analytics, root-cause analytics, optimization and what-if simulation. Colloquially speaking, predictive analytics allows users (for example, associated with entity 2240) to identify and quantify problems (including opportunities) related to one or more performance metrics, root-cause analysis allows users to identify, quantify and rank influencers of performance metrics which may cause any upcoming problems, optimization may determine substantially optimum solution to preempt (or benefit from) any determined upcoming problems and what-if simulation allows a user to determine the effect of prescribed solutions on performance metrics.

To implement such analytics, performance metric analysis system 2220 may gather data directly or indirectly related to one or more performance metrics from entity 2240. Entity 2240 may have multiple locations 2240*a*, 2240*n* where each entity location 2240*a*, 2240*n* may comprise multiple servers or other types of computing devices 2242 which are involved in the implementation of the process by the entity 2240 or the storage of data involved with the implementation of the process. In fact, in some instances entity locations 2240*a*, 2240*n* may have computing devices which run according to different operating systems or protocols, or which implement different types of applications or databases in conjunction with the process.

Thus, each entity location 2240*a*, 2240*n* may have an associated ETL collector 2160 which is responsible for collecting appropriate data regarding the process or one or more associated performance metrics from various computing devices 2242 utilized in the implementation of the process or used to store data involved with the implementation of the process. ETL collector 2260 can send the data gathered at the corresponding entity location 2240 to the performance metric analysis system 2220 in response to a request from the performance metric analysis system 2220.

Thus, performance metric analysis system 2220 may, based upon one or more schedules, send out requests to each ETL collectors 2260 at each of the entity locations 2240*a*, 2240*n* and receive, in response, a set of data corresponding to that performance metric and that entity location 2240*a*, 2240*n* collected over a certain time period. This data may be stored in data store 2222. Analytics may then be performed by the performance metric analysis system 2220 using the data gathered from the entity locations 2240*a*, 2240*n*. The analytics performed by performance metric analysis system 2220 may be determined, at least in part, by a users interaction with an interface presented by performance metric analysis system 2220 and the results of the analytic performed may similarly be displayed to a user through the provided interface.

It should be noted here that not all of the various entities depicted in topology 2000 are necessary, or even desired, in embodiments of the present invention, and that certain of the functionality described with respect to the entities depicted in topology 2000 may be combined into a single entity or eliminated altogether. Topology 2000 is therefore exemplary only and should in no way be taken as imposing any limitations on embodiments of the present invention.

Figure 11:
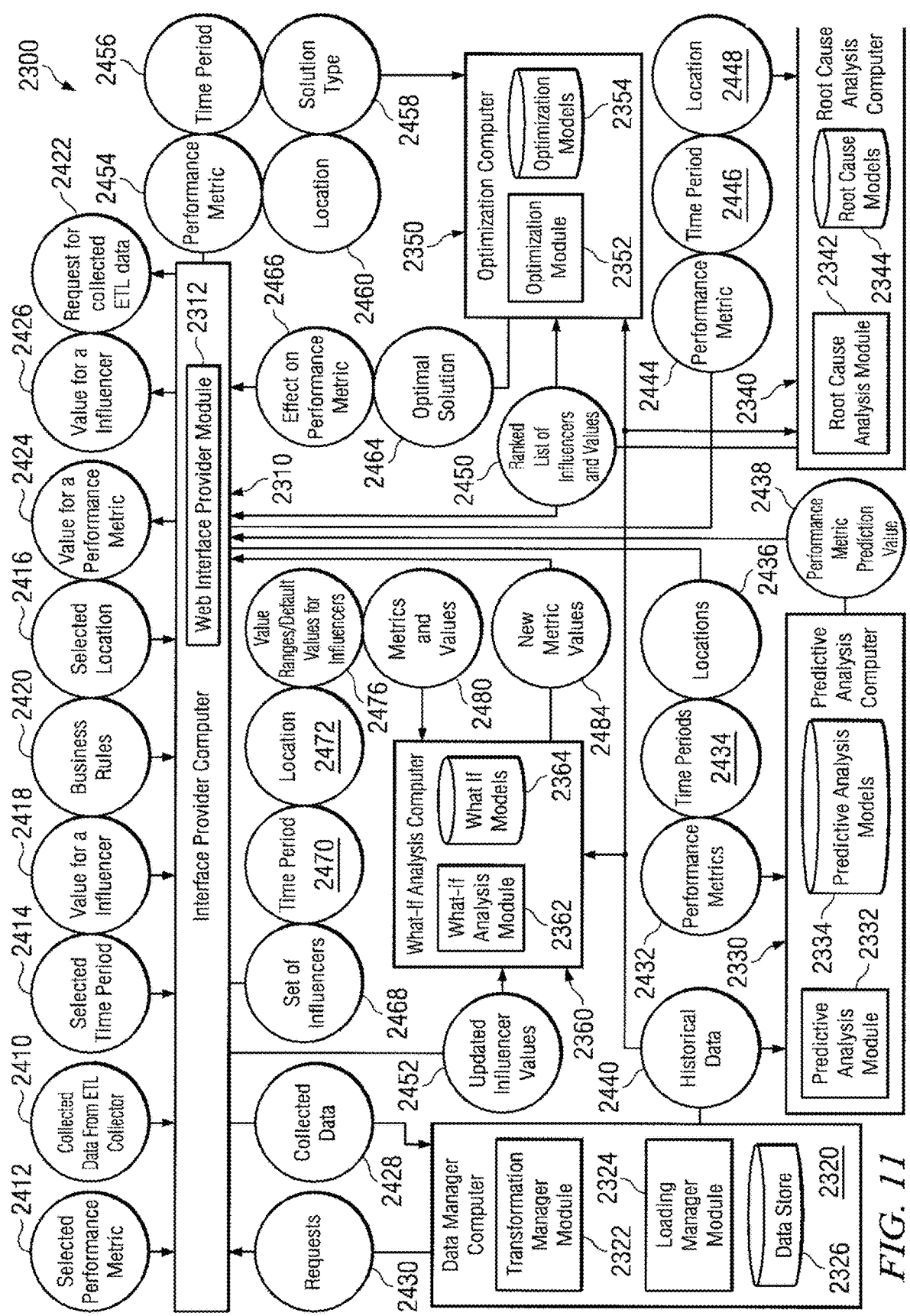
FIG. 11 is a block diagram illustrating one embodiment of a performance metric analysis system.

A Discussion on FIG. 11

It may be useful here to delve into more details regarding one example of the architecture of a performance metric analysis system. Moving on to FIG. 11 then, one embodiment of a performance metric analysis system is depicted. Performance metric analysis system 2300 comprises an interface provider computer 2310 which is coupled to one or more other computers, such as computers at a location of an entity or a user computer (not shown), and is configured to receive data from, and send data to, these other computers. This interface provider computer 2310 may be configured to communicate via one or more protocols or standards including HTTP, XML, SOAP, Web Services Definition Language (WSDL), FTP, etc. and may additionally be configured to provide one or more interfaces for interaction with performance metric analysis system 2300, including, for example, web pages, command line interfaces, web services interfaces, database server functionality, application server functionality, web server functionality, etc.

In particular, in one embodiment, a web interface provider module 2312 may be configured to provide one or more web page interfaces for interacting with performance metric analysis system 2300 such that a user at a user computer may be presented with an interface comprising certain data and the user may utilize this interface to be presented with different or additional information, to refine the information that is presented, to select various parameters, to provide various settings (e.g. values or ranges) or to receive, or provide, other desired information to or from performance metric analysis system 2300. Examples of such interfaces which may be provided by web interface provider module 2312 have been discussed thoroughly herein and will not be elaborated on further.

Thus, utilizing the interfaces and protocols according to which the interface provider computer 2310 is configured, interface provider computer 2310 is operable to receive data from one or more computers external to performance metric analysis system 2300 (as will be discussed below in more detail) such as data collected from an ETL collector at an entity location 2410, one or more user selected performance metrics 2412, one or more user selected time periods 2414, a user selected location 2416, a value for one or more influencers 2418, one or more business rules 2420 or other information from one or more computers external to performance metric analysis system 2300. Interface provider computer 2310 may be configured to transform this data according to one or more communication protocols, file formats, etc., and communicate the extracted data to one or more of data manager computer 2320, predictive analysis computer 2330, root analysis computer 2340, optimization computer 2350 or what-if analysis computer 2360.

Conversely, the interface provider computer 2310 may utilize the configured protocols and interfaces to communicate data received from data manager computer 2320, predictive analysis computer 2330, root analysis computer 2340, optimization computer 2350 or what-if analysis computer 2360 to one or more computers external to performance metric analysis system 2300 (as will be discussed below in more detail). Such data may include a request for collected ETL data 2422, and one or more values for one or more performance metrics 2424 and one or more values for one or more influencers 2426. As will be noted from a review of the disclosure above, the values of the one or more performance metrics 2424 or the one or more values for the one or more influencers 2426 may be displayed using one or more web pages provided by web interface provider module 2312, where the web page interfaces may be configured to present this data using a variety of formats or displays, including for example, one or more dashboards comprising tables, bar graphs, sliders, pull down menus, buttons, check boxes, etc. As mentioned previously, these interfaces have been discussed in great detail and will not be elaborated on further here.

Data manager computer 2320 is configured to take collected data 2428 from ETL collectors at entity location(s) and transform the data for storage in data store 2326. More specifically, data manager computer may be executing transformation manager module 2322 and loading manager module 2324. Loading manager module 2324 may be responsible for pulling data from the various entity location(s) and may issue requests 2430 to be sent to one or more entity locations. Loading manager module 2324 may receive the raw collected data 2428 and stage this data in a storage area (for example, in data store 2326).

Transformation module 2322 may transform this staged data by applying one or more sets of rules to the staged data before the data is stored for subsequent use in data store 2326. To transform the data, transformation module 2322 may apply one or more client specific modification rules based upon the entity, location, application, database type, etc. from which the collected data was received, one or more data cleaning rules intended to sift or filter the data (for example, to discard out of range data), one or more performance metric analysis, one or more performance metric analysis system rules to conform the data to an internal format utilized for processing or one or more data joining rules to associate desired data. The transformed data can then be stored in data store 2326. By applying these sets of rules to the collected data, data from a wide variety of client types and in a wide variety of protocols, formats and stored in a variety of database types may be easily integrated.

Predictive analysis computer 2330 may be configured to utilize this transformed data to determine the values for one or more performance metrics for one or more future time periods (referred to also as time periods). More specifically, in one embodiment, predictive analysis module 2332 executing on predictive analysis computer 2330 may receive one or desired performance metrics 2432, one or more time periods 2434 and one or more locations 2436 (other categories, such as product, process, etc. may also be utilized and will not be elaborated on further) and determine the value for the one or more desired performance metrics 2432 for each of the one or more time periods 2434 and the one or more locations 2436 (where the location may correspond to all locations).

Predictive analysis module 2332 may utilize a set of predictive models 2334, where there is at least one predictive model corresponding to each of the performance metrics 2432, such that the model corresponding to a particular performance metric can be fitted utilizing appropriate data corresponding to a location. Using this fitted model then, a prediction for that performance metric for each of the one or more time periods 2434 may be determined using historical data 2440 associated with the performance metric stored in data store 2326. The determined performance metric prediction values 2438 can then he displayed to a user using an interface provided by interface provider computer 2310.

Examples of interface(s) which may be displayed to a user in conjunction with predictive analysis computer 2330 providing information to, or obtaining information from, a user are presented in FIG. 3.

Based on interaction with such an interface provided by interface provider computer 2310 a user may indicate that he wishes to see a root cause analysis. Root cause analysis computer 2340 may be configured to provide an analysis of why a performance metric has been determined to have a particular value for a particular time period. In one embodiment, root cause analysis module 2342 executing on root cause analysis computer 2340 may determine a ranked list of influencers (for example, explanatory variables) associated with the calculation of a value for a performance metric (for example, output variables), where the list may be ranked by size of contribution (for example, to the value of the performance metric) or according to some other ordering criteria. In addition, in certain embodiments, the ranked list of influencers may exclude certain influencers over which an entity may have little or no control.

Specifically, a user may indicate through an interface provided by interface provider computer 2310 that the user wishes to see a root cause analysis corresponding to a particular performance metric 2444 for a particular time frame 2446 and a particular location 2448 (other categories, such as product, process, etc. may also be utilized and will not be elaborated on further). Root cause analysis module 2342 may access a set of root cause models 2344, where the set of root cause models 2344 may comprise one or more root cause models corresponding to a particular performance metric. Using the root cause model corresponding to the desired performance metric 2444, the historical data 2440 stored in data store corresponding to the location 2448 and the value for that performance metric 2438 determined for that future time period by predictive analysis computer 2330, root cause analysis module 2342 may determine a set of influencers and associated contributions of these influencers on the value determined for the future time period such that the influencers may effectively be ranked by contribution.

The determined ranked list of influencers and associated values 2450 can then be displayed to a user using an interface provided by interface provider computer 2310. Examples of interface(s) which may be displayed to a user in conjunction with root cause analysis computer 2340 providing information to, or obtaining information from, a user are presented in FIGS. 4A-4D.

Based on interaction with an interface provided by interface provider computer 2310 a user may indicate that he wishes to have an optimization performed. Optimization computer 2350 may be configured to provide a substantially optimal solution for attaining one or more particular value for one or more performance metrics over a time period. In one embodiment, optimization module 2352 executing on optimization computer 2350 may determine such a solution, where the solution comprises a set of influencers and corresponding values such that by attaining the values for the influencers the values for the one or more performance metrics will likely be obtained for that time period. The solution proposed may take into account one or more specified constraints.

Additionally, optimization module 2352 may be configured to calculate the effect this proposed solution will have on one or more other performance metrics if implemented. Specifically, a user may indicate through an interface provided by interface provider computer 2310 that the user wishes to have an optimization performed for one or more performance metrics 2454 for a particular time period 2456, a desired location 2460 and whether they would like a max/min solution or a desired range solution 2458. Optimization module 2352 may access a set of optimization models 2354, where the set of optimization models 2354 may comprise a set of max/min models and a set of desired range models. Each set of models (max/min and desired range) has a set of models corresponding to each of the performance metrics.

Thus, based upon the one or more performance metrics 2454, the particular time period 2456, the desired location 2460, historical data 2440, a ranked list of influencers and values 2450 and the desired type of solution (max/min or a desired range) 2458, optimization module 2352 may select an appropriate optimization model. The selected optimization model may then be applied by the optimization module 2352 with respect to the ranked list of influencers for the one or more performance metrics 2450 and the value for the one or more performance metrics for the time period 2438 to determine a substantially optimal solution for attaining a particular value (for example, a maximum or minimum value or a desired range) for the one or more performance metrics over the time period. The determination of his substantially optimal solution may also account for any user imposed constraints, such as, for example, constraints related to the values of other performance metrics, influencers or other measurable criteria. The optimization module 2352 may also determine the effect that this optimal solution may have on the values of one or more performance metrics (which may be the same or different than performance metrics 2454).

The substantially optimal solution 2464 (for example, a list of influencers and their associated values for attaining desired value for the one or more performance metrics, known as an actionable recommendation) and the effect of this solution of the one or more performance metrics 2466 (for example, performance metrics and associated values) may be displayed to a user using an interface provided by interface provider computer 2310. Examples of interface(s) which may be displayed to a user in conjunction with optimization computer 2350 providing information to, or obtaining information from, a user are presented in FIGS. 5A-5C.

Instead of, or in addition to, being presented with an optimization, a user may indicate through an interface provided by interface provider computer 23 10 that a user wishes to perform a what-if analysis such that the user may determine the effect of certain prescriptive solutions on certain performance metrics. What-if analysis computer 2360 may be configured to provide one or more influencers and associated value range for these of influencers. Additionally, what-if analysis computer 2360 may determine a list of performance metrics which may be most affected by variations in the one or more influencers. A user can thus specify values within the value ranges for one or more of the influencers and the optimization computer will calculate values for the list of performance metrics.

Specifically, in one embodiment, what-if analysis module 2362 executing on what-if analysis computer 2360 may receive a set of influencers 2468 where the influencers may be provided by a user through an interface or a list of influencers determined, for example, as a solution by optimization computer 2350, a particular time period 2470 and a desired location 2472. What-if analysis module 2362 may access a set of what-if models 2364, where the set of what-if models 2364 may comprise a set of models corresponding to each of the performance metrics. Thus, based upon the set of influencers 2468, the set of models 2364 historical data 2440 and the ranked list of influencers and values 2450 and the particular time period 2470, what if analysis module 2362 may determine value ranges for the set of influencers and default values for the set of influencers 2476, a corresponding set of affected performance metrics and values for the set of performance metrics 2480.

The set of influencers 2468, value ranges for the set of influencers and default values for the set of influencers 2476, corresponding set of affected performance metrics and values for the set of performance metrics 2480 may be displayed to a user using an interface provided by interface provider computer 2310. By interacting with the interface presented to the user by interface provider computer 2310 a user may specify new values within the ranges for one or more of the set of influencers. What-if analysis module 2362 may receive the update values for the one or more set of influencers 2482 and based on these updated values determine new values for the set of performance metrics 2484.

These new values may then be displayed to the user using the interface provided by interface provider computer 2310. Examples of interface(s) which may be displayed to a user in conjunction with what-if analysis computer 2360 providing information to, or obtaining information from, a user are presented in FIGS. 7A-7C.

After reading the above it should be noted that in addition to performing the specific functionality and transformations discussed, each of interface provider computer 2310, data manger computer 2320, predictive analysis computer 2330, root cause analysis computer 2340, optimization computer 2350 and what-if analysis computer 2360 may be a general purpose computer of the type known in the art having a central processing unit ("CPU"), at least one read-only memory ("ROM"), at least one random access memory ("RAM"), at least one hard drive ("HD"), or one or more input/output ("110) device(s). Furthermore, it will be realized that although interface provider computer 2310, data manger computer 2320, predictive analysis computer 2330, root cause analysis computer 2340, optimization computer 2350 and what-if analysis computer 2360 are depicted as separate computers, the functionality described with respect to these computers may be combined into one or more computers, including one or more general purpose computers.

Moreover, while web interface provider module 2312, transformation module 2322, loading manager module 2324, predictive analysis module 2332, root cause analysis module 2342, optimization module 2352 and what-if analysis module 2362 have been depicted as separate modules and executing on distinct computer, each of web interface provider module 2312, transformation module 2322, loading manager module 2324, predictive analysis module 2332, root cause analysis module 2342, optimization module 2352 and what-if analysis module 2362 may be combined into one or more modules which encompass the functionality of one or more of web interface provider module 2312, transformation module 2322, loading manager module 2324, predictive analysis module 2332, root cause analysis module 2342, optimization module 2352 and what-if analysis module 2362. Along the same line, as data store 2326 and the data stores which comprise predictive analysis models 2334, root cause analysis models 2344, optimization models 2354 and what-if analysis models 2364 have been depicted as separate, there may be one or more data stores which stores all, or a combination of, the data in data store 2326 and predictive analysis models 2334, root cause analysis models 2344, optimization models 2354 and what-if analysis models 2364.

Figure 24:
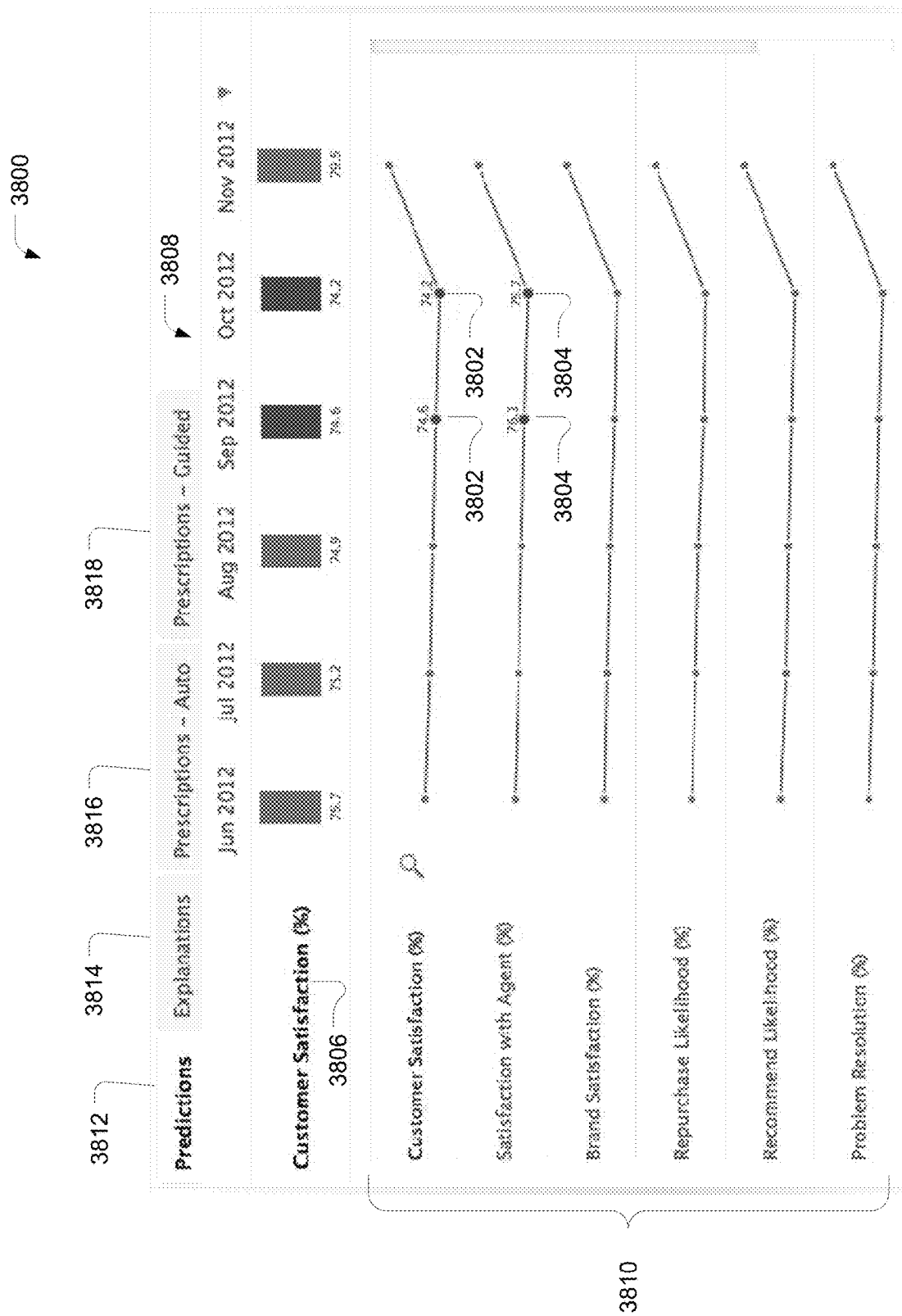
FIG. 24, FIG. 25, FIG. 26, FIG. 27, FIG. 28, FIG. 29, FIG. 30, FIG. 31, FIG. 32, and FIG. 33 include illustrations of exemplary interfaces for display on a display device.

In another embodiment, an alternative interface is illustrated in FIG. 24, FIG. 25, FIG. 26, FIG. 27, FIG. 28, FIG. 29, FIG. 30, FIG. 31, FIG. 32, or FIG. 33. For example, FIG. 24 includes an illustration of an alternative interface for displaying predictions of key performance indicators. The interface 3800 includes a set of tabs, such as a predictions tab 3812, an explanations tab 3814, a prescriptions-auto tab 3816, or a prescriptions-guided tab 3818. As illustrated in FIG. 24, when the predictions tab 3812 is selected, the predicted values associated with key performance indicators 3810 are displayed for different points in time 3808, such as in a line chart. In other examples, the KPIs 3810 can be displayed in bar charts, stacked bar charts, x-y plots, pie charts, bullet charts, other graphical representations or any combination thereof. When a particular key performance indicator is selected, such as at 3806 ("customer satisfaction"), the values of the selected key performance indicator 3806 for each of the periods of time can be displayed in more detail, such as in a bar chart.

When the selected key performance indicator 3806 has a value that is out of range or in violation of a business rule, the interface may provide a visual indication of the violation. In particular, a subset of values associated with a time can be displayed in a manner different from those times not included in the subset, such as those values not in violation of the business rule. Such a visual indicator may be a change in color, a change in pattern, a change in shape, or any combination thereof of the graph associated with the key performance indicator at the time period in which the key performance indicator is in violation. For example, when the key performance indicator is within a desired range, the graph can be presented in blue, whereas when the value of the key performance indicator violates a business rule for particular time, the value may be displayed in a different color, such as red. Moreover, those key performance indicator values that are in violation of a business rule, such as a threshold, can be highlighted or enumerated within the graph associated with the key performance indicators 3810. For example, as illustrated at 3802 and 3804, values and enlarged data points are illustrated in association with the periods of time at which the key performance indicator values violates a business rule. As illustrated at 3802 or 3804, customer satisfaction and satisfaction with an agent may be out of range at particular time points. As a result, the shape of the data point, the size of the data point or numbering associated with the data point can be changed to indicate the violation of the business rule.

Figure 25:
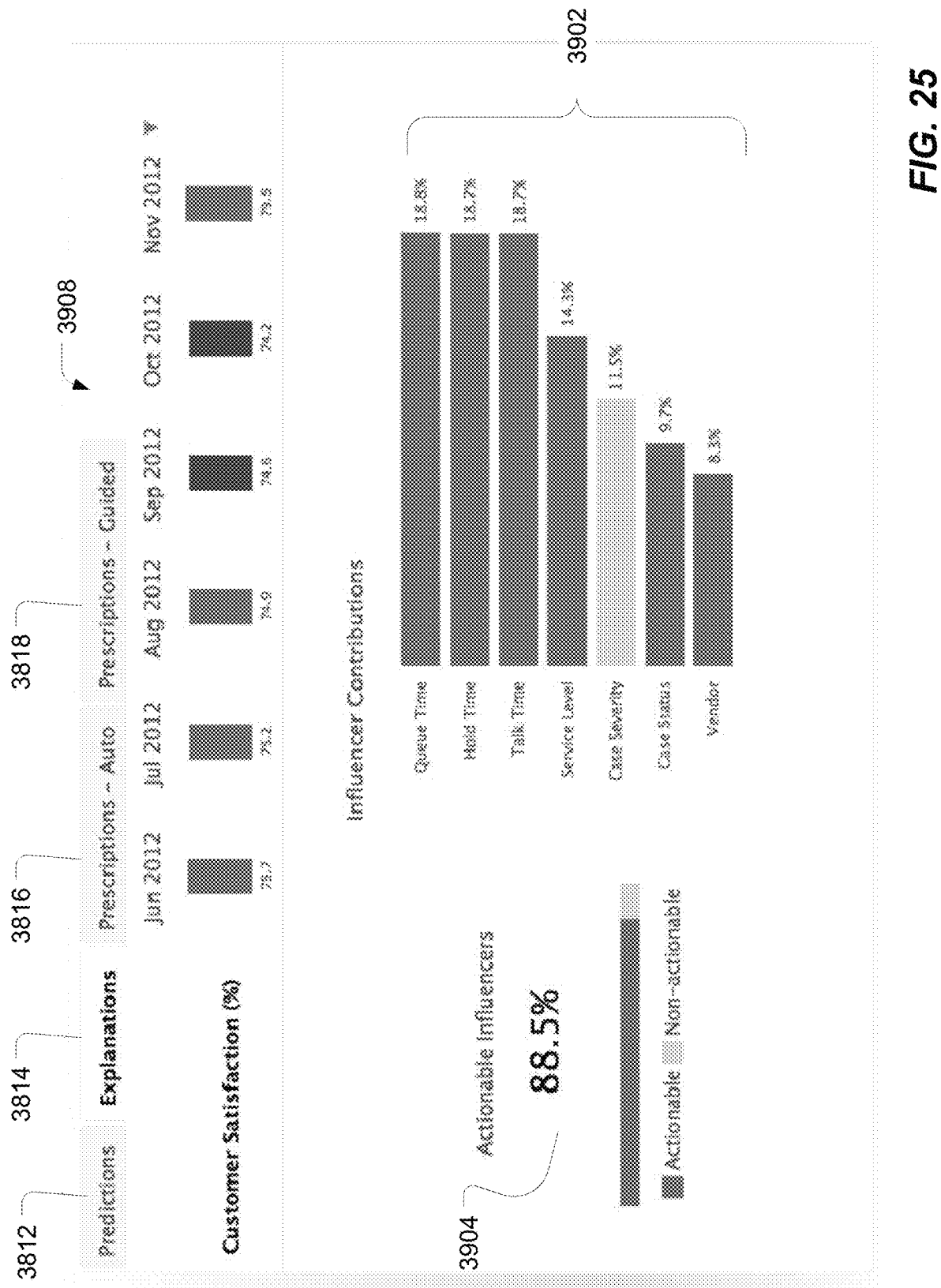

As illustrated in FIG. 25, when the explanations tab 3814 is selected, users are provided with a display of root cause analysis. In particular, the user may select a key performance indicator 3906, such as customer satisfaction. Those influencers providing a contribution to the values of customer satisfaction at different points in time 3908 can be displayed, such as at 3902. In a particular example, the display may include an ordered list, such as an order listing influencers by relative contribution.

In a particular example, influencers may be a mix of actionable and non-actionable influencers. The list 3902 may include actionable influencers only or may include a combination of actionable influencers and non-actionable influencers. In the illustrated example, "case severity" is a non-actionable influencer and can be displayed in a different color, pattern, shape, or any combination thereof, to indicate that "case sensitivity" is a non-actionable indicator relative to the actionable influencers.

As further illustrated in FIG. 25, indication 3904 may be provided to indicate the contribution of actionable influencers to the values of the selected key performance indicator 3906. Indicator 3904 may provide a numerical value, a graphical illustration of the ratio of actionable to non-actionable influencers, or any combination thereof.

While FIG. 25 illustrates a global indication of influencer contribution to the selected key performance indicator 3906, individual times within the listing of the times 3908 can be selected to provide a time specific listing of influencer contributions.

Figure 26:
Figure 27:
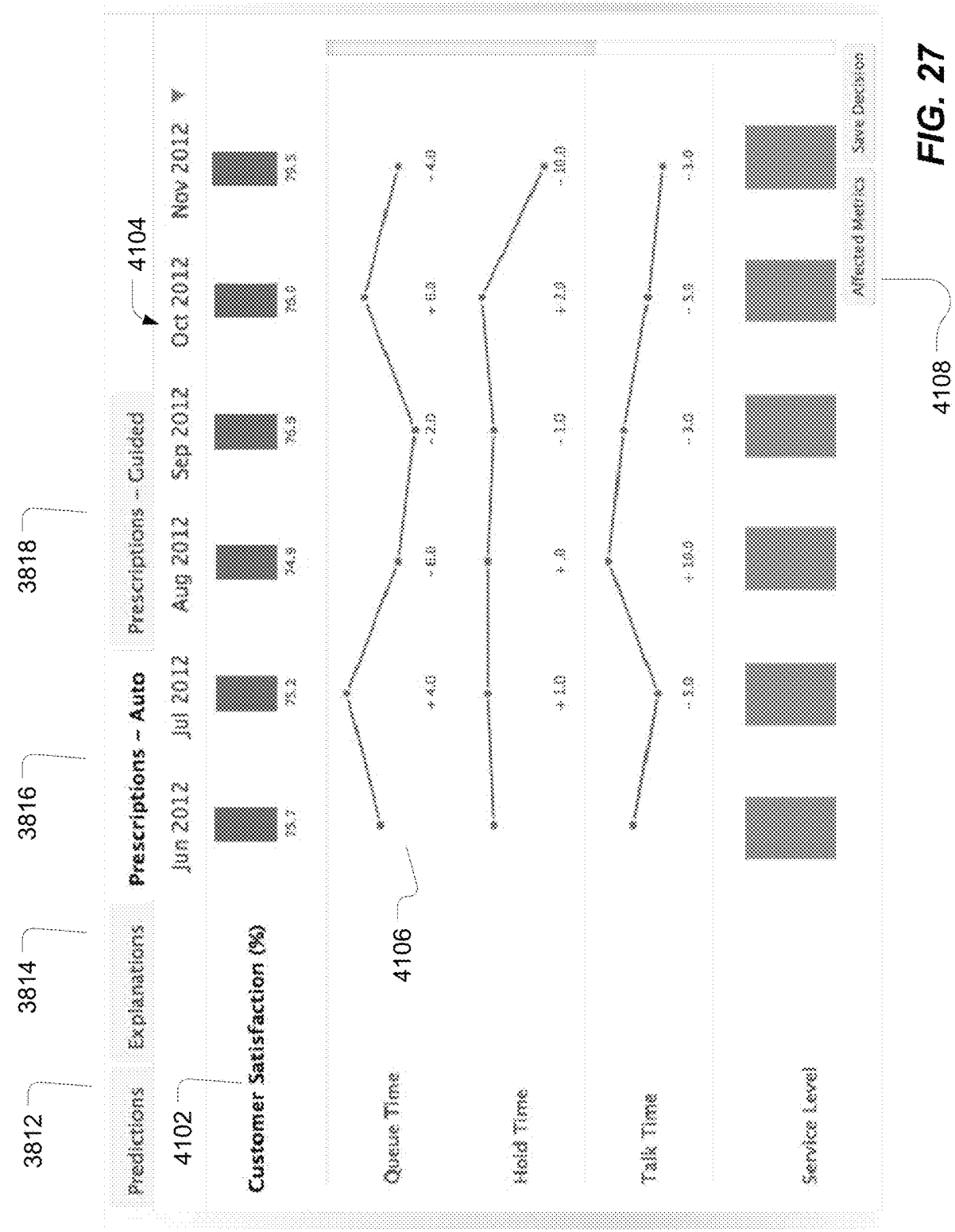

When the prescriptions-auto tab 3816 is selected as illustrated at FIG. 26, a generated listing of actions 4006 is provided for the selected key performance indicator 4002, in this case customer satisfaction, and for the selected time 4004, June 2012, as illustrated. In particular, the system may determine a set of actions to be taken for each time to ensure that business constraints are met. Alternatively, when the individual time is deselected, as illustrated in FIG. 27, suggested actions 4106 for a set of influencers is provided in association with each time 4104 for a selected key performance indicator 4102. Such a set of actions associated with future times provides an actionable pathway to maintaining compliance with business constraints and other business rules.

Figure 28:
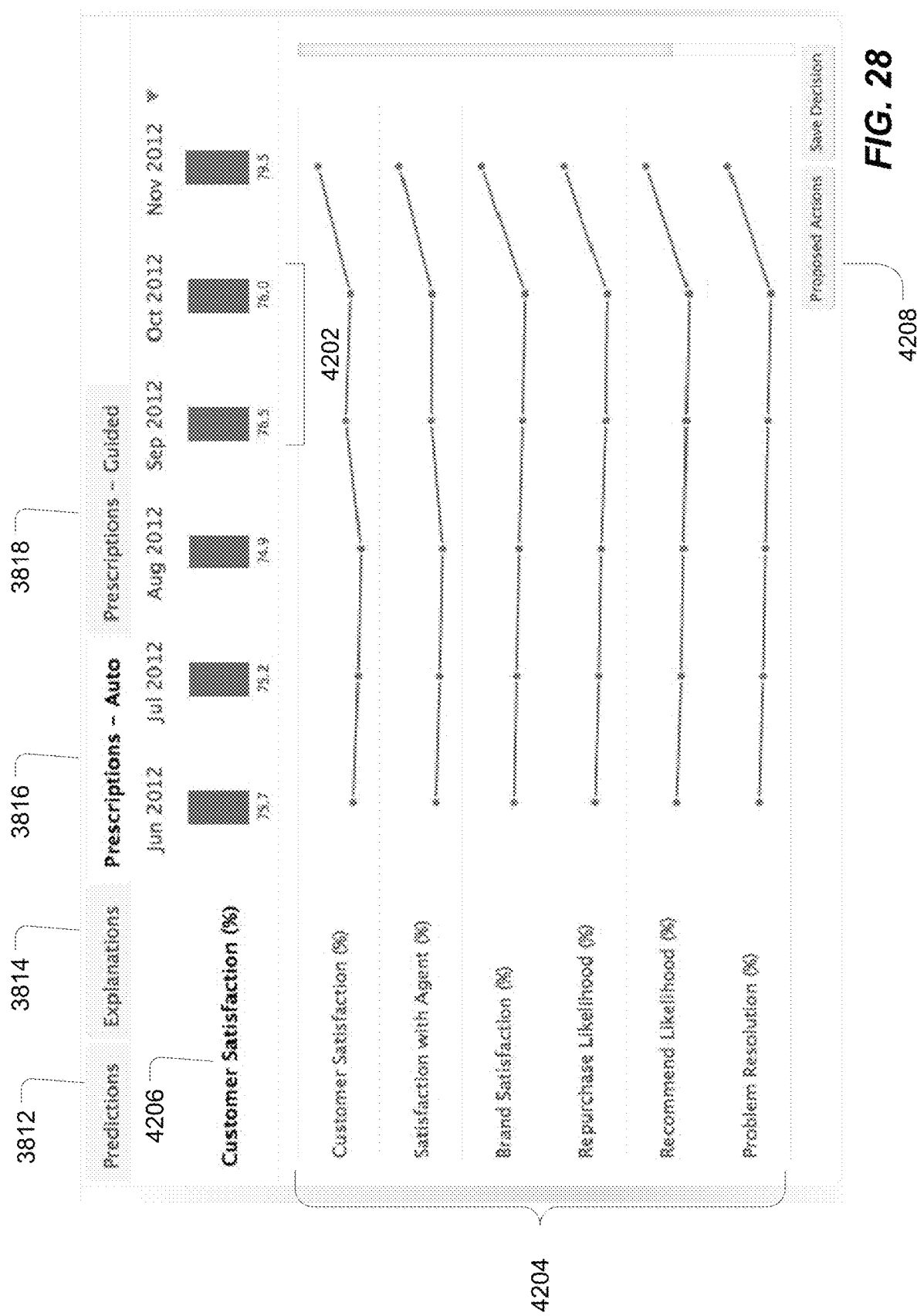

To see the effect of the actionable pathway, an affected metrics button (4108, 4208) is provided, which leads to an interface illustrated in FIG. 28 and showing the selected key performance indicator 4206, as well as other key performance indicators 4204 and their values displayed for each time. As illustrated, the prescribed actionable pathway leads to compliance, as illustrated at 4202, where the key performance indicator values were not in compliance previously. A proposed actions button 4208 can be provides in the interfaces illustrated to return to the interface of FIG. 26 or FIG. 27.

Figure 29:
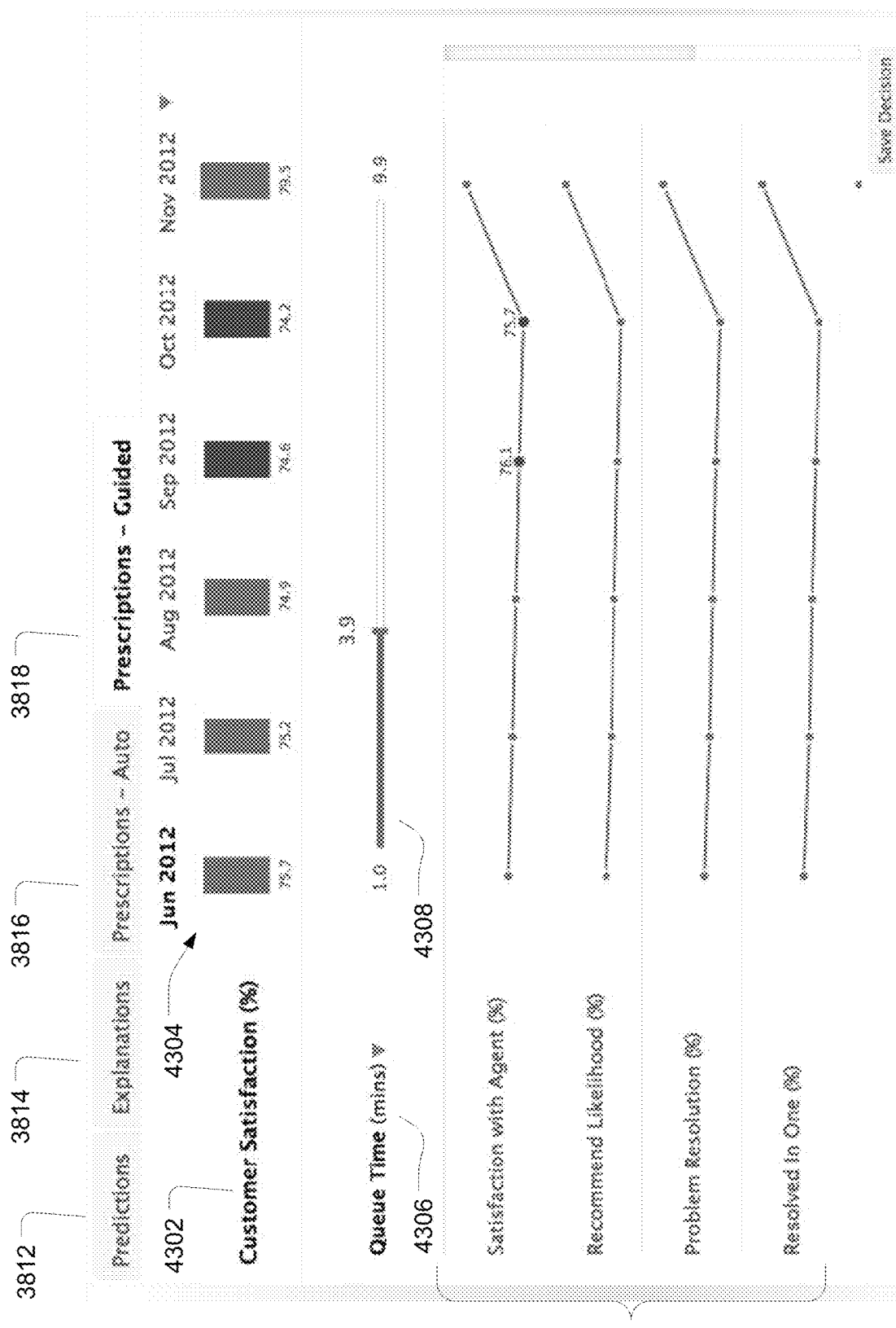

When the prescriptions-guided tab 3818 is selected as illustrated in FIG. 29, the user is provided with interactive controls to control one or more influencers and to determine the effect on one or more key performance indicators, such as the selected key performance indicator. For example, the key performance indicator 4302 can be "customer satisfaction" and the selected influencer 4306 can include queue time. Other key performance indicators can be displayed, as illustrated at 4310. The user can select a time 4304, June 2012, as illustrated. A controller, such as a slide control 4308, is provided to manipulate the value of the influencer 4306 at the selected time 4304.

The boundaries (high and low values) of the control 4308 can be constrained based on business rules and business constraints. Alternatively, other time periods can be selected, such as one or more future time periods, and an appropriate slide control can be provided for the user to enter values associated with the influencer at the selected time period. The effect of changing such values of the selected influencer is displayed in the graphs associated with the key performance indicators 4310 and selected key performance indicator 4302.

Figure 30:
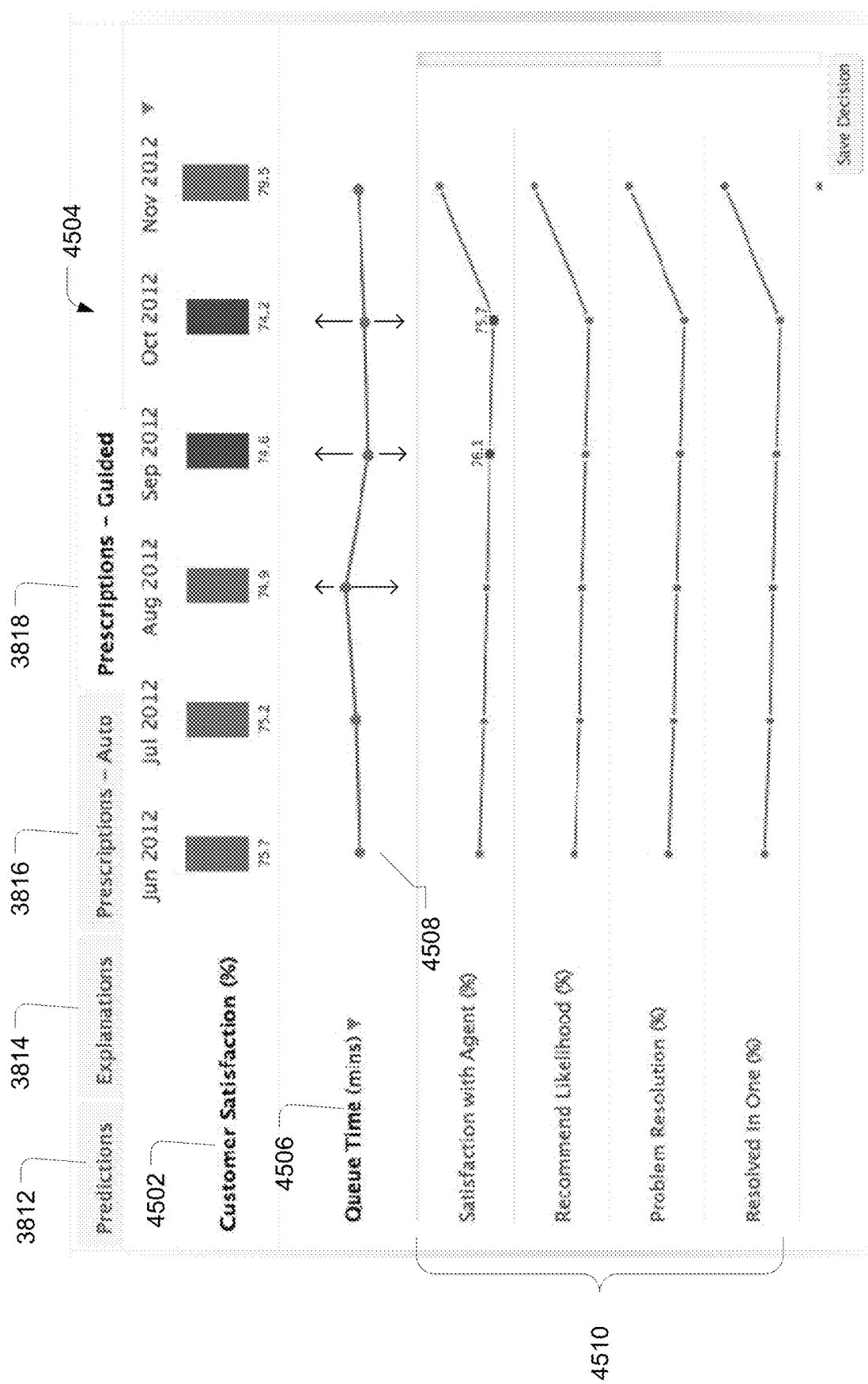

As illustrated in FIG. 30, the time period is deselected and an editable graph 4508 can be provided for the user to manipulate values of the influencer 4506 for a variety of time periods 4504. As the future values of the influencer are manipulated, the effect on the selected key performance indicator 4502 can be seen. In addition, the influence of the change in the influencer 4506 for a variety of time periods 4504 can be seen on the graphs associated with the key performance indicators 4510.

The editable graph 4508 permits the user to manipulate data verticess associated with different times up or down, through a given range, representing a change in the key performance indicator at the time associated with the data vertices being manipulated. As such, the editable graph 4508 can provide at least one, at least two, or more adjusted influencer values, each associated with a different unique time. In an example, each of the data vertices can be manipulated through the full range associated with values of the influencer 4506. The range can be different at each time. In particular, the range can be determined dynamically at the time the editable graph 4508 is presented or throughout manipulation of the editable graph 4508. For example, the range can be a function of a constraint, in particular, a constraint that is a function of time. In another example, the range can be constrained by the value of temporally adjacent influencer values. Alternatively, the amount of change can be limited by a criterion or business rules. Further, the change may be quantized to allow change by discrete increments or decrements. Alternatively, the editable graph 4508 can permit continuous change of the influencer 4506 for a given time.

In another example, the relative change between time periods can be constrained. The editable graph 4508 may permit a change in an influencer value at a particular time only to the extent that such change is constrained by the values of neighboring influencer values at adjacent points in time. In a further example, manipulating the data point at a particular time outside the range constrained by adjacent time points can result in movement of the adjacent vertices to provide a range as desired by the user. In such a case, moving outside of the range may result in the adjacent influencer values moving up or down with the influencer value being manipulated by the user to ensure that the relative change constraint is not violated. In a further example, the value of an influencer can be limited by a function of time. As such, the range over which a particular vertex of the editable graph can move may be limited by the editable graph.

As such, the editable graph 4508 permits a multi-time point view and a tool to manipulate influencer values of the selected influencer 4506 at the set of time points 4504 over which predictions are made as to the value of the key performance indicator, such as the select key performance indicator 4502.

Figure 31:
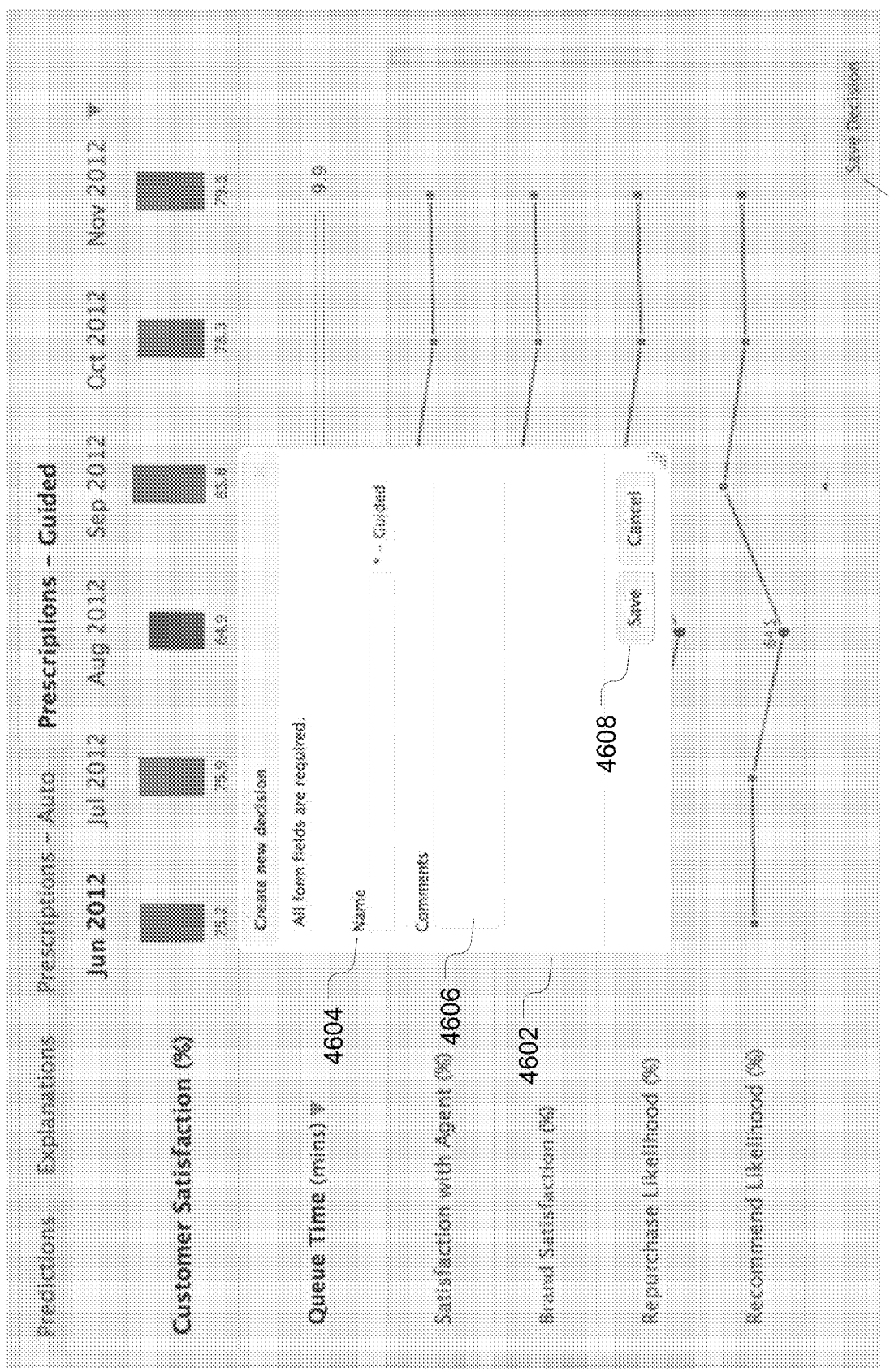
Figure 32:
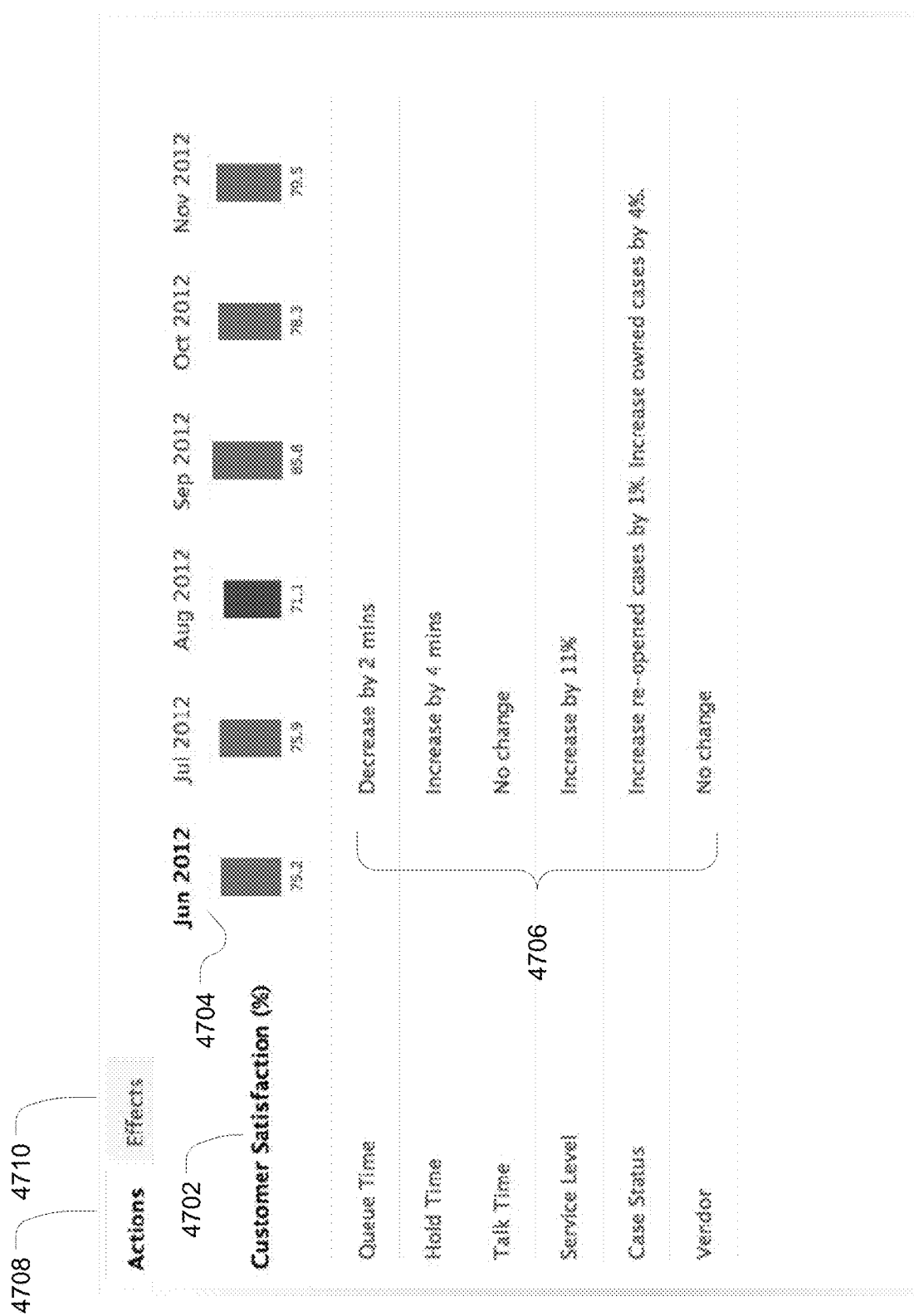

Once the user has established a set of actions or when the system provides automatic prescription of actions, such actions may be saved by accessing a save decision control 4610 as illustrated in FIG. 31, resulting in an interface 4602 that permits identifying the prescribed changes in influencer values with a name at 4604 and comments in text box 4606. Once the name and comments are provided, the scenario or set of influencer values for a future actionable pathway can be saved by selecting save control 4608.

Once saved, the user can recall the saved actions and effects. In an example illustrated in FIG. 32, the prescribed actions 4706 can be recalled and displayed in association with a selected key performance indicator 4702 and a particular time 4704 in which the actions are to take place when actions tab 4708 selected.

Figure 33:
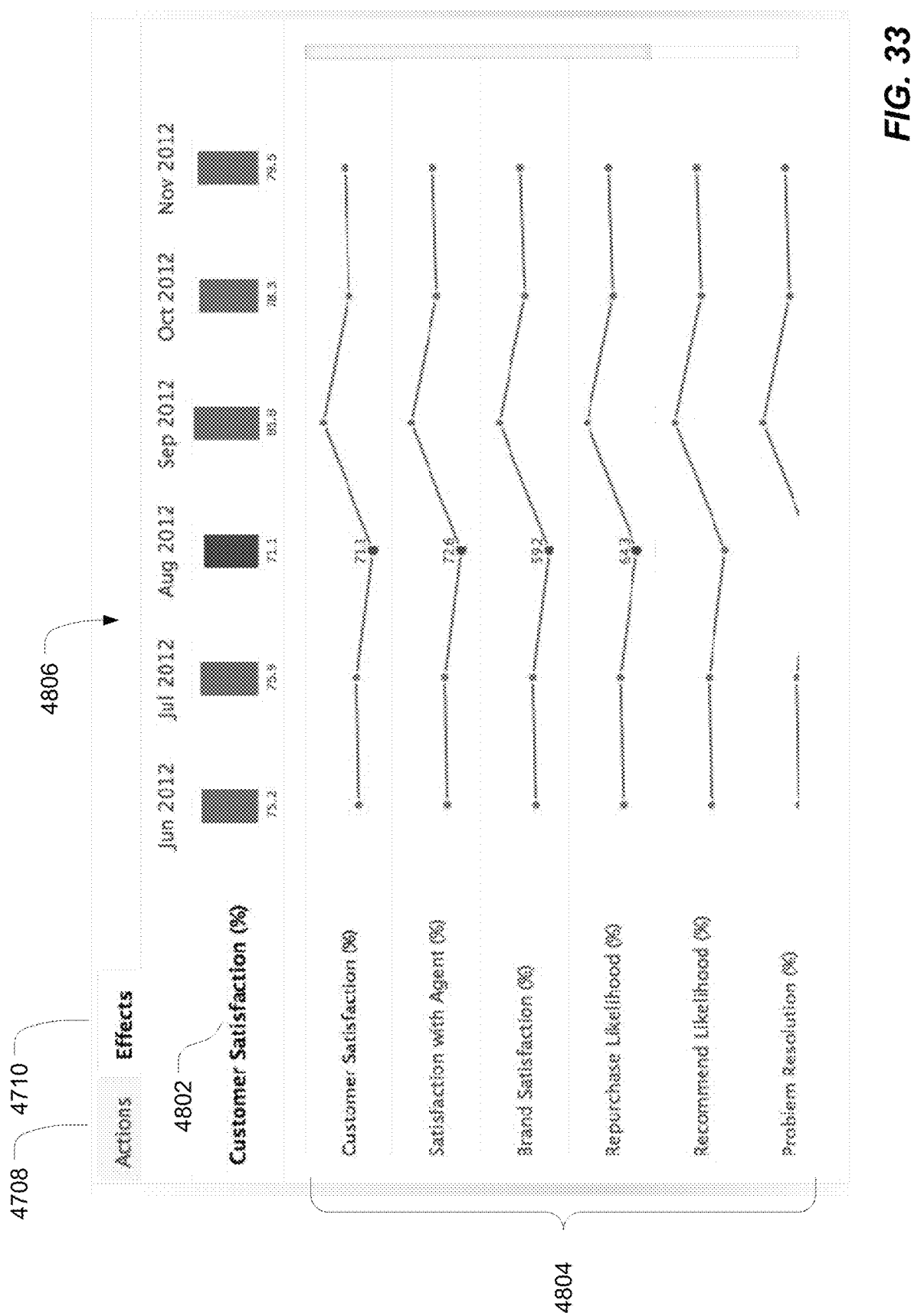

When an effects tab 4710 is selected, as illustrated in FIG. 33, the effect on key performance indicators can be displayed. For example, selected key performance indicator 4802 can be displayed with detailed enumeration of values associated with the key performance indicator 4802 at different time periods 4806. Further, a listing of other key performance indicators 4804 can be associated with graph illustrations of the predicted values of such key performance indicators over the set of times 4806.

In the foregoing specification, the invention has been described with reference to specific embodiments. However, one of ordinary still in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

Concluding Remarks

It is further noted that any of the embodiments described above may further include receiving, sending or storing instructions or data that implement the operations described above in conjunction with the figures upon a computer readable medium. Generally speaking, a computer readable medium may include non-transitory and tangible storage media or memory media such as magnetic or flash or optical media, e.g. disk or CD-ROM, volatile or nonvolatile media such as RAM, ROM, etc. as well as transmission media or signals such as electrical, electromagnetic or digital signals conveyed via a communication medium such as network or wireless links.

It is now disclosed for the first time a method of displaying KPI-related data on a display device in accordance with information received via a user input device, the display device and the user input device being operatively coupled to one or more digital computers.

The method comprises the steps of:

a) for each dashboard future time frame of a plurality of dashboard future time frames, for each KPI of a plurality of KPIs, displaying, on the display device, a respective indication of a respective predicted KPI value (in one non-limiting example, this includes displaying a predictive dashboard);

b) for an influencer-ranking future time frame, for a root-cause KPI whose predicted value in the influencer-ranking future time frame is predicted to be influenced by behavior of a set of influencers, displaying, on the display device, a predicted future influencer ranking-hierarchy including identifiers of a first plurality of influencers of the set of influencers, the first plurality of influencers being displayed in accordance with predicted relative influence contributions to the predicted future value of the root-cause KPI in the influencer-ranking future time frame (in one non-limiting example, this relates to 'root-cause analysis');

c) for each influencer of a second plurality of influencers of the set of influencers, receiving, via the user input device, a respective user proposed deviating influencer value; and d) in accordance with: i) an influencer action future time frame for user-proposed influencer values; ii) a deviating-KPI-viewing time frame for user-proposed influencers; and iii) the received user-proposed deviating influencer values, displaying, on the display device, for one or more of KPIs, descriptions of one or more deviating future KPI values derived from the user-proposed deviating influencers values (in one non-limiting example, step (c) includes receiving input for a 'what-if interface', and step (d) includes displaying output for a 'what-if interface').

In some embodiments, the first plurality and the second plurality of influencers are identical or are different.

In some embodiments, the identifiers of the influencer-ranking-hierarchy (for example, in 'root-cause analysis') are ordered or sized on the display device in accordance with the predicted relative influencer contributions to the predicted future value of the root-cause KPI for a future time frame.

In some embodiments, the first plurality of influencers (for example, used in root cause analysis) are selected from the set of influencers in accordance with predicted relative influence strength in the influencer-ranking future time frame.

In some embodiments (for example, some embodiments relating to 'what-if analysis')), i) the method further comprises: e) for each given influencer of the second plurality of influencers, displaying on the display device a respective user control (for example, a slider or a text box or any other user control) that is visually associated with a respective identifier of the given influencer such that the user controls and the influencer identifiers are displayed in accordance with predicted relative influence contributions to one or more KPIs in a future time frame; and ii) for each given influencer, the respective receiving of the respective user-proposed deviating influencer value is carried out in response to a respective one or more user engagements of the respective displayed user controls using the user input device.

In some embodiments (for example, some embodiments relating to 'what-if analysis'), the user controls and the influencer identifiers are sized or ordered on the display device in accordance with predicted relative influence contributions to one or more KPIs in a future time frame.

In some embodiments for example, some embodiments relating to 'what-if analysis', for a given influencer of the second plurality of influencers: i) the displaying of the corresponding influencer identifier for the given influencer by the display device; and ii) the displaying of the corresponding user control for the given influencer by the display device are contingent upon a relationship between: i) a magnitude of a predicted relative future influence, over the one or more KPIs, by the given influencer over the one or more KPIs; and ii) magnitudes of predicted relative future influences, over the one or more KPIs, by one or more other influencers, wherein: i) the one or more other influencers are members of the set of influencers; and ii) the one or more influencers do not belong to the second plurality of influencers. Thus, it is possible to order the influencer descriptions or user controls or GUI widgets by estimated contribution or importance—visual elements associated with the 'more important' influencers may be bigger or brighter or displayed earlier according to some visual ordering scheme.

In some embodiments (for example, related to 'what-if analysis), i) the method further comprises: e) for each given influencer of the second plurality of influencers, displaying a respective user control that is visually associated with a respective identifier of the given influencer; and ii) for each given influencer, the respective receiving of the respective user-proposed deviating influencer value is carried out in response to a respective one or more user engagements of the respective displayed user controls using the user input device; and iii) the display device and the user input device are configured such that each user control is associated with a respective influencer which is associated with a default value that is determined in accordance with a respective predicted future value for the influencer-action time frame for the respective influencer.

In some embodiments (for example, related to 'what-if analysis), i) KFI value descriptions for a plurality of deviating future KPI values derived from the user-proposed influencer values are displayed, each deviating future KPI value being mathematically associated with a respective deviation magnitude respectively describing by how much each said future KPI value derived from the user-proposed influencer values deviates from its respective predicted KPI value for a future deviating-KPI-viewing time frame; and ii) the displaying of the descriptions of KPI values derived from user-proposed influencer values is carried out in accordance with the deviation magnitudes.

In some embodiments (for example, related to 'what-if analysis), i) KPI value descriptions for a plurality of deviating future KPI values derived from the user-proposed influencer values are displayed, each deviating future KPI value being mathematically associated with a respective deviation magnitude respectively describing by how much each said future I<PI value derived from the user-proposed influencer values deviates from its respective predicted KPI value for a future deviating-KPI-viewing time frame; and ii) the display of a given displayed KPI value description derived from the user-proposed influencer values is contingent upon a respective deviation magnitude for the given displayed KPI value. Thus, in some embodiments, only GUI controls or information about 'more important' influencers may be presented for soliciting user-proposed influencer values.

In some embodiments (for example, in some embodiments related to optimization or the computer(s) suggesting preferred deviating influencer values), the method further comprises the step of: e) for a KPI-moving future time frame, one or more target KPIs, and an influencer-action-time frame for calculated influencers, displaying (for example, by selecting or sizing or ordering or font-selection of any visual element) on the display device, a set of calculated deviating influencer values which: i) satisfy one or more provided constraints; ii) deviate from predicted influencer values for the KPI-moving future time frame; and iii) if adopted at the influencer-action-time frame, are predicted to move a future value of the one or more target KPIs, at the KPI-moving future time frame, from predicted values to a target value or range.

In some embodiments (for example, in some embodiments related to optimization or the computer(s) suggesting preferred deviating influencer values), the method further comprises the step of: f) for a specified deviating KPI-viewing time frame for the calculated influencer values, the specified deviating KPI-viewing time frame for the calculated influencer values ending after the influencer-action-time frame for calculated influencers, displaying, on the display device, indications of one or more deviating future KPI values determined for: i) the calculated deviating influencers for the influencer-action time-frame of the calculated influencers; and ii) the deviating KPI-viewing time frame.

In some embodiments (for example, in some embodiments related to optimization or the computer(s) suggesting preferred deviating influencer values), i) KPI value descriptions for a plurality of deviating future KPI values determined for the calculated deviating influencer values are displayed, each deviating future KPI value determined for the calculated influencer values being mathematically associated with a respective deviation magnitude respectively describing by how much each said future KPI value determined for the calculated deviating influencer values deviates from its respective predicted KPI value for a future deviating-KPI-viewing time frame; and ii) the displaying of the descriptions of KPI values determined for the calculated influencer values is carried out in accordance with the deviation magnitudes.

In some embodiments (for example, in some embodiments related to optimization or the computer(s) suggesting preferred deviating influencer values), i) KPI value descriptions for a plurality of deviating future KPI values determined for the calculated influencer values are displayed, each deviating future KPI value determined for the calculated influencer values being mathematically associated with a respective deviation magnitude respectively describing by how much each said future KPI value determined for the calculated influencer values deviates from its respective predicted KPI value for a future deviating-KPI-viewing time frame; and ii) the display of a given displayed KPI value description determined from the calculated influencer values is contingent upon a respective deviation magnitude for the given displayed KPI value.

In some embodiments, the constraint includes at least one of a KPI constraint (i.e. a constraint involving one or more KPI(s)) and a cost constraint. In some embodiments, at least one of i) a specification of the root-cause KPI; ii) a specification of the influencer-ranking future time frame; iii) a specification of the influencer action future time frame; and iv) a specification of the deviating-KPI-viewing future time frame is received via one or more user input devices.

In some embodiments, at least one user input device is selected from the group consisting of a mouse, a keyboard, a touch-screen, and a microphone.

In some embodiments, at least one influencer or KPI is indicative of at least one of i) a length of a telephone conversation; ii) an amount of time that a telephone device is in a hold-state; and iii) a number of distinct telephone conversations; and iv) whether or not a telephone conversation is an incoming conversation or an outgoing conversation. It is now disclosed for the first time an apparatus for displaying KPI-related data, the apparatus comprising: a) one or more computers (for example, digital computers); b) a display device operatively coupled to one or more of the computers; and c) a user input device operatively coupled to one or more of the computers; wherein: (i) the one or more computers are operative, to compute, from historical KPI-related data, predicted future KPI-related behavior including: A) predicted behavior of one or more KPIs; B) predicted future behavior of one more influencers, and C) predicted future relationships between one or more of the influencers and one or more of the KPIs; (ii) the display device is operative to display, in accordance with the predicted future KPI-related behavior: A) for each dashboard future time frame of a plurality of dashboard future time frames, for each KPI of a plurality of IG'Is, a respective indication of a respective predicted KPI value; B) for an influencer-ranking future time frame, for a root-cause KPI whose predicted value, is predicted, in accordance with the predicted future KPI-related behavior, to be influenced by behavior of a set of influencers, a predicted future influencer-ranking-hierarchy including identifiers of a first plurality of influencers of the set of influencers, the first plurality of influencers being displayed in accordance with predicted relative influence contributions to the predicted future value of the root-cause KPI in the influencer-ranking future time frame; iii) the user input device is operative, for each influencer of a second plurality of influencers of the set influencers, to receive, a respective user proposed deviating influencer value; iv) the one or more computers are further operative, to compute, from historical KPI-related data and from the user-proposed deviating influencer values, one or more deviating future KPI values; v) the display device is further operative, in accordance with: A) an influencer action future time frame for user-proposed influencer values; B) a deviating-KPI-viewing time frame for user-proposed influencers; and C) the computed deviating future KPI values, to display, on the display device, for one or more of KPIs, descriptions of one or more of the deviating future KPI values. In some embodiments, the apparatus may be configured to effect calculations related to 'optimization' or display indications of calculated deviating influencer values.

In a first aspect, a method of performing analysis includes predicting first future values of at least one key performance indicator at a set of future times based on a first set of influencer values associated with at least one influencer. The set of influencer values includes a present influencer value associated with the at least one influencer and a first set of future influencer values associated with the at least one influencer and associated with the set of future times. The method further includes displaying on an interface device the first future values of the at least one key performance indicator and an editable graph to receive at least one adjusted future value associated with the influencer and associated with a future time of the set of future times. The at least one adjusted future value is included in a second set of future influencer values. A second set of influencer values includes the present influencer value and the second set of future influencer values. The method also includes predicting second future values of the at least one key performance indicator at the set of future times based on the second set of influencer values associated with the at least one influencer.

In an example of the first aspect, the editable graph is to receive at least two adjusted future values associated with the influencer and each associated with a different future time of the set of future times.

In another example of the first aspect and the above examples, a range associated with a first influencer value at a first time is based at least in part on a second influencer value at a second time.

In a further example of the first aspect and the above examples, the editable graph includes a plurality of vertices, each vertex of the plurality of vertices associated with a unique future time of the set of future times. For example, each vertex of the plurality of vertices is assigned an independent range of possible influencer values associated with the unique future time. In another example, the range is dynamically assigned.

In an additional example of the first aspect and the above examples, the method further includes adjusting the influencer value at the second time based on a user moving a vertex of the editable graph vertically associated with the first influencer value outside of the range.

In another example of the first aspect and the above examples, the second time is temporally adjacent the first time.

In a further example of the first aspect and the above examples, a range associated with a first influencer value at a first time is based at least in part on a relation on time.

In an additional example of the first aspect and the above examples, displaying the first future values of the at least one key performance indicator includes indicating that a subset of the future values are in violation of a business rule. For example, indicating can include displaying the subset in a color different from future values not part of the subset of future values. In another example, indicating includes displaying the subset in a pattern different from future values not part of the subset of future values.

In another example of the first aspect and the above examples, displaying the first future values of the at least one key performance indicator includes displaying a bar chart of the future values.

In a further example of the first aspect and the above examples, displaying the first future values of the at least one key performance indicator includes displaying a line chart of the future values.

In an additional example of the first aspect and the above examples, the method further includes displaying first future values associated with at least another key performance indicator different from the at least one key performance indicator. For example, displaying the first future values associated with the at least another key performance indicator can include displaying the first future values associated with the at least one key performance indicator in a chart format different from the first future values associated with the at least another key performance indicator.

In a second aspect, a method of performing analysis includes predicting first future values of at least one key performance indicator at a first set of future times based on a first set of influencer values associated with at least one influencer using a model. The set of influencer values includes a present influencer value associated with the at least one influencer and a first set of future influencer values associated with the at least one influencer and associated with the set of future times. The method further includes receiving data associated with the first future values of the at least one key performance indicator and the set of influencer values, recalibrating the model based on the received data, predicting second future values of the at least one key performance indicator at a second set of future times, displaying the second future values of the at least one key performance indicator on a display device.

In an example of the second aspect, the model includes constraints.

In another example of the second aspect and the above examples, the method further includes determining whether a constraint of the model is to be changed based on application of a meta-rule to the received data and adjusting the constraint prior to recalibrating. For example, the constraint can be a box constraint associated with the at least one influencer. In another example, the constraint is a relation on time associated with the at least one influencer. In a further example, the constraint is associated with the at least one influencer and includes a range based on a value of a temporally adjacent influencer values. In an additional example, the meta-rule indicates that a constraint is to be changed based at least in part on the number of times an influencer value is at a limit of the constraint.

In a further example of the second aspect and the above examples, the method further includes translating the set of influencer values to business actions.

In an additional example of the second aspect and the above examples, the method further includes translating a set of business actions into the set of influencer values prior to predicting.

In another example of the second aspect and the above examples, recalibrating is triggered based at least in part on a comparison between the predicted first future values of the at least one key performance indicator and the received data.

In a third aspect, a method of performing analysis includes predicting first future values of at least one key performance indicator at a first set of future times based on a first set of influencer values associated with at least one influencer using a model having a constraint. The set of influencer values includes a present influencer value associated with the at least one influencer and a first set of future influencer values associated with the at least one influencer and associated with the set of future times. The method further includes receiving data associated with the first future values of the at least one key performance indicator and the set of influencer values, determining whether the constraint of the model is to be changed based on application of a meta-rule to the received data, adjusting the constraint, predicting second future values of at least one key performance indicator at a second set of future times using the model with the adjusted constraint, and displaying the second future values on a display device.

In an example of the third aspect, the constraint is a box constraint associated with the at least one influencer.

In another example of the third aspect and the above examples, the constraint is a relation on time associated with the at least one influencer.

In a further example of the third aspect and the above examples, the constraint is associated with the at least one influencer and includes a range based on the value of a temporally adjacent influencer values.

In another example of the third aspect and the above examples, the meta-rule indicates that a constraint is to be changed based at least in part on the number of times an influencer value is at a limit of the constraint.

In an additional example of the third aspect and the above examples, the method further includes translating the set of influencer values to business actions.

Each of the above disclosed methods can be performed on multiple systems. For example, the methods can include processing data streams from a file system. The file system can be distributed, particularly for large data sets. A method can be partitioned in such a way, that it can perform the operations on a partition or subset of the data. Such processing is particularly useful for unstructured data sources having large file size. The results of such processes can be combined in such a way that the result is identical to the method applied to a single data source being combined of all of the partitioned data.

It will be appreciated that in different embodiments, any presently-disclosed apparatus (or any presently disclosed computer product including a computer usable medium) may be configured or operative to any presently disclosed method or technique.

A computer program product, includes a computer usable medium having a computer readable program code non-transitorily embodied therein, said computer readable program code adapted to be executed to implement a method of computing and displaying KPI-related data on a display device in accordance with information received via a user input device, the display device and the user input device being operatively coupled to one or more digital computers, the method comprising: a) for each dashboard future time frame of a plurality of dashboard future time frames, for each KPI of a plurality of KPIs, displaying, on the display device, a respective indication of a respective predicted KPI value; b) for an influencer-ranking future time frame, for a root-cause KPI whose predicted value in the influencer-ranking future time frame is predicted to be influenced by behavior of a set of influencers, displaying, on the display device, a predicted future influencer-ranking-hierarchy including identifiers of a first plurality of influencers of the set of influencers, the first plurality of influencers being displayed in accordance with predicted relative influence contributions to the predicted future value of the root-cause KPI in the influencer-ranking future time frame; c) for each influencer of a second plurality of influencers of the set influencers, receiving, via the user input device, a respective user proposed deviating influencer value; and d) in accordance with: i) an influencer action future time frame for user-proposed influencer values; ii) a deviating-KPI-viewing time frame for user-proposed influencers; and iii) the received user-proposed deviating influencer values, displaying, on the display device, for one or more of KPIs, descriptions of one or more deviating future KPI values derived from the user-proposed deviating influencer values.

In the present disclosure, certain routines for calculating data or displaying data may be carried out 'in accordance with' a certain factor—for example, influencer identifiers may be ordered or selected in accordance with magnitudes of one or more deviations. It is understood, in the present disclosure, that when a routine is carried out 'in accordance with' a certain factor or factors, that it is possible that the routine will also be carried out in accordance with one or more 'additional factors' or additional business rules (for example, displayed identifiers may be ordered both according to magnitudes of deviations as well as whether or not the influencer is designated as an 'external influencer' or a 'controllable influencer.')

Thus, in the present disclosure, the phrase 'in accordance with' (or 'according to') should be interpreted as 'at least in part in accordance with.'

As described above, "controllable influencers" and "actionable influencers" are analogous terms. In an example, an influencer can be a business input. For example, an influencer can be a measurable business input, such as a business input relating to an action, a business function, or other business relevant data. A key performance indicator can be a business output, such as a measurable indication of performance of a business function.

Note that not all of the activities described above in the general description or the examples are required, that a portion of a specific activity may not be required, and that one or more further activities may be performed in addition to those described. Still further, the orders in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of performing analysis, the method comprising:

predicting with a computer system first future values of at least one key performance indicator at a set of future times based on a first set of influencer values associated with at least one influencer, the set of influencer values including a present influencer value associated with the at least one influencer and a first set of future influencer values associated with the at least one influencer and associated with the set of future times;

displaying on an interface device the first future values of the at least one key performance indicator and an editable graph, the editable graph including a plurality of moveable vertices, a set of the moveable vertices associated with an influencer of the at least one influencer, each moveable vertex of the set of moveable vertices associated with a unique future time of the set of future times, the editable graph illustrating the first set of future influencer values as the moveable vertices each at an associated future time on a timeline of the set of future times;

receiving through interaction with the moveable vertices at least one adjusted future value associated with an influencer and associated with a future time of the set of future times, the at least one adjusted future value included in a second set of future influencer values, a second set of influencer values including the present influencer value and the second set of future influencer values;

monitoring with the computer system and automatically adjusting a second moveable vertex associated with a second influencer value at a second time based on a user vertically moving a first vertex of the editable graph associated with the first influencer value outside of a range associated with the first influencer value; and predicting with the computer system second future values of the at least one key performance indicator at the set of future times based on the second set of influencer values associated with the at least one influencer.

2. The method of claim 1, wherein the editable graph is to receive at least two adjusted future values associated with the influencer and each associated with a different future time of the set of future times.

3. The method of claim 1, wherein a range associated with a first influencer value at a first time is based at least in part on a second influencer value at a second time.

4. The method of claim 1, wherein each vertex of the plurality of vertices is assigned an independent range of possible influencer values associated with the unique future time.

5. The method of claim 4, wherein the range is dynamically assigned.

6. The method of claim 1, wherein the second time is temporally adjacent to the first time.

7. The method of claim 1, wherein a range associated with a first influencer value at a first time is based at least in part on a relation on time.

8. The method of claim 1, wherein displaying the first future values of the at least one key performance indicator includes indicating that a subset of the future values are in violation of a business rule.

9. The method of claim 8, wherein indicating includes displaying the subset of future values in a color different from future values not part of the subset of future values.

10. The method of claim 8, wherein indicating includes displaying the subset of future values in a pattern different from future values not part of the subset of future values.

11. The method of claim 1, wherein displaying the first future values of the at least one key performance indicator includes displaying a bar chart of the first future values.

12. The method of claim 1, wherein displaying the first future values of the at least one key performance indicator includes displaying a line chart of the first future values.

13. The method of claim 1, further comprising displaying first future values associated with at least another key performance indicator different from the at least one key performance indicator.

14. The method of claim 13, wherein displaying the first future values associated with the at least another key performance indicator includes displaying the first future values associated with the at least one key performance indicator in a chart format different from the first future values associated with the at least another key performance indicator.

\* \* \* \* \*